(12) United States Patent
Shani et al.

(10) Patent No.: US 11,957,080 B2
(45) Date of Patent: Apr. 16, 2024

(54) METHODS AND SYSTEMS FOR IRRIGATION AT STABILIZED PRESSURE

(71) Applicant: N-Drip Ltd., Kfar Saba (IL)

(72) Inventors: Uri Shani, Tel-Aviv (IL); Sharon Dabach, Tel-Aviv (IL); Zvi Miller, Kiryat-Tivon (IL)

(73) Assignee: N-Drip Ltd., Kfar Saba (IL)

(*) Notice: Subject to any disclaimer, the term of this patent is extended or adjusted under 35 U.S.C. 154(b) by 0 days.

(21) Appl. No.: 18/117,503

(22) Filed: Mar. 6, 2023

(65) Prior Publication Data
US 2023/0200314 A1    Jun. 29, 2023

Related U.S. Application Data

(63) Continuation of application No. 16/762,157, filed as application No. PCT/IL2018/051207 on Nov. 8, 2018, now Pat. No. 11,627,708.

(60) Provisional application No. 62/583,060, filed on Nov. 8, 2017.

(51) Int. Cl.
A01G 25/02    (2006.01)

(52) U.S. Cl.
CPC .................. *A01G 25/023* (2013.01)

(58) Field of Classification Search
CPC ............... A01G 25/02; A01G 25/023
USPC ................. 239/145, 542, 547, 548
See application file for complete search history.

(56) References Cited

U.S. PATENT DOCUMENTS

| | | | |
|---|---|---|---|
| 2,750,232 | A | 6/1956 | Elmer et al. |
| 3,601,320 | A | 8/1971 | Du Plessis |
| 3,698,195 | A | 10/1972 | Chapin |
| 3,817,454 | A | 6/1974 | Pira |
| 3,830,067 | A | 8/1974 | Osborn et al. |
| 3,887,139 | A | 6/1975 | Pearce |
| 3,995,436 | A | 12/1976 | Diggs |
| 4,226,368 | A | 10/1980 | Hunter |
| 4,960,584 | A | 10/1990 | Brown |
| 5,820,529 | A | 10/1998 | Weintraub |
| 6,036,104 | A | 3/2000 | Shih |
| 6,817,548 | B2 | 11/2004 | Krauth |
| 6,953,156 | B1 | 10/2005 | Boice, Jr. |
| 6,959,882 | B1 | 11/2005 | Potts |
| 7,048,010 | B2 | 5/2006 | Golan et al. |
| 7,941,971 | B2 | 5/2011 | Tamir |
| 8,348,182 | B2 | 1/2013 | Keren |
| 9,258,950 | B2 | 2/2016 | Kidachi |
| 9,439,366 | B2 | 9/2016 | Kidachi |

(Continued)

FOREIGN PATENT DOCUMENTS

| | | |
|---|---|---|
| CN | 1481671 | 3/2004 |
| CN | 1802089 | 7/2006 |

(Continued)

OTHER PUBLICATIONS

Substantive Examination Report dated Mar. 16, 2023 From the Intellectual Property Office of the Philipines, Buerau of Patens Re. Application No. 01/2018/502312. (4 Pages).

(Continued)

*Primary Examiner* — Steven J Ganey

(57) ABSTRACT

A method of irrigation comprises supplying water to an inclined irrigation pipe provided with a plurality of drippers such that a pressure at a highest level of the inclined irrigation pipe is at most 200 cm $H_2O$.

19 Claims, 37 Drawing Sheets

(56) References Cited

U.S. PATENT DOCUMENTS

| | | | |
|---|---|---|---|
| 9,795,092 | B2 | 10/2017 | Newbegin |
| 9,872,444 | B2* | 1/2018 | Turk .................. A01G 25/023 |
| 9,877,441 | B2* | 1/2018 | Ensworth ............... B29C 48/09 |
| 9,894,849 | B2 | 2/2018 | Rooney et al. |
| 2004/0222321 | A1 | 11/2004 | Golan et al. |
| 2005/0279856 | A1 | 12/2005 | Nalbandian et al. |
| 2006/0272726 | A1 | 12/2006 | Golan et al. |
| 2007/0194149 | A1 | 8/2007 | Mavrakis et al. |
| 2007/0252023 | A1 | 11/2007 | Walter et al. |
| 2008/0041978 | A1 | 2/2008 | Keren |
| 2008/0256857 | A1 | 10/2008 | Tamir |
| 2009/0261183 | A1 | 10/2009 | Mavrakis et al. |
| 2012/0267454 | A1 | 10/2012 | Einav et al. |
| 2016/0205877 | A1 | 7/2016 | Rooney et al. |
| 2018/0310494 | A1 | 11/2018 | Shani et al. |
| 2020/0154654 | A1 | 5/2020 | Shani et al. |
| 2020/0359578 | A1 | 11/2020 | Shani et al. |

FOREIGN PATENT DOCUMENTS

| | | |
|---|---|---|
| CN | 2805356 | 8/2006 |
| CN | 201446021 | 5/2010 |
| CN | 201579137 | 9/2010 |
| CN | 102665390 | 9/2012 |
| CN | 202410861 | 9/2012 |
| CN | 203044192 | 7/2013 |
| CN | 104060645 | 9/2014 |
| EP | 1269012 | 1/2003 |
| EP | 1568271 | 8/2005 |
| JP | 06-303858 | 11/1994 |
| KR | 10-2000-0061017 | 10/2000 |
| KR | 10-2013-0078077 | 7/2013 |
| UA | 1131 | 1/2002 |
| UA | 75357 | 11/2012 |
| WO | WO 98/02251 | 1/1998 |
| WO | WO 2017/191640 | 11/2017 |
| WO | WO 2019/092717 | 5/2019 |

OTHER PUBLICATIONS

Communication Pursuant to Article 94(3) EPC dated Dec. 2, 2021 From the European Patent Office Re. Application No. 17792612.8. (8 Pages).

Decision of Rejection dated Nov. 22, 2021 From the State Intellectual Property Office of the People's Republic of China Re. Application No. 201780003146.3. (5 Pages).

English Summary dated Dec. 6, 2022 of Notification of Office Action and Search Report Dated Nov. 17, 2022 From the State Intellectual Property Office of the People's Republic of China Re. Application No. 202210214532.X. (5 Pages).

English Translation Dated Mar. 30, 2022 of Notification of Office Action and Search Report dated Mar. 15, 2022 From the State Intellectual Property Office of the People's Republic of China Re. Application No. 201880085853.6. (13 Pages).

European Search Report and the European Search Opinion dated Feb. 10, 2023 From the European Patent Office Re. Application No. 22204527.0. (9 Pages).

Examination Report dated Nov. 7, 2019 From the National Intellectual Property Office of Sri Lanka Re. Application No. 20214. (1 Page).

Examination Report dated Jul. 13, 2021 From the Servico Publico Federal, Ministerio da Economia, Instituto Nacional da Propriedade Industrial do Brasil RE Application No. BR11 2018 072722 9 and its English Translation. (11 Pages).

Examination Report dated Jan. 17, 2023 From the Instituto Mexicano de la Propiedad Industrial, Secretaria de Economia, Direccion Divisional de Patentes Re. Application No. MX/a/2018/006461 and Its Translation Into English. (10 Pages).

Examination Report dated Sep. 17, 2019 From the Ministerio de Economia, Fomento y Turismo, INAPI, Gobierno de Chile Re. Application No. 201803133 and Its Translation Into English. (16 Pages).

Examination Report dated Jan. 20, 2021 From the Kementerian Hukum Dan Hak Asasi Manusia, Direktorat Jenderal Kekayaan Intelektual, Republik Indonesia [Ministry of Law and Human Rights, Directorate General of Intellectual Property Rights, Republic of Indonesia] Re. Application No. PID201809727 and Its Translation Into English. (4 Pages).

Examination Report dated Jan. 24, 2022 From the National Intellectual Property Office of Sri Lanka Re. Application No. 20214. (1 Page).

Examination Report dated Feb. 28, 2023 from the Ministry of Science and Technology, The National Office of Intellectual Property, NOIP of the Socialist Republic of Vietnam Re. 1-2018-05058 and Its Translation into English.(3 pages).

Examination Report Under Sections 12 & 13 of the Patents Act, 1970 and the Patents Rules, 2003 dated Jan. 18, 2021 From the Government of India, Intellectual Property India, Patents, Designs, Trade Marks, Geographical Indications, The Patent Office Re. Application No. 201837005278. (7 Pages).

Examination Report Under Sections 12 & 13 of the Patents Act, 1970 and the Patents Rules, 2003 dated Feb. 28, 2022 From the Government of India, Intellectual Property India, Patents, Designs, Trade Marks, Geographical Indications, The Patent Office Re. Application No. 202027023112. (6 Pages).

Expert Opinion and Search Report dated Mar. 9, 2021 From the Ministerio de Economia, Fomento y Turismo, Instituto Nacional de Propiedad Industrial, INAPI, Gobierno de Chile Re. Application No. 01436-2020 and its English Translation. (23 Pages).

Expert Opinion and Search Report dated Nov. 26, 2021 From the Ministerio de Economia, Fomento y Turismo, Instituto Nacional de Propiedad Industrial, INAPI, Gobierno de Chile Re. Application No. 01436-2020 and its English Translation. (26 Pages).

Final Official Action dated Mar. 11, 2022 from US Patent and Trademark Office Re. U.S. Appl. No. 16/774,055. (66 pages).

Final Official Action dated Dec. 28, 2022 from US Patent and Trademark Office Re. U.S. Appl. No. 16/774,055. (32 pages).

Grounds of Reason of Rejection dated Jan. 12, 2022 From the Korean Intellectual Property Office Re. Application No. 10-2018-7035293. (10 Pages).

Informe Requisito de Fondo [Substantive Requirement Report] dated May 13, 2022 From the Instituto Mexicano de la Propiedad Industrial, IMPI, Secretaria de Economia, Direccion Divisional de Patentes Re. Application No. MX/a/2018/006461 and Its Translation Into English. (10 Pages).

International Preliminary Report on Patentability dated Nov. 15, 2018 From the International Bureau of WIPO Re. Application No. PCT/IL2017/050494. (8 Pages).

International Preliminary Report on Patentability dated May 22, 2020 From the International Bureau of WIPO Re. Application No. PCT/IL2018/051207. (12 Pages).

International Search Report and the Written Opinion dated Aug. 14, 2017 From the International Searching Authority Re. Application No. PCT/IL2017/050494. (13 Pages).

International Search Report and the Written Opinion dated Feb. 21, 2019 From the International Searching Authority Re. Application No. PCT/IL2018/051207. (17 Pages).

Notice of Allowance dated Oct. 12, 2022 From the US Patent and Trademark Office Re. U.S. Appl. No. 16/762,157. (8 Pages).

Notice of Eligibility for Grant and Examination Report dated May 24, 2022 From the Intellectual Property Office of Singapore, IPOS Re. Application No. 11201809750U. (5 Pages).

Notice of Reason(s) for Rejection dated Apr. 9, 2021 From the Japan Patent Office Re. Application No. 2019-510498 and Its Translation Into English. (6 Pages).

Notice of Submission of Opinions dated Aug. 29, 2022 From the Korean Intellectual Property Office, KIPO Re. Application No. 10-2018-7035293. (9 Pages).

Notification About Necessity to Submit Additional Materials dated Jun. 11, 2020 From The Eurasian Patent Organization, Eurasian Patent Office Re. Application No. 201891078 and Its Translation Into English. (4 Pages).

(56) References Cited

OTHER PUBLICATIONS

Notification About Necessity to Submit Additional Materials dated Nov. 22, 2018 From The Eurasian Patent Organization, Eurasian Patent Office Re. Application No. 201891078 and Its Translation Into English. (4 Pages).
Notification of Decision to Grant or Register (Rule 18(4); Instruction 52) dated Oct. 17, 2022 From the African Regional Intellectual Property Organization (ARIPO), Re Application No. AP/P/2018/011148. (6 Pages).
Notification of Non-Compliance with Substantive Requriements and Inviation to Submit Observations and/Or Amended Application (Rule 18(3); Instructions 50(2)) Dated Jul. 26, 2021 From the African Regional Intellectual Property Organization (ARIPO), Re Application No. AP/P/2018/011148. (6 Pages).
Notification of Office Action and Search Report dated Jul. 8, 2021 From the State Intellectual Property Office of the People's Republic of China Re. Application No. 201880085853.6. (12 Pages).
Notification of Office Action and Search Report dated Oct. 12, 2020 From the State Intellectual Property Office of the People's Republic of China Re. Application No. 201780003146.3 and Its Translation of Office Action Into English. (14 Pages).
Notification of Office Action and Search Report dated Mar. 15, 2022 From the State Intellectual Property Office of the People's Republic of China Re. Application No. 201880085853.6.
Notification of Office Action and Search Report dated Nov. 17, 2022 From the State Intellectual Property Office of the People's Republic of China Re. Application No. 202210214532.X. (8 Pages).
Notification of Office Action and Search Report dated Jun. 18, 2021 From the State Intellectual Property Office of the People's Republic of China Re. Application No. 201780003146.3. (11 Pages).
Notification of Office Action and Search Report dated Nov. 22, 2019 From the State Intellectual Property Office of the People's Republic of China Re. Application No. 201780003146.3 and Its Translation of Office Action Into English. (14 Pages).
Notification of Office Action dated Oct. 9, 2022 From the State Intellectual Property Office of the People's Republic of China Re. Application No. 201880085853.6 and its Summary in English. (15 Pages).
Office Action dated Jun. 9, 2022 From the Israel Patent Office Re. Application No. 274506. (7 Pages).
Office Action dated Jul. 12, 2018 From the Israel Patent Office Re. Application No. 258136 and Its Translation Into English. (5 Pages).
Office Action dated Feb. 16, 2022 From the Agency on Intellectuel Property Republic of Uzbekistan Re. Application No. 20180580 and its Translation into English. (6 Pages).
Office Action dated Aug. 24, 2020 From the Israel Patent Office Re. Application No. 265247 and Its Translation Into English. (6 Pages).
Official Action dated Aug. 4, 2022 from US Patent and Trademark Office Re. U.S. Appl. No. 16/762,157. (73 pages).
Official Action dated Jun. 16, 2022 from US Patent and Trademark Office Re. U.S. Appl. No. 16/774,055. (11 pages).
Official Action dated May 24, 2019 From the US Patent and Trademark Office Re. U.S. Appl. No. 15/770,761. (24 pages).
Patent Examination Report dated Nov. 18, 2021 From the Australian Government, IP Australia Re. Application No. 2017260883. (4 Pages).
Preliminary Conclusion (Request) of a Formal Examination dated Aug. 15, 2022 From the National Authority of Intellectual Property, State Enterprise, Ukrainian Institute of Intellectual Property, Ukrpatent Re. Application No. a 2022 01676 and Its Summary in English. (2 Pages).
Preliminary Conclusion of the Substantive Examination DatedDec. 21, 2021 From the National Authority of Intellectual Property, State Enterprise, Ukrainian Institute of Intellectual Property, Ukrpatent Re. Application No. a 2018 11248. (9 Pages).
Reporte de Búsqueda y Examen de Patentabilidad [Search and Examination Report] dated Sep. 23, 2022 From the Instituto Nacional de Defensa de la Competencia y de la Protección de la Propiedad Intelectual, INDECOPI, Direccion de Invenciones y Nuevas Tecnologías de Peru Re. Application No. 002299-2018/DIN and Its Translation Into English. (11 Pages).
Request for Examination date May 26, 2021 From the (ROSPATENT), Federal Government Institution of Industrial Property of the Federal Service of Intellectual Property, Patents and Trademark of the Russian Federation Re. Application No. 201891078 and Its Translation Into English. (3 Pages).
Resolucion de Notificacion de la Respuesta Pericial (Ley Nueva) y Informe de Busqueda [Resolution of Notification of the Expert's Reply (New Law) and Search Report dated May 20, 2020 From the Ministerio de Economia, Fomento y Turismo, INAPI, Gobierno de Chile Re. Application No. 201803133 and Its Translation Into English. (22 Pages).
Restriction Official Action dated Dec. 3, 2021 from US Patent and Trademark Office Re. U.S. Appl. No. 16/774,055. (8 pages).
Restriction Official Action dated Mar. 18, 2022 from US Patent and Trademark Office Re. U.S. Appl. No. 16/762,157. (8 pages).
Restriction Official Action dated Mar. 22, 2019 From the US Patent and Trademark Office Re. U.S. Appl. No. 15/770,761. (8 pages).
Search Report and Written Opinion dated Jun. 18, 2021 From the Intellectual Property Office of Singapore, IPOS Re. Application No. 11201809750U. (8 Pages).
Search Report and Written Opinion dated Sep. 30, 2019 From the Intellectual Property Office of Singapore, IPOS Re. Application No. 11201809750U. (11 Pages).
Substantive Examination Report dated Jun. 3, 2022 From the Intellectual Property Office of the Philipines, Buerau of Patens Re. Application No. Jan. 2018/502312. (4 Pages).
Supplementary European Search Reort and the European Search Opinion dated Jun. 24, 2021 From the European Patent Office Re. Application No. 18875978.1. (9 Pages).
Supplementary European Search Report and the European Search Opinion dated Dec. 14, 2018 From the European Patent Office Re. Application No. 17792612.8. (15 Pages).
Supplementary Partial European Search Report and the European Provisional Opinion dated Sep. 12, 2018 From the European Patent Office Re. Application No. 17792612.8. (16 Pages).
Supplementary Search Report dated Mar. 2, 2020 From the Intellectual Property Office of Singapore, IPOS Re. Application No. 11201809750U. (3 Pages).
Translation dated Jan. 9, 2022 of Decision of Rejection dated Nov. 22, 2021 From the State Intellectual Property Office of the People's Republic of China Re. Application No. 201780003146.3. (15 Pages).
Translation dated Jan. 17, 2022 of Preliminary Conclusion of the Substantive Examination dated Dec. 21, 2021 From the National Authority of Intellectual Property, State Enterprise, Ukrainian Institute of Intellectual Property, Ukrpatent Re. Application No. a 2018 11248. (9 Pages).
Translation dated Jul. 20, 2021 of Notification of Office Action dated Jun. 18, 2021 From the State Intellectual Property Office of the People's Republic of China Re. Application No. 201780003146.3. (17 Pages).
Translation dated Sep. 22, 2022 of Grounds of Reason of Rejection dated Aug. 29, 2022 From the Korean Intellectual Property Office Re. Application No. 10-2018-7035293. (13 Pages).
Translation dated Jan. 28, 2022 of Grounds of Reason of Rejection dated Jan. 12, 2022 From the Korean Intellectual Property Office Re. Application No. 10-2018-7035293. (11 Pages).
Translation dated Jul. 28, 2021 of Notification of Office Action dated Jul. 8, 2021 From the State Intellectual Property Office of the People's Republic of China Re. Application No. 201880085853.6. (14 Pages).
Written Opinion dated Aug. 14, 2020 From the Intellectual Property Office of Singapore, IPOS Re. Application No. 11201809750U. (8 Pages).
Communication Pursuant to Article 94(3) EPC dated Apr. 19, 2023 From the European Patent Office Re. Application No. 18875978.1 (9 Pages).
Official Action dated Jul. 26, 2023 from the US Patent and Trademark Office Re. U.S. Appl. No. 16/774,055. (21 pages).

(56) References Cited

OTHER PUBLICATIONS

Examination Report Dated Nov. 10, 2023 From the Australian Government, IP Australia Re. Application No. 2018364795. (3 Pages).
Hearing Notice Dated Dec. 6, 2023 From the Government of India, Intellectual Property India, The Patent Office Re. Application No. 202027023112. (2 Pages).
Examination Report Dated Feb. 1, 2024 From the Instituto Mexicano de la Propiedad Industrial, Secretaria de Economia, Direccion Divisional de Patentes Re. Application No. MX/a/2018/006461 and Its Translation Into English. (8 Pages).
Official Action Dated Jan. 5, 2024 from the US Patent and Trademark Office Re. U.S. Appl. No. 16/774,055. (14 pages).

* cited by examiner

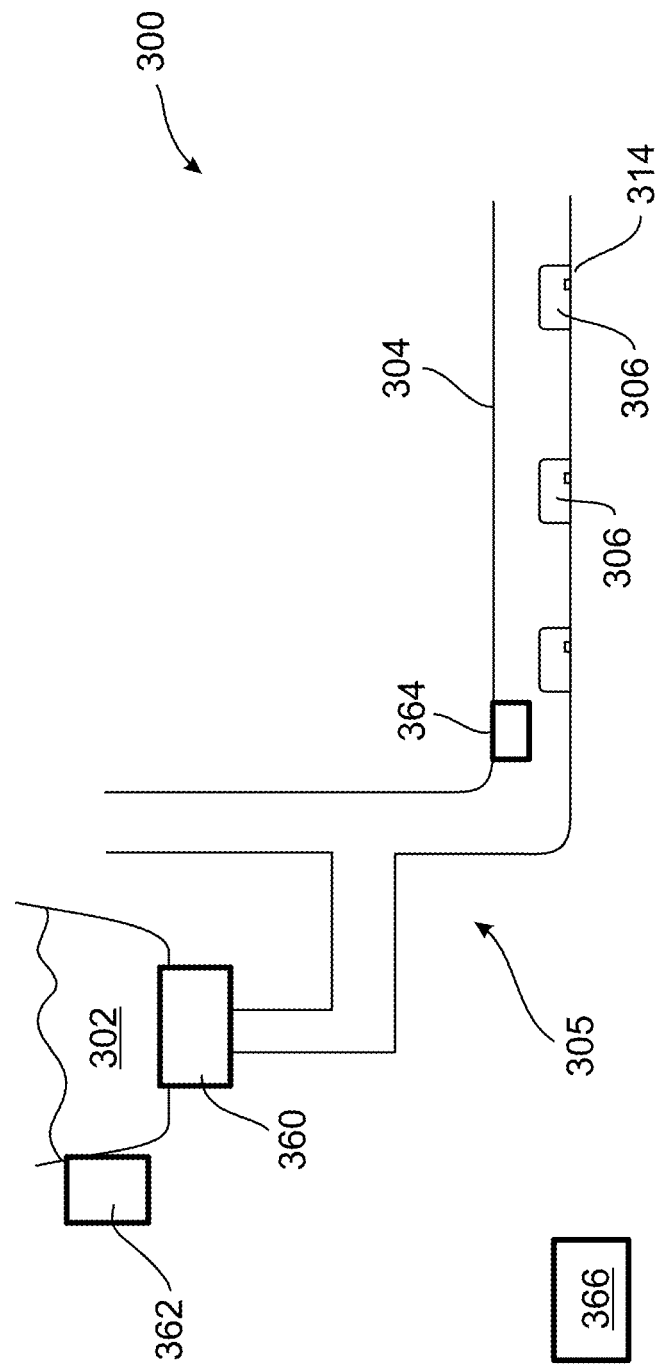

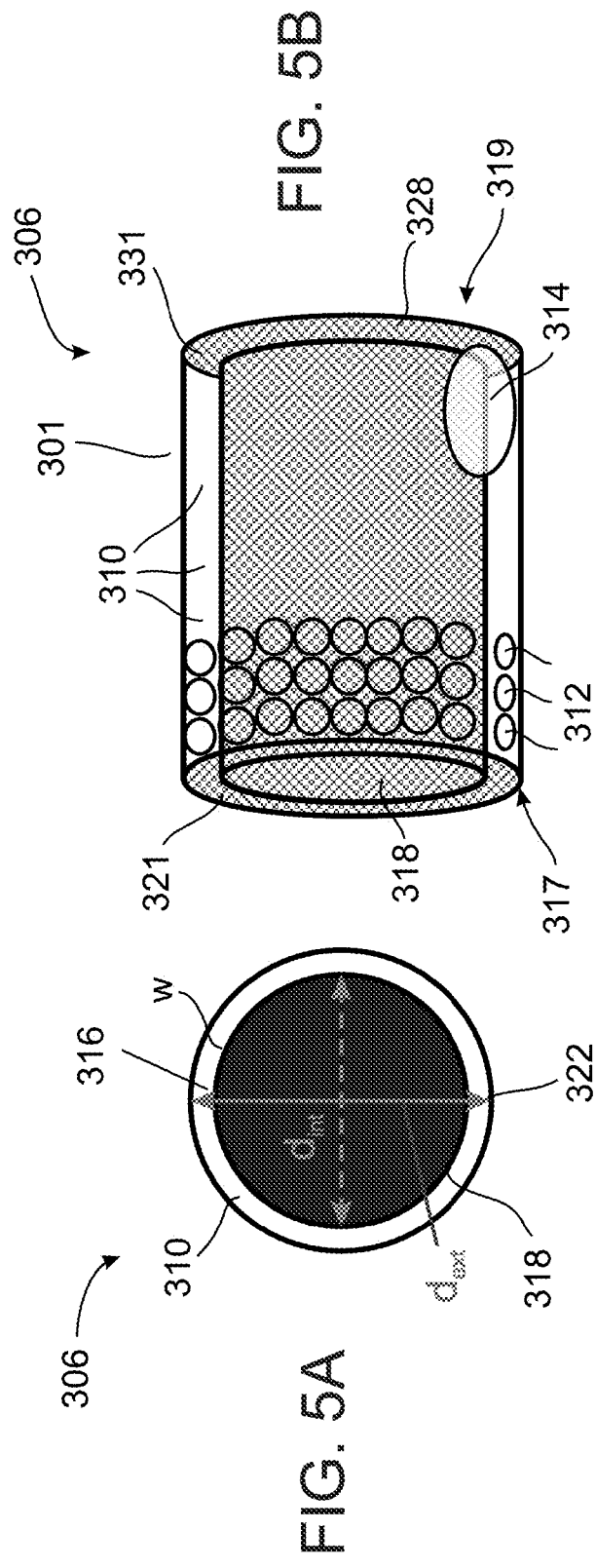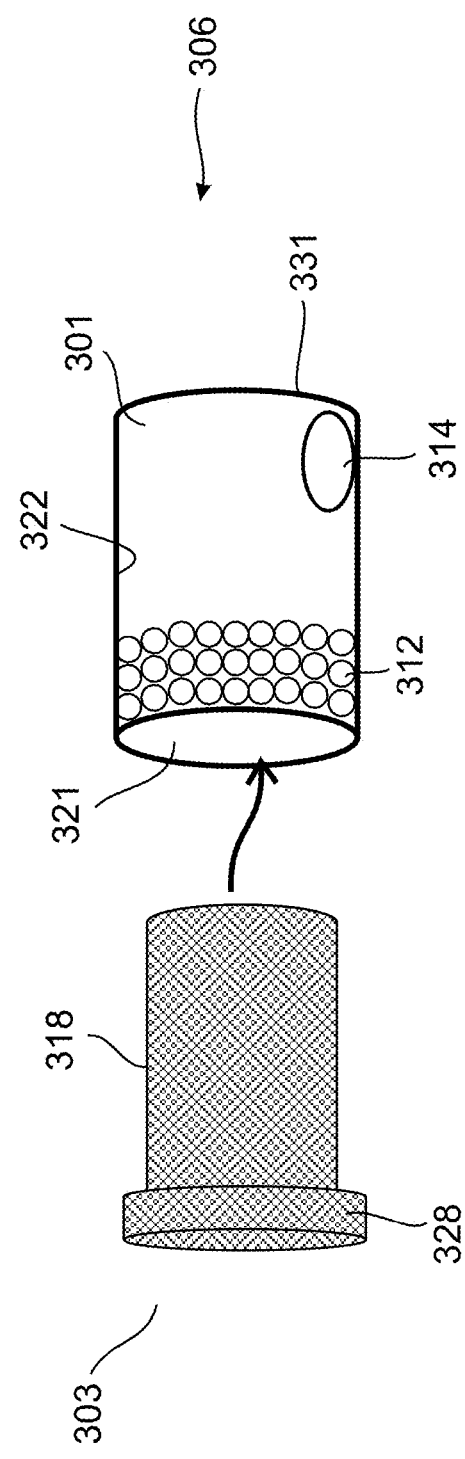

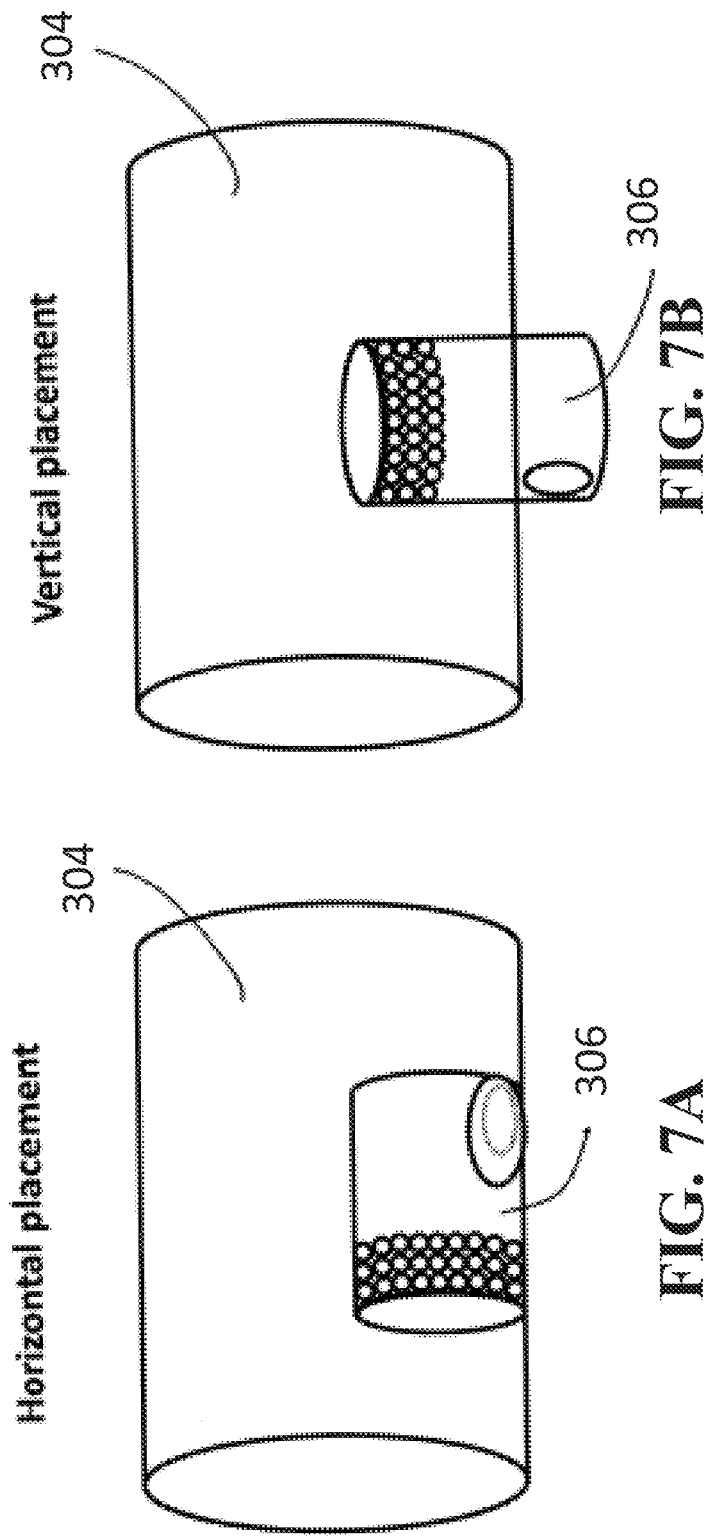

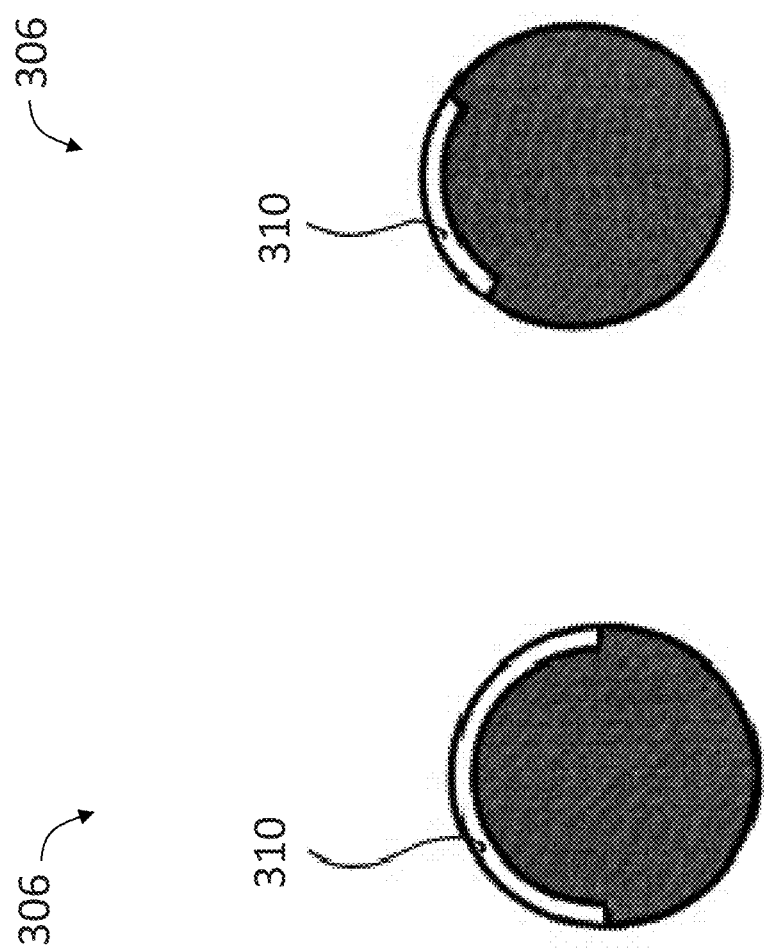

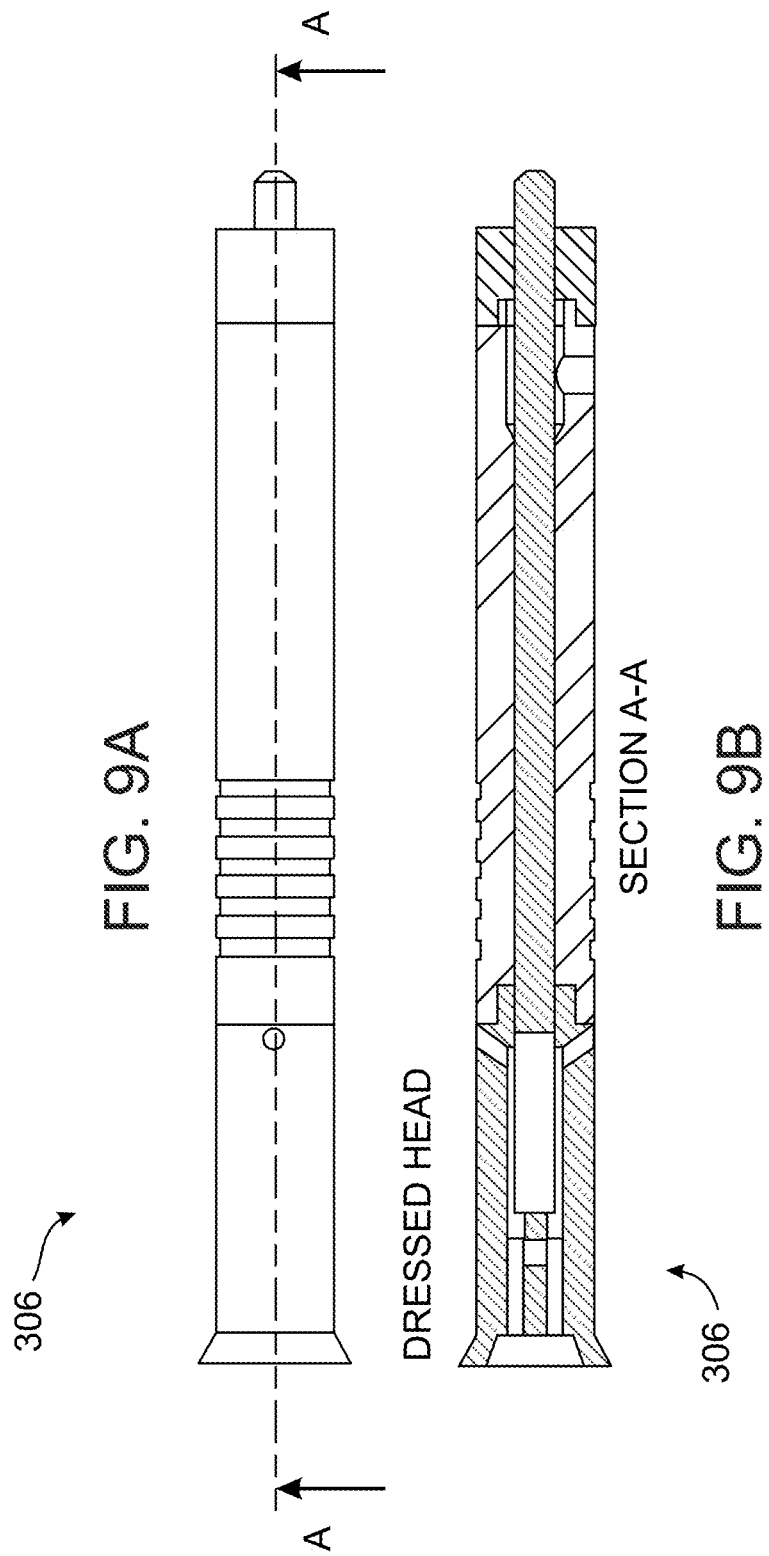

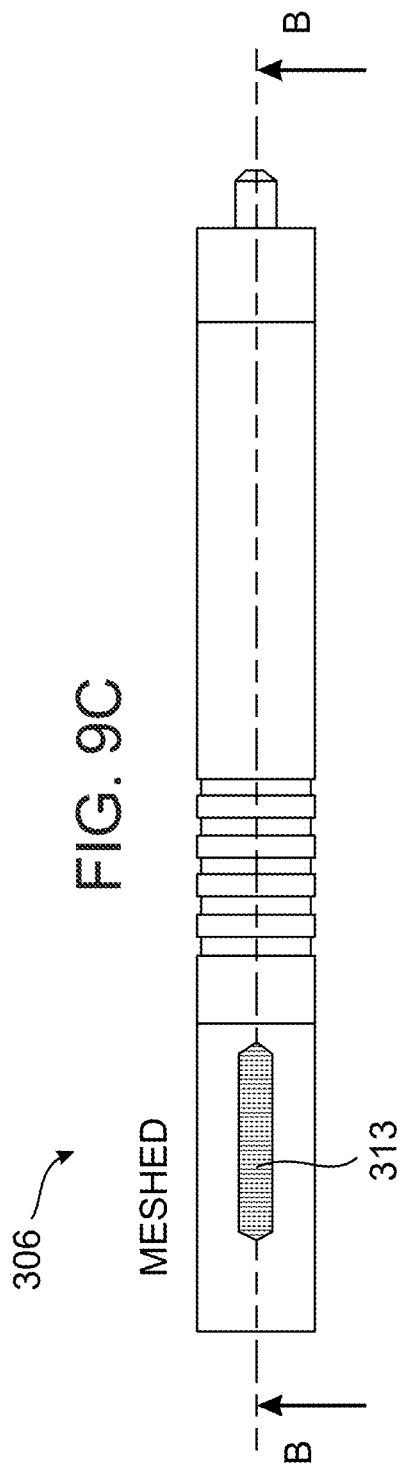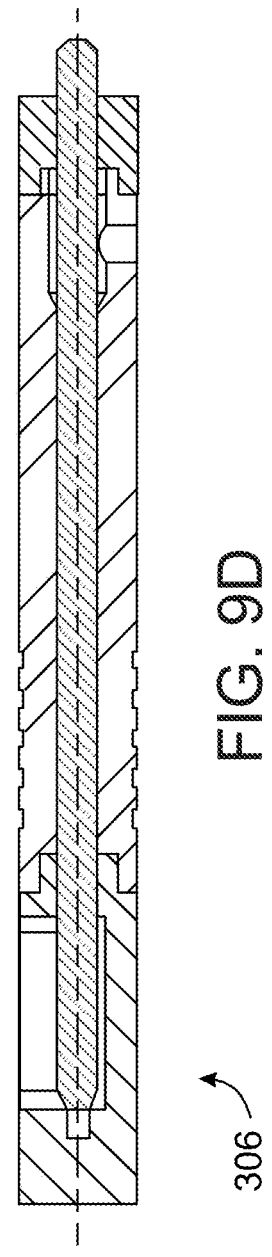

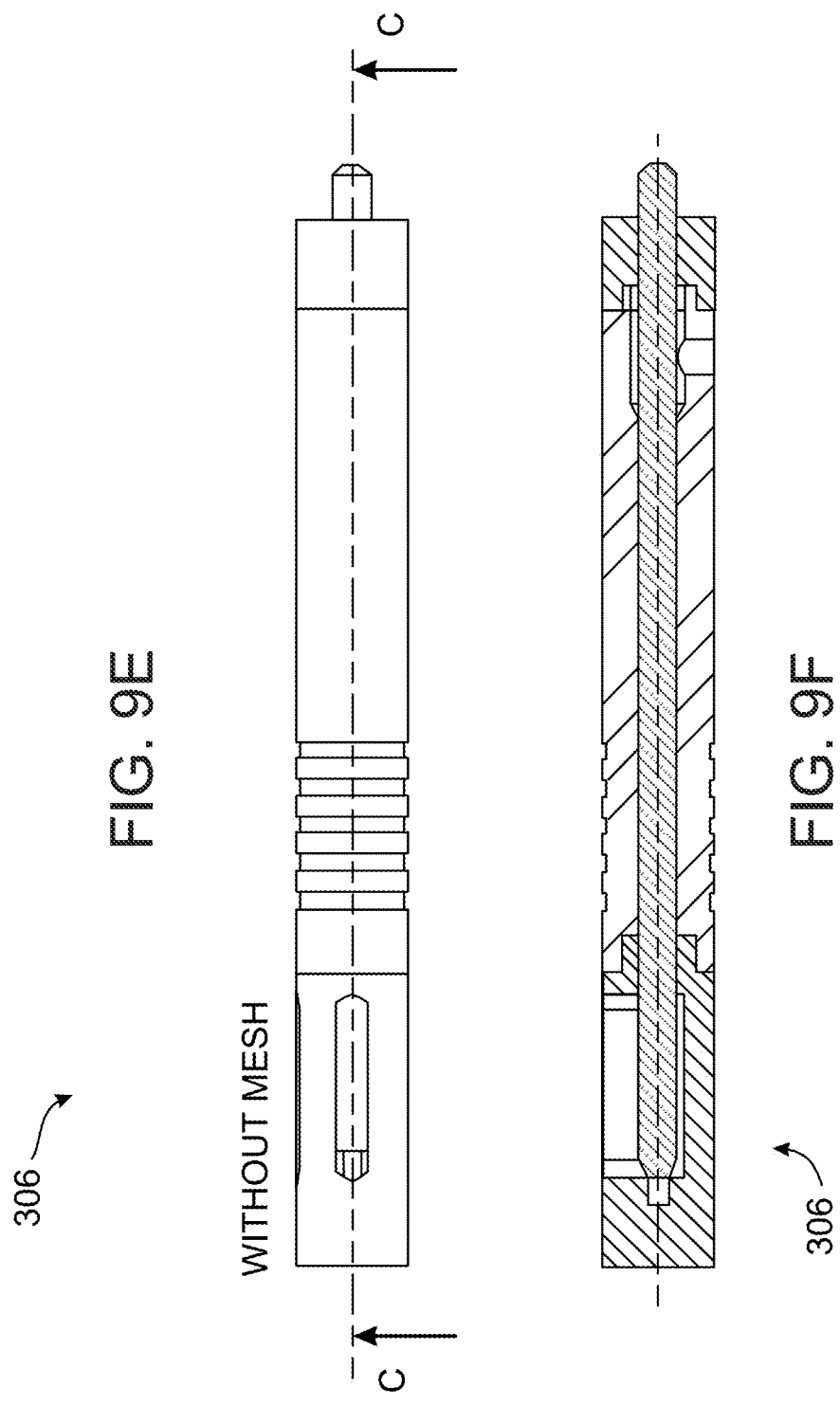

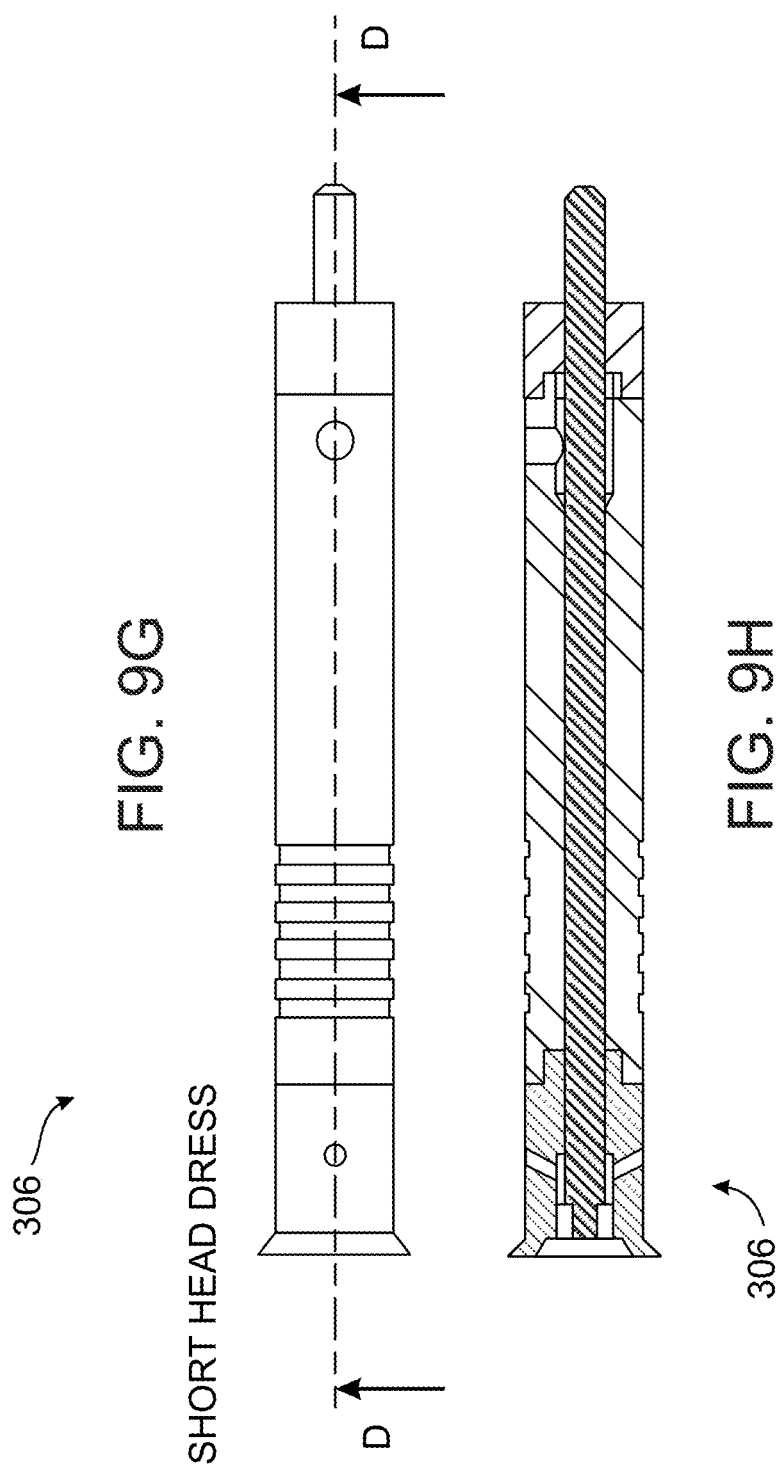

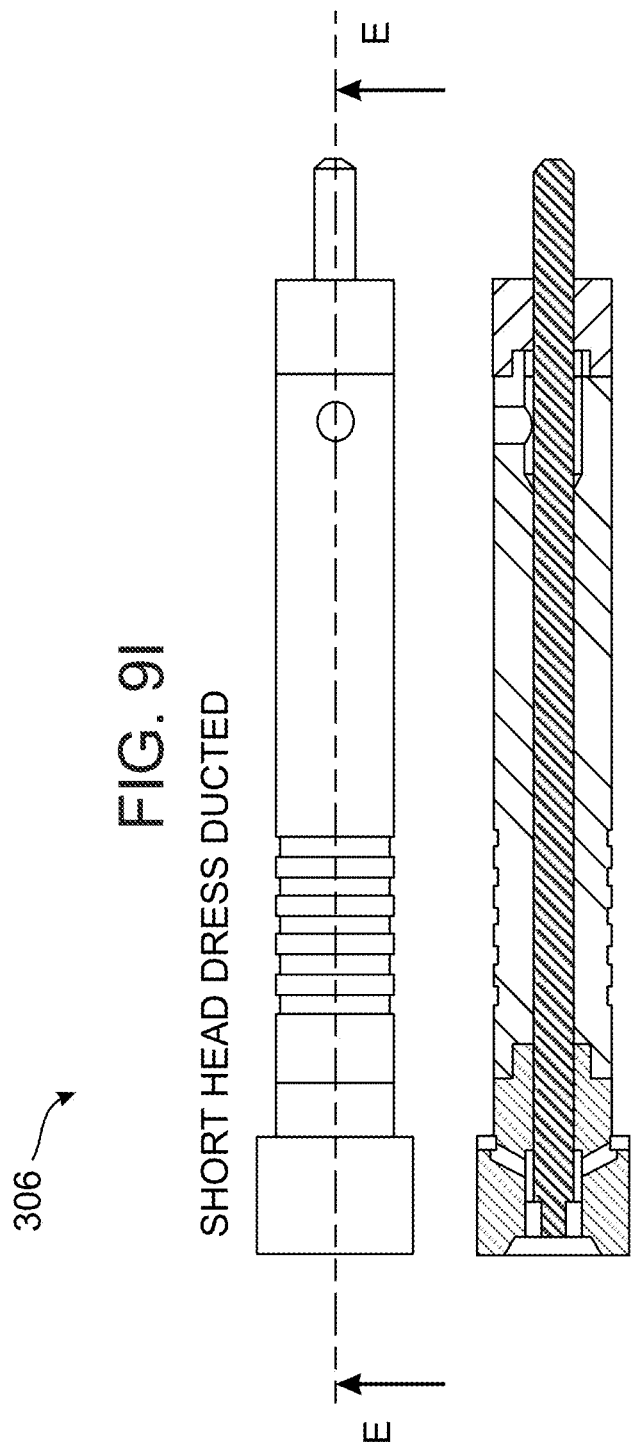

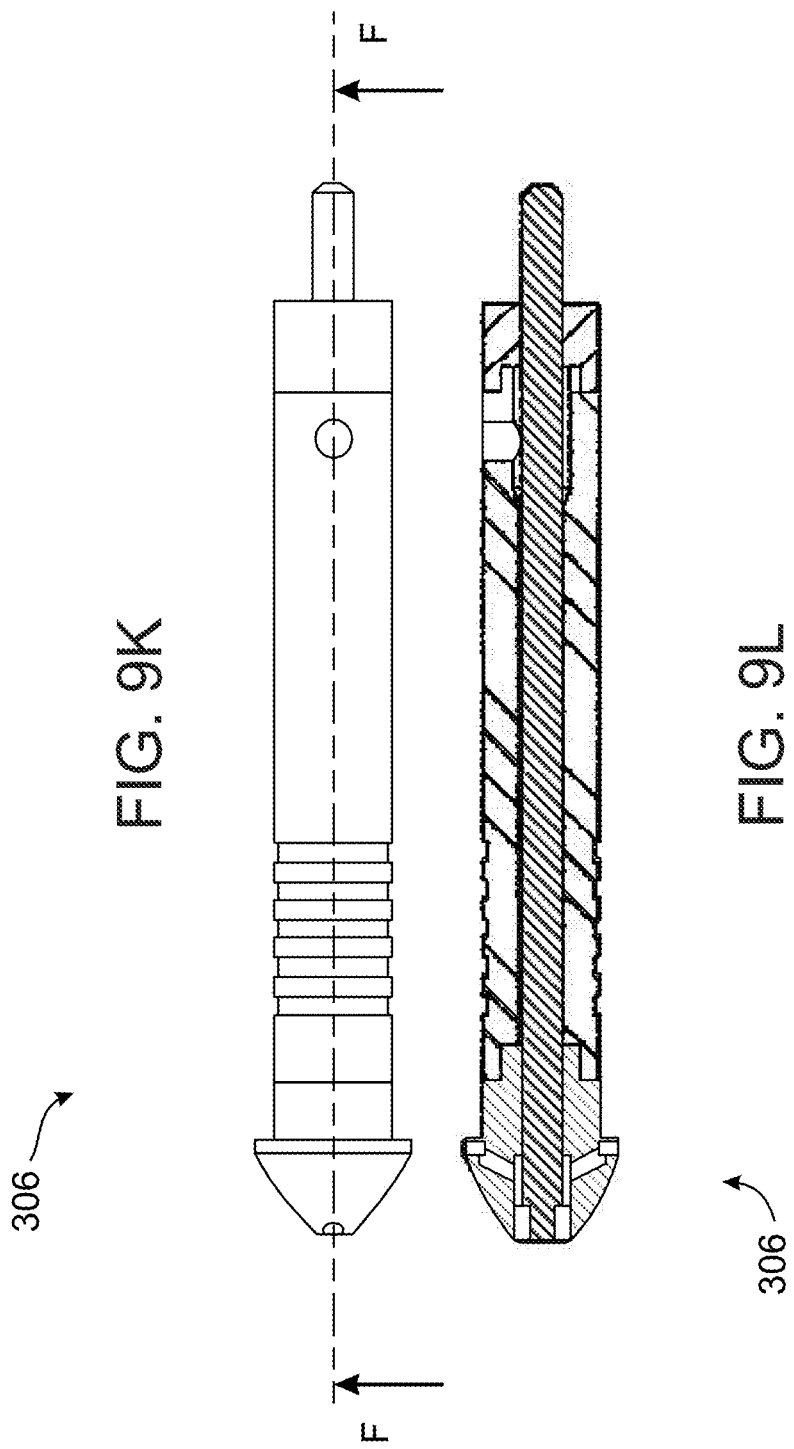

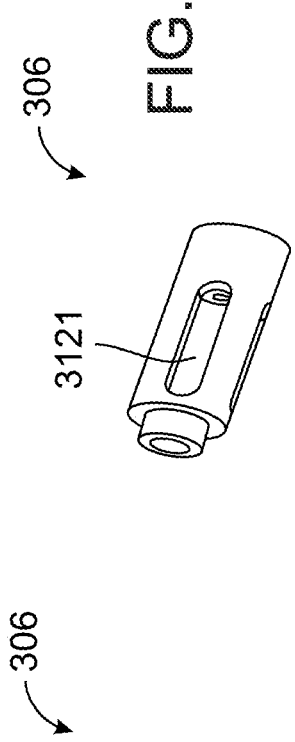
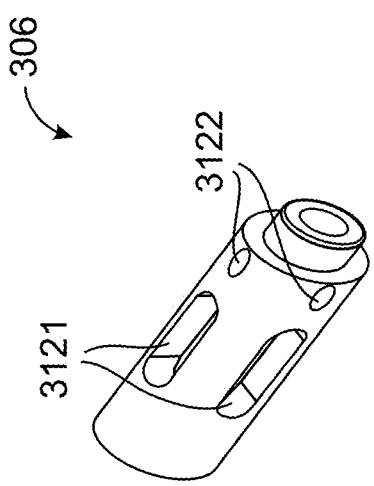
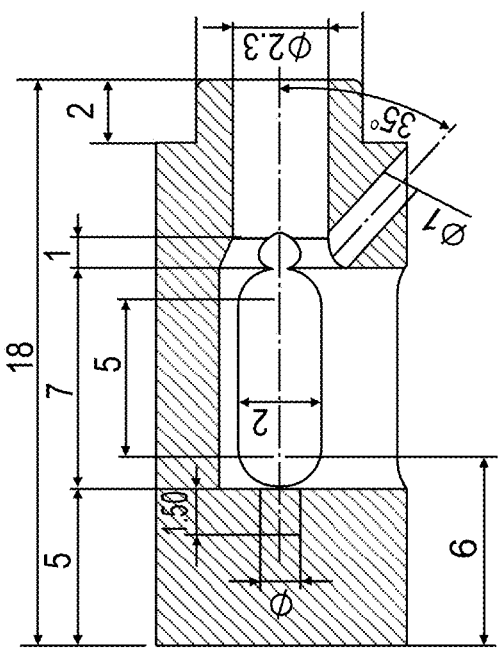
FIG. 10A
FIG. 10B
FIG. 10C
FIG. 10D

| ITEM NO. | PART NUMBER | DESCRIPTION | QTY. |
|---|---|---|---|
| 1 | ONE MODULE-3-8-17 | NDRIP HEAD | 1 |
| 2 | INNER ROD | INNER ROD 41 mm | 1 |

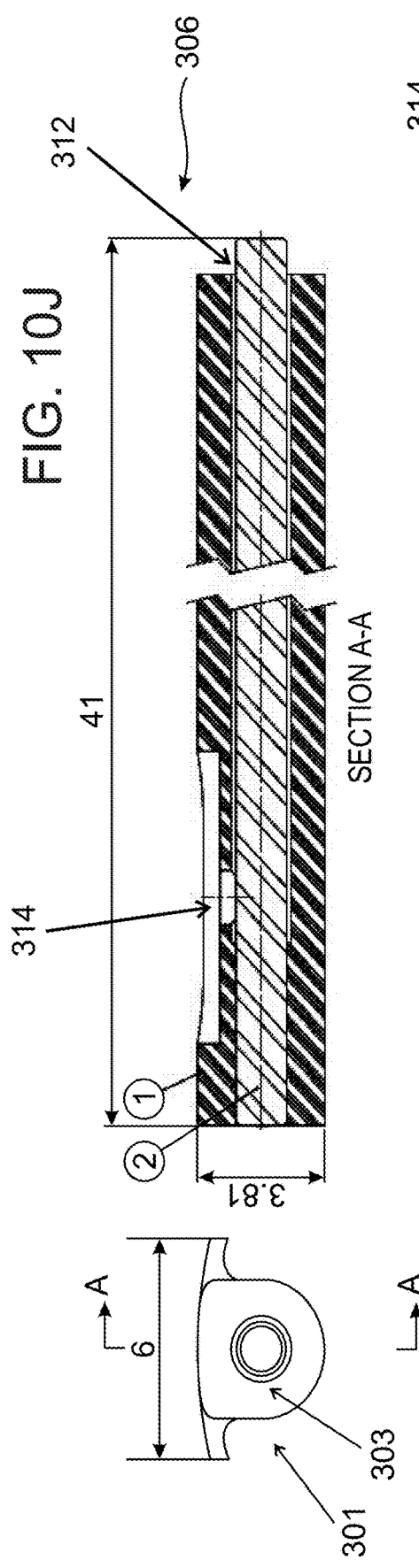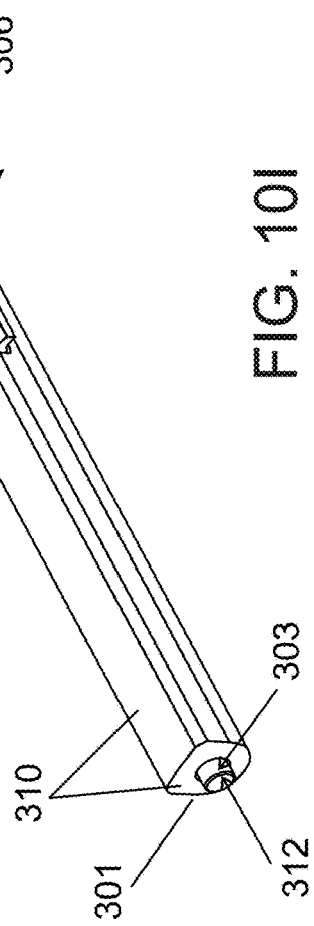

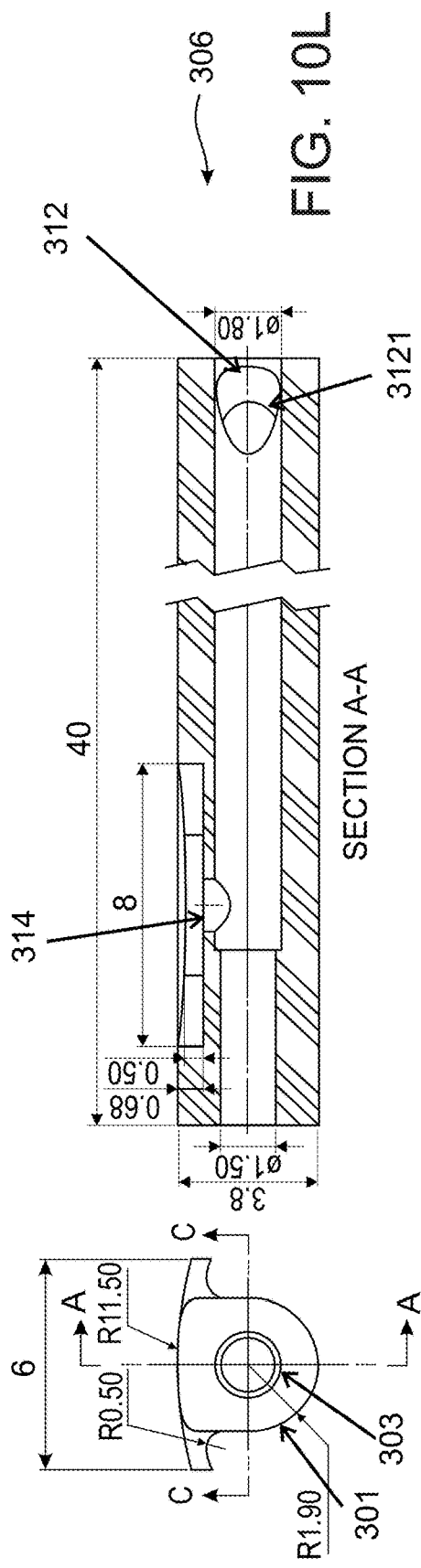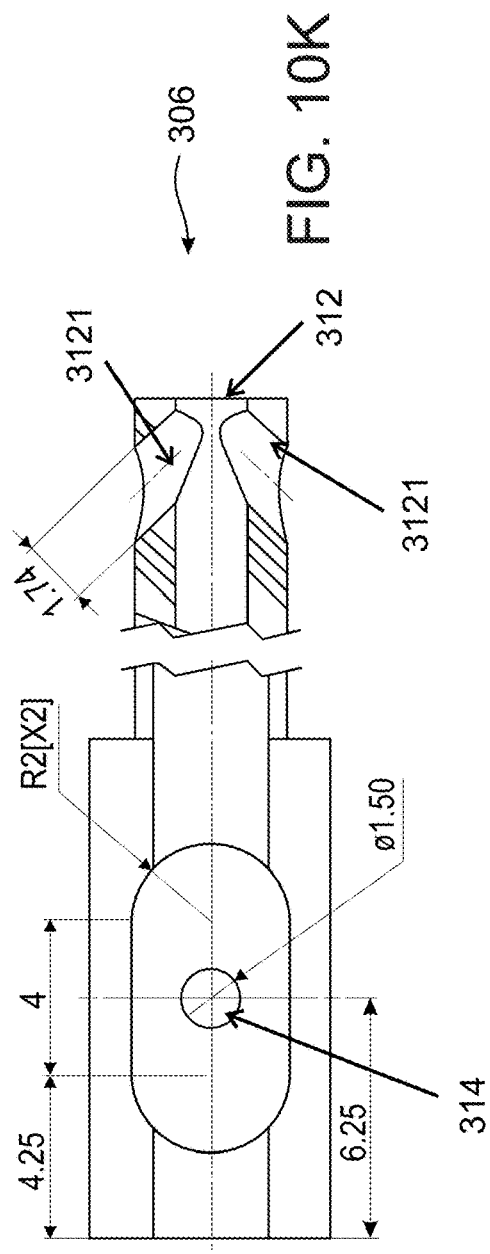
FIG. 10L
FIG. 10K
NOTE:
ALL MISSING DIMENTIONS FROM 3D MODEL

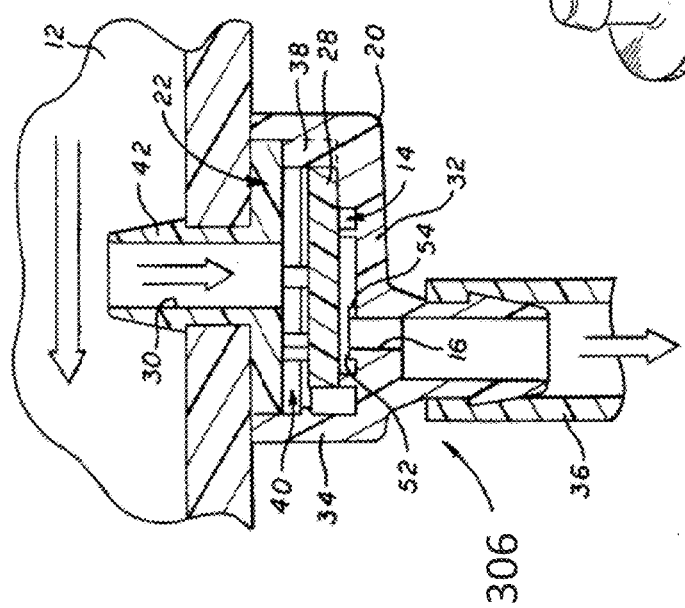
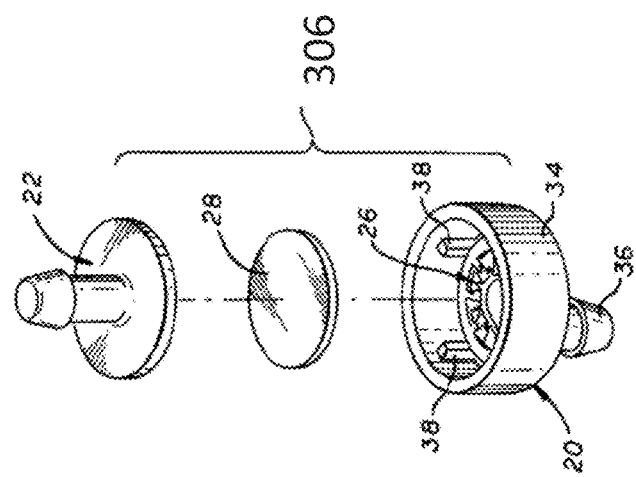
FIG. 12A
FIG. 12B

METHODS AND SYSTEMS FOR IRRIGATION AT STABILIZED PRESSURE

RELATED APPLICATIONS

This application is Division of U.S. patent application Ser. No. 16/762,157, filed on May 7, 2020, which is a National Phase of PCT Patent Application No. PCT/IL2018/051207 having International Filing Date of Nov. 8, 2018, which claims the benefit of priority under 35 USC § 119(e) of U.S. Provisional Patent Application No. 62/583,060 filed on Nov. 8, 2017. The contents of the above applications are all incorporated by reference as if fully set forth herein in their entirety.

FIELD AND BACKGROUND OF THE INVENTION

The present invention, in some embodiments thereof, relates to irrigation and, more particularly, but not exclusively, to method and system for irrigation at stabilized water pressure.

Drip irrigation is a watering method that utilizes pressurized water sources and drips water along a distribution pipe in a controlled manner.

Drip irrigation systems are considered to be more efficient than surface irrigation systems that typically convey water to fields in open canals. Surface irrigation systems require smaller investment and lower energy costs, and these systems typically employ high discharge at the inlet in order to irrigate efficiently and uniformly across a field so that water will reach the end of the field.

SUMMARY OF THE INVENTION

According to an aspect of some embodiments of the present invention there is provided a method of irrigation. The method comprises supplying water to an inclined irrigation pipe provided with a plurality of drippers such that a pressure at a highest level of the inclined irrigation pipe is at most 200 cm $H_2O$. According to some embodiments of present invention the method comprises stabilizing water pressure within the inclined irrigation pipe by at least one water pressure stabilizer such that the water pressure varies along a length of the inclined irrigation pipe by no more than 50%.

According to some embodiments of the invention the water pressure is from about 5 cm $H_2O$ to about 150 cm $H_2O$ at a highest level of the inclined irrigation pipe.

According to some embodiments of the invention the water is supplied a water distribution conduit.

According to some embodiments of the invention the water pressure stabilizer is connected to the water distribution conduit.

According to some embodiments of the invention the water pressure stabilizer comprises a tank having an entry port, a water shutter controlling water entry through the port, and a float element operatively associated with the water shutter in a manner that a change in a vertical position of the float element effects a rotation of the water shutter.

According to some embodiments of the invention the at least one water pressure stabilizer comprise a container, a water inlet, a water outlet and a float element disposed within the container below the water inlet to block the water inlet when a height of water within the container reaches a predetermined level.

According to some embodiments of the invention at least a portion of the float element floats above a surface of the water within the container.

According to some embodiments of the invention the float element is submerged under a surface of the water within the container.

According to some embodiments of the invention the method comprises at least one pressure reducing device mounted on the inclined irrigation pipe.

According to some embodiments of the invention there is a plurality of pressure reducing devices mounted on the inclined irrigation pipe, wherein a number of the pressure reducing devices is less than a number of the drippers.

According to an aspect of some embodiments of the present invention there is provided a method of irrigation. The method comprises supplying water to an inclined irrigation pipe provided with a plurality of drippers such that a pressure at a highest level of the inclined irrigation pipe is at most 90 cm $H_2O$, wherein the water contains at least 70 mg per liter of total suspended solids when entering the drippers.

According to some embodiments of the invention the irrigation pipe has a length of at least 100 meters and diameter of at least 40 mm.

According to an aspect of some embodiments of the present invention there is provided a method of irrigation. The method comprises supplying water to an inclined irrigation pipe provided with a plurality of drippers such that a pressure at a highest level of the inclined irrigation pipe is at most 90 cm $H_2O$, wherein the irrigation pipe has a length of at least 100 meters and diameter of at least 40 mm.

According to some embodiments of the invention at least one of the drippers comprises a water pathway that is peripheral with respect to a body of the dripper, and that allows water to flow at a plurality of directions at any point along a length of the dripper.

According to some embodiments of the invention the water pathway has an annular cross section.

According to some embodiments of the invention the water pathway has a polygonal cross-section.

According to some embodiments of the invention the supplying the water is directly from a water source opened to an environment and is devoid of filtration.

According to some embodiments of the invention at least one of the plurality of drippers is characterized by a pressure-discharge dependence which comprises a linear relation between a discharge rate at an outlet of the dripper and an inlet pressure at an inlet of the dripper, for inlet pressure of from about 10 am $H_2O$ to about cm 200 $H_2O$.

According to some embodiments of the invention the linear relation is characterized by a coefficient of the inlet pressure which is from about 7 cubic centimeters per hour per cm $H_2O$ to about 40 cubic centimeters per hour per cm $H_2O$.

According to some embodiments of the invention the coefficient is from about 7 cubic centimeters per hour per cm $H_2O$ to about 20 cubic centimeters per hour per cm $H_2O$.

According to some embodiments of the invention the coefficient is from about 9 cubic centimeters per hour per cm $H_2O$ to about 12 cubic centimeters per hour per cm $H_2O$.

According to some embodiments of the invention the linear relation is characterized by an offset parameter from about 0 to about 50 cubic centimeters per hour.

According to some embodiments of the invention the offset parameter first coefficient is from about 10 cubic centimeters per hour to about 40 cubic centimeters per hour.

According to some embodiments of the invention the offset parameter is from about 20 cubic centimeters per hour to about 30 cubic centimeters per hour.

According to some embodiments of the invention the outlet is non-circular.

According to some embodiments of the invention the outlet comprises two or more laterally displaced round shapes connected to each other to form a figure-of-eight shape.

According to some embodiments of the invention the outlet has an area of from about 0.3 square millimeters to about 65 square millimeters.

According to some embodiments of the invention the outlet has an area of from about 0.3 square millimeters to about 70 square millimeters.

According to some embodiments of the invention the dripper comprises a niche formed in an external surface thereof, and wherein the outlet is formed within the niche.

According to some embodiments of the invention the niche is non-circular.

According to some embodiments of the invention the niche has an area that is at least 10 times larger than an area of the outlet.

According to some embodiments of the invention the number of drippers per meter length of the inclined irrigation pipe of from about 1 to about 5.

According to some embodiments of the invention the irrigation pipe is inclined at a slope that varies by no more than 20% along a length of the irrigation pipe.

According to some embodiments of the invention the irrigation pipe is inclined at a varying slope selected such that a discharge rate along a length of the inclined irrigation pipe varies by more than 20% but no more than 50%.

According to some embodiments of the invention for at least one pair of drippers in the pipe, a ratio between a value of the slope at a location of a first dripper of the pair and a value of the slope at a location of a second dripper of the pair, is equal or approximately equal to an nth power of a ratio between distances of a lowermost point of the pipe from the first and the second drippers of the pair, wherein the n is from about 1.5 to about 4.5.

According to some embodiments of the invention the irrigation pipe is placed on a ground inclined along a direction, and wherein at least a portion of the irrigation pipe is at an acute angle to the direction, such that a slope of the portion is less than a slope of the ground.

According to some embodiments of the invention at least one of the drippers is located at a periphery of the irrigation tube, within an upper half of a traverse cross-section of the periphery, but away from a topmost location of the periphery.

According to some embodiments of the invention at least one of the drippers is located at a periphery of the irrigation tube, within an upper half of a traverse cross-section of the periphery, but away from a topmost location of the periphery.

According to an aspect of some embodiments of the present invention there is provided an irrigation system, comprises: an inclined irrigation pipe having a plurality of drippers configured to discharge water; a water pressure stabilizer configured for stabilizing water pressure within the inclined irrigation pipe such that the water pressure varies along a length of the inclined irrigation pipe by no more than 50%; and a water supply system configured to deliver water to the inclined irrigation pipe at a highest level of the inclined irrigation pipe at a pressure of at most about 200 cm $H_2O$.

According to an aspect of some embodiments of the present invention there is provided an irrigation system, comprises: an inclined irrigation pipe having a plurality of drippers configured to discharge water; a water supply system configured to deliver water to the inclined irrigation pipe at a highest level of the inclined irrigation pipe at a pressure of at most about 90 cm $H_2O$; and a water pressure stabilizer configured for ensuring that water pressure within the inclined irrigation pipe is 50 cm $H_2O$ or less at any location along the inclined irrigation pipe.

According to some embodiments of the invention the water pressure stabilizer comprise a container, a water inlet, a water outlet and a float element disposed within the container below the water inlet to block the water inlet when a height of water within the container reaches a predetermined level.

According to some embodiments of the invention the system comprises a pressure reducing device mounted on the inclined irrigation pipe and configured to reduce water pressure in the inclined irrigation pipe.

According to some embodiments of the invention the pressure reducing device comprises a water pathway that is peripheral with respect to a body of the pressure reducing device, and that allows water to flow at a plurality of directions at any point along a length of the dripper.

According to some embodiments of the invention the water pathway has a transverse cross-section selected from the group consisting of an annulus and a polygon.

According to some embodiments of the invention the system comprises a water distribution conduit.

According to some embodiments of the invention the water supply system comprises at least one of: a water reservoir, a water tank and a pump.

According to some embodiments of the invention at least one of the drippers is located at a periphery of the irrigation tube, within an upper half of a traverse cross-section of the periphery, but away from a topmost location of the periphery.

According to an aspect of some embodiments of the present invention there is provided a water irrigation dripper. The water irrigation dripper comprises a single unitary element having an external structure enclosing an internal structure to form a generally straight water pathway surrounding the internal structure in a space between the structures, the water irrigation dripper having at least one water inlet for providing water to the pathway, and at least one water outlet on the external structure.

According to some embodiments of the invention dripper is characterized by a volumetric flow rate that varies non-linearly as a power of a pressure P at the inlet. According to some embodiments of the invention the power is less than 1. According to some embodiments of the invention the power is more than 0.8.

According to some embodiments of the invention a coefficient of the variation is between 0.1 and 90, when the volumetric flow rate is expressed in cubic cm per hour, and the pressure P is expressed in cm $H_2O$.

According to some embodiments of the invention the dripper comprises at least one additional water inlet, at an acute angle to the water pathway, to affect turbulence in the pathway.

According to some embodiments of the invention a length of the water pathway is from about 0.5 cm to about 10 cm.

According to some embodiments of the invention the length of the water pathway is from about 2 cm to about 5 cm.

According to some embodiments of the invention the length of the water pathway is from about 2 cm to about 4 cm.

According to an aspect of some embodiments of the present invention there is provided a water irrigation pipe system, comprises water irrigation pipe, and a plurality of drippers distributed along the water irrigation pipe and being configured to discharge water, wherein at least one of the drippers is located at a periphery of the irrigation tube, within an upper half of a traverse cross-section of the periphery, but away from a topmost location of the periphery.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A and 1B are schematic illustrations of an irrigation system, according to some embodiments of the present invention;

FIG. 5A is a cross-sectional illustration of the dripper in embodiments in which the assembled dripper has a plurality of holes;

FIG. 5B is a schematic illustration showing a perspective view of the assembled dripper in embodiments in which the assembled dripper has a plurality of holes;

FIG. 5C is schematic illustration showing an exploded view of an external hollow element (right side) and an internal element (left side), providing, when assembled together, a dripper according to some embodiments of the present invention;

FIGS. 7A and 7B are schematic illustrations of a horizontal (FIG. 7A) and a vertical (FIG. 7B) orientations of the dripper in a water supply conduit according to some embodiments of the present invention;

FIGS. 8A and 8B are cross-sectional illustrations of a partial water pathway inside the dripper, according to some embodiments of the present invention;

FIGS. 9A-9L are schematic illustrations showing cross-sectional views of several assembled drippers, according to some embodiments of the present invention;

FIG. 10A is a schematic illustration showing a perspective view of the assembled dripper in embodiments in which the assembled dripper has an elliptically shaped and water inlet comprising a filter;

FIG. 10B is a schematic illustration showing a perspective view of the assembled dripper in embodiments in which the assembled dripper has an elliptically shaped water inlet;

FIGS. 10C and 10D are schematic illustrations showing a cross sectional view (FIG. 10C) and a perspective side view (FIG. 10D) of the assembled dripper in embodiments in which the assembled dripper has an elliptically shaped water inlet and an additional water inlet oriented diagonally with respect to a normal to an outer surface of an external hollow element;

FIGS. 10I-10J are schematic illustrations showing a perspective view and a cross sectional view of the dripper in embodiments of the invention in which the dripper is devoid of additional openings on its outer surface;

FIGS. 10K-10L are schematic illustrations showing a perspective view and a cross sectional view of the dripper in embodiments of the invention in which the dripper includes two openings on its outer surface;

FIGS. 12A and 12B are schematic illustrations of another type of dripper which can be used according embodiments of the invention;

Figure 1B:
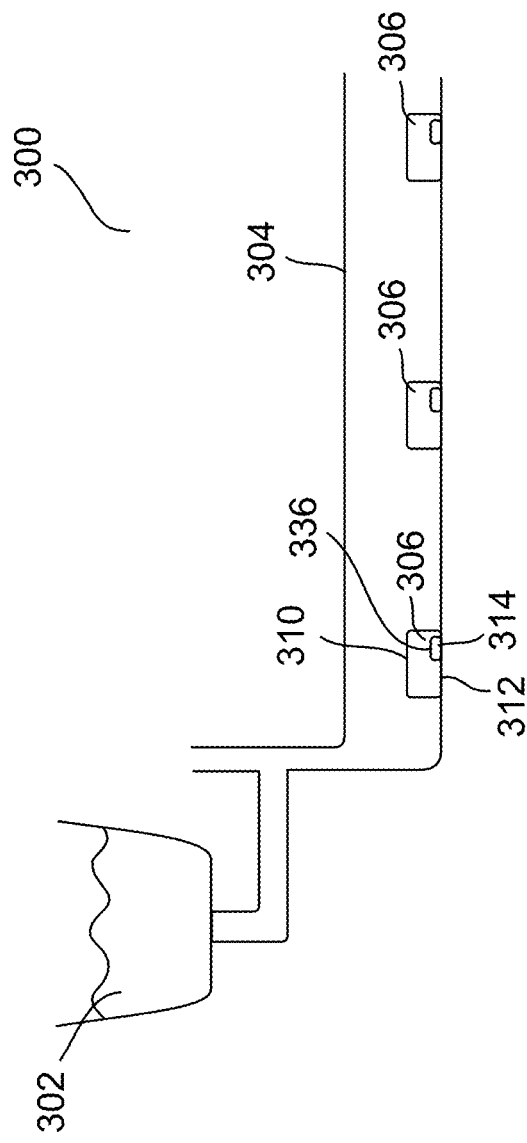

It is appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF SPECIFIC EMBODIMENTS OF THE INVENTION

The present invention, in some embodiments thereof, relates to irrigation and, more particularly, but not exclusively, to method and system for irrigation at stabilized water pressure.

The inventors found that traditional drippers may clog when particles accumulate therein, and that this requires constant supervision and inspection of the irrigation field and may increase the operating expenditure. For example, drippers having a generally zigzag shaped water pathway decrease the velocity of the water passing therethrough. The zigzag-shaped pathway may create turbulence, which, in turn, causes energy loss.

The inventors further found that reducing the operating pressure can reduce or eliminate the need for a pump, which, in turn, can reduce energy costs.

The inventors of the present invention have therefore devised a system that is capable of providing drip irrigation at relatively low pressure, and that can, in some embodiments of the invention, use natural water for the irrigation, optionally and preferably without using any filtration. This is advantageous over commercially available drip irrigation systems that mandate use of filters and further mandate use of very high pressure (at least 300 cm $H_2O$ and oftentimes much higher pressures), in order to prevent clogging of the drippers. Drip irrigation using natural water and without filtration is advantageous since drip irrigation uses less water than surface irrigation, since natural water, unlike processed water, are oftentimes readily available close to the field, and since use of filters is cumbersome and increases the maintenance load on the operator (e.g., the need to repeatedly replace or clean the filter).

As demonstrated in the Examples section that follows (see FIGS. 23A and 23B), the system of the present embodiments can provide drip irrigation without clogging even for water that contains large amount of suspended solids and that is considered water of very low quality.

FIGS. 1A and 1B are schematic illustrations of an irrigation system 300, in accordance with some embodiments of the present invention. In various exemplary embodiments of the invention irrigation system 300 operates at a low water pressure, e.g., less than 0.1 bar, more preferably from about 5 mbar to about 90 mbar, more preferably from about 5 mbar to about 80 mbar, more preferably from about 5 mbar to about 70 mbar, more preferably from about 5 mbar to about 60 mbar, more preferably from about 5 mbar to about 50 mbar, more preferably from about 5 mbar to about 40 mbar e.g., 30 mbar. Irrigation system 300 optionally and preferably comprises a water supply system 302, which preferably supplies water at low pressure. Irrigation system 300 can also comprise an irrigation pipe 304 and one or more drippers 306.

While FIGS. 1A and 1B show irrigation pipe 304 in a generally horizontal orientation, this need not necessarily be the case, since, in some preferred embodiments of the present invention, irrigation pipe 304 is inclined. System 302 can optionally and preferably be connected through a connector and/or valve 360, optionally and preferably to one or more of water distribution conduits 305. Alternatively or additionally, system 302 can be connected to one or more of a water reservoir, a water tank, a water container or a well.

In some embodiments of the present invention system 300 comprises a water pump 362 that delivers water to system 302 or water distribution conduits 305 or irrigation pipe 304, as desired. System 300 optionally and preferably comprises one or more pressure sensors 364 that measure water pressure in irrigation pipe 304. System 300 can further comprise a control system 366 for controlling the flow rate of the water supplied to irrigation pipe 304. Control system 366 can include a circuit that is configured to transmit control signals to pump 362 or connector and/or valve 360 thereby to control the flow rate in pipe 304. Optionally and preferably control system 366 receives sensing signals from sensors 364 and transmits the controls responsively to these sensing signals, so as to maintain the aforementioned water pressure in irrigation pipe 304.

Drippers 306 can be attached to, integrated in, or located in the interior of, irrigation pipe 304. In operation, drippers 306 discharge water through at least one water outlet 314, to provide a flow of water, for example, to soil, ground, or furrow. Outlet 314 of dripper 306 can optionally and preferably be adjacent to a hole 336 in pipe 304.

Figure 18A:
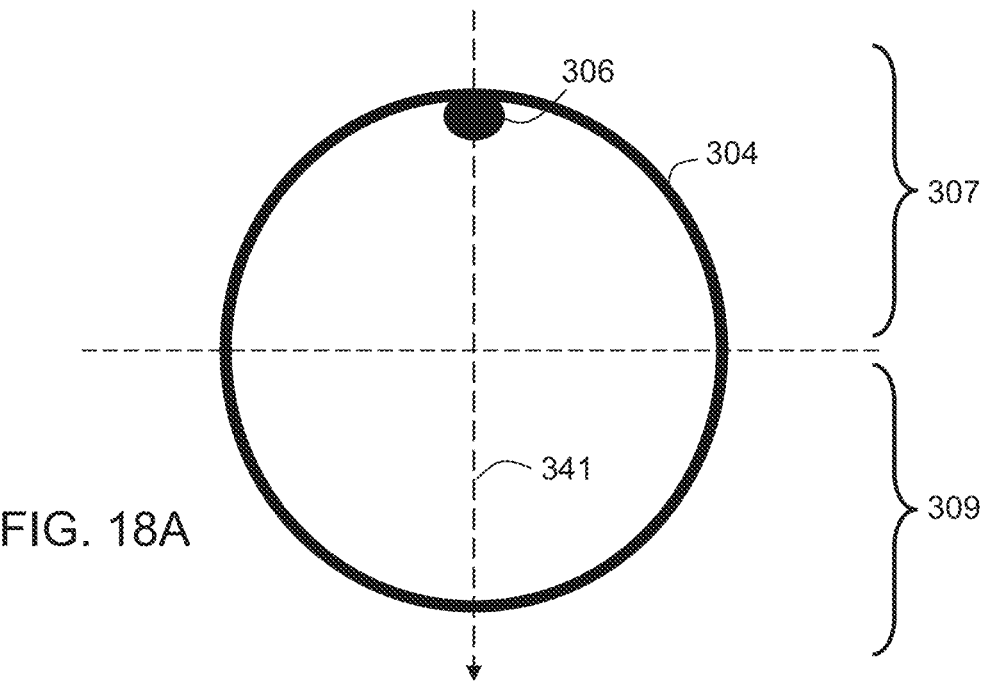
FIGS. 18A and 18B are schematic illustrations of a transverse cross-sectional view of an irrigation pipe, according to some embodiments of the present invention.
Figure 18B:
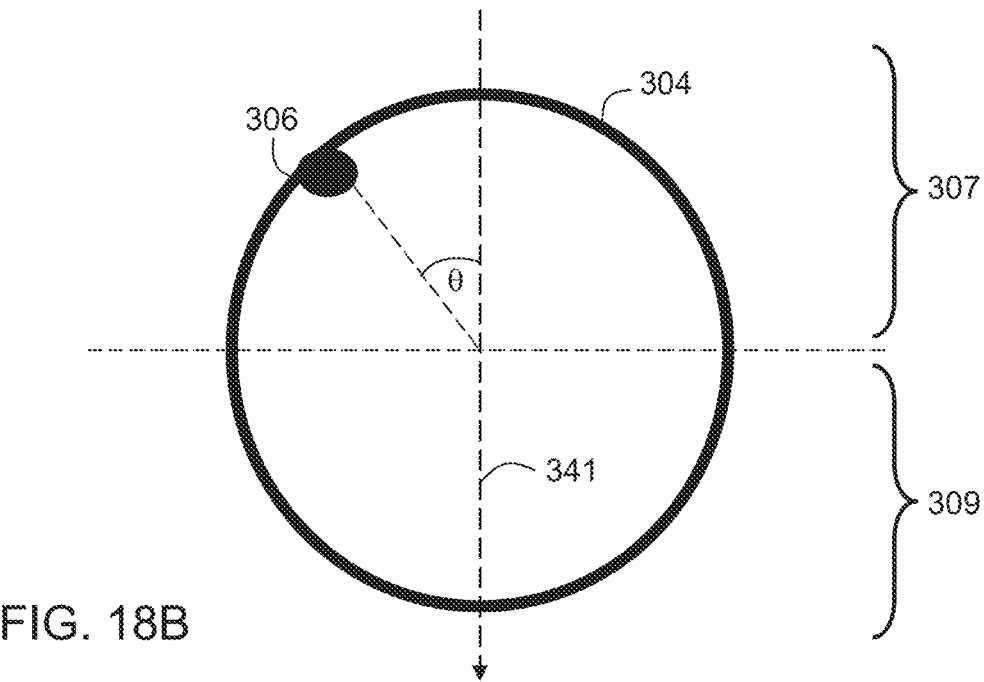

Two spatial relations between the drippers 306 and the irrigation pipe 304 are illustrated in FIGS. 18A and 18B, which are schematic illustrations of a transverse cross-sectional view of irrigation pipe 304 (at a plane that is perpendicularly to the longitudinal axis and the general direction of the flow of water within irrigation pipe 304). The transverse cross-section includes an upper half 307 and a lower half 309, where the terms "upper" and "lower" are with respect to the direction of the gravity, which is shown at 341. The drippers 306 are typically located at the periphery of pipe 304 at the upper half 307 thereof. In the schematic illustration of FIG. 18A, the dripper 306 is located at the topmost region of the periphery of pipe 304. A more preferred embodiment is illustrated in FIG. 18B. In this embodiment, the dripper 306 is still located at the upper half 307, however away from the topmost region at the periphery of pipe 304, at an acute angle θ to the vertical direction 341. Preferred value for the angle θ is from about 10° to about 70°, more preferably from about 20° to about 60°, more preferably from about 30° to about 50°.

Irrigation pipe 304 can be made of any suitable material known in the art to operate normally to withstand pressure of at least 1 bars, to withstand accidental pressures as a result of loads generated, for example, by overridden wheels of a vehicle, and/or to withstand weather conditions, such as rain, or high temperatures typically caused from heat generated by the sun. For example, suitable materials may be polyethylene, polypropylene, polyvinylchloride and other thermoplastic materials. Typically, irrigation pipe 304 has a diameter of from about 12 mm and to about 60 mm, and length of from about 5 to about 800 m.

In use of system 300, water is supplied to the inclined irrigation pipe 304 to flow within pipe 304 and drip via drippers 306. Optionally, the water is a natural water that contains at least M mg per liter of total suspended solids. In some embodiments of the present invention the water is not filtered prior to entering irrigation pipe 304 so that it still contains M mg per liter of total suspended solids within pipe 304 and within drippers 306. Typical values of M include, without limitation, at least 70, or more preferably at least 80, or more preferably at least 90, or more preferably at least 100, or more preferably at least 110, or more preferably at least 120, or more preferably at least 130. Alternatively, M can be less than 50.

Drippers 306 are disposed along irrigation pipe 304. A typical distance between two adjacent drippers along pipe 304 is, without limitation, from about 20 to about 100 cm.

Drippers 306 can be embodied in more than one way. In the representative example shown in FIG. 1B, which is not to be considered as limiting, one or more, preferably each of, drippers 306 can be fixed on the inner wall of irrigation pipe 304, and may comprise one or more water inlet 312 through which the water enters the dripper 306, one water outlet 314 through which the water exits the dripper 306, and a water pathway 310 through which the water flows from the inlet 312 to the outlet 314. For example, a typical dripper 306 may include from about 1 to about 100 dripper inlets, and 1 dripper outlet.

Water pathway 310 is optionally and preferably peripheral with respect to a body of dripper 306, and that allows water to flow at a plurality of directions at any point along a length of dripper 306. Preferably water pathway 310 forms at least one two-dimensional surface within dripper 306. In some embodiments of the present invention water pathway has an annular transverse cross-section (perpendicular to a longitudinal axis of dripper 306), and in some embodiments of the present invention water pathway has a polygonal transverse cross-section.

The term "annulus" as used herein refers to any round shape that at least partially enclose an area, and that include the periphery of the area but does not include the center of the area and a region surrounding said center. The term "annular" describes an object (e.g., a cross-section) having a shape of an annulus.

Other geometrical shapes for the transverse cross-section of pathway 310 are also contemplated.

Figure 11:
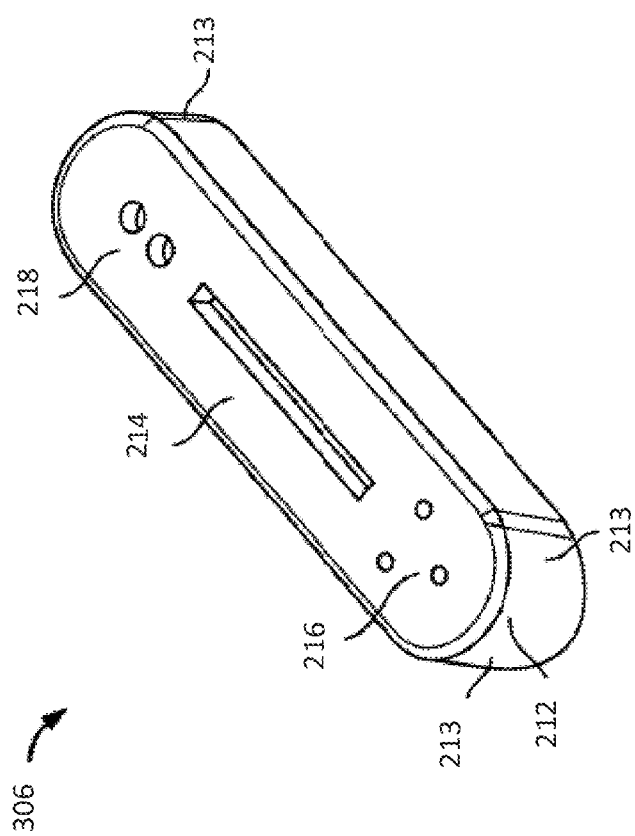
FIG. 11 is a schematic illustration of an additional type of dripper which can be used according some embodiments of the invention.

FIG. 11 illustrates dripper 306 according to another embodiment of the invention. In this embodiment, dripper 306 comprises a compact housing 212 made of a sturdy and non-corrosive material. The top surface 214 of dripper 306 defines two sets of inlets, each including one or more openings extending through the top surface 214. The inlets are exposed to the irrigation water flowing through the inside of the irrigation tube.

The first inlet 216 preferably includes three openings. Water flowing into the first inlet 216 proceeds through the body of dripper 306 to an outlet (not shown). In traveling through dripper 306 to the outlet, water pressure is reduced and water flow is reduced to a trickle or drip flow rate. The three openings are preferably sufficiently small in diameter to perform a filter function for water flowing through the first inlet 216, for example, to filter out debris or grit that might otherwise clog the interior of dripper 306. The openings making up the first inlet 216 are optionally and preferably spaced in a triangular pattern to allow water to uniformly impact interior surfaces of dripper 306. Although three equally spaced openings are shown in the preferred embodiment, other numbers and arrangements of openings may be utilized to form the first inlet 216.

The second inlet 218 preferably including two openings spaced along a center axis bisecting the length of dripper 306. Water flowing into the second inlet 218 optionally and preferably does not proceed through the body of dripper 306 but, instead, serves a pressure compensation function. Water flowing into the second inlet 218 accumulates in a chamber in the interior of dripper 306, applying pressure to the chamber in an amount substantially equivalent to the pressure in the irrigation tube. Because water flowing through the second inlet 218 does not flow through dripper 306, the openings of the second inlet 218 need not filter the inflowing water and the openings need not be small in diameter. Although two openings are shown in the preferred embodiment, as seen in FIG. 11, other numbers and arrangements of openings may be utilized to form the second inlet 218.

FIGS. 12A and 12B illustrate dripper 306 according to another embodiment of the invention. In this embodiment, dripper 306 comprises a compact housing which can be conveniently and economically formed from assembled plastic molded housing components. The housing includes a generally cup-shaped base 20 adapted for assembly with a cap 22 to form a substantially enclosed housing interior. In general terms, the flow channel 14 is defined by a channel pattern 26 formed in the base 20, in cooperative relation with a resilient and flexible elastomeric valve member 28. Water is supplied to the flow channel 14 via a water inlet 30 formed by the cap 22, and water is discharged from the flow channel through the discharge outlet 16 formed in the base 20. The geometry of the channel pattern 26 cooperates with the valve member 28 to define the three dimensional flow channel 14 for improved pressure drop between the inlet 30 and the outlet 16.

Housing base 20 has an upwardly open, generally cup-shaped construction including a circular bottom or floor surface 32 joined at the perimeter thereof to a cylindrical upstanding outer wall 34. The channel pattern 26 is formed on the floor 32 with a generally circular configuration arranged about the outlet 16 which may include a short downwardly projecting hollow stem 36 for press-fit attachment to discharge tubing (not shown), if desired. A plurality of spacer posts 38 are also formed on the base 20 to project upwardly from the floor 32 at the floor perimeter and terminate with upper ends disposed above the channel pattern 26, but below the upper edge of the outer wall 32.

The valve member 28 comprises a resilient disk having a size and shape to fit into the housing base 20, with an outer margin of the valve member 28 fitting within the spacer posts 38. The housing cap 22 is then assembled with the base 20 by press-fit mounting of the disk-shaped cap into the open end of the base, to seat the cap 22 against the upper ends of the spacer posts 38. The cap 22 can be securely connected to the base 20 in a sealed manner by use of a suitable adhesive, or by ultrasonic welding or the like. When assembled, the housing base 20 and cap 22 defined an inlet chamber 40 (FIG. 12A) within which the valve member 28 is retained with at least some floating movement in a position aligned over the channel pattern 26. The water inlet 30 is formed in the cap 22 and is typically associated with an inlet stem 42 which may include a barbed construction for press-on puncture type attachment to the water supply hose 12.

From flow channel 14, the water enters the centrally located discharge chamber having a raised circular boss 52 projecting upwardly from the floor 32 of the housing base 20 to engage the valve member 28. The boss 52 has an upwardly open discharge regulating groove 54 formed therein, for discharge flow of the water from the outlet chamber to the water outlet 16.

Figure 13A:
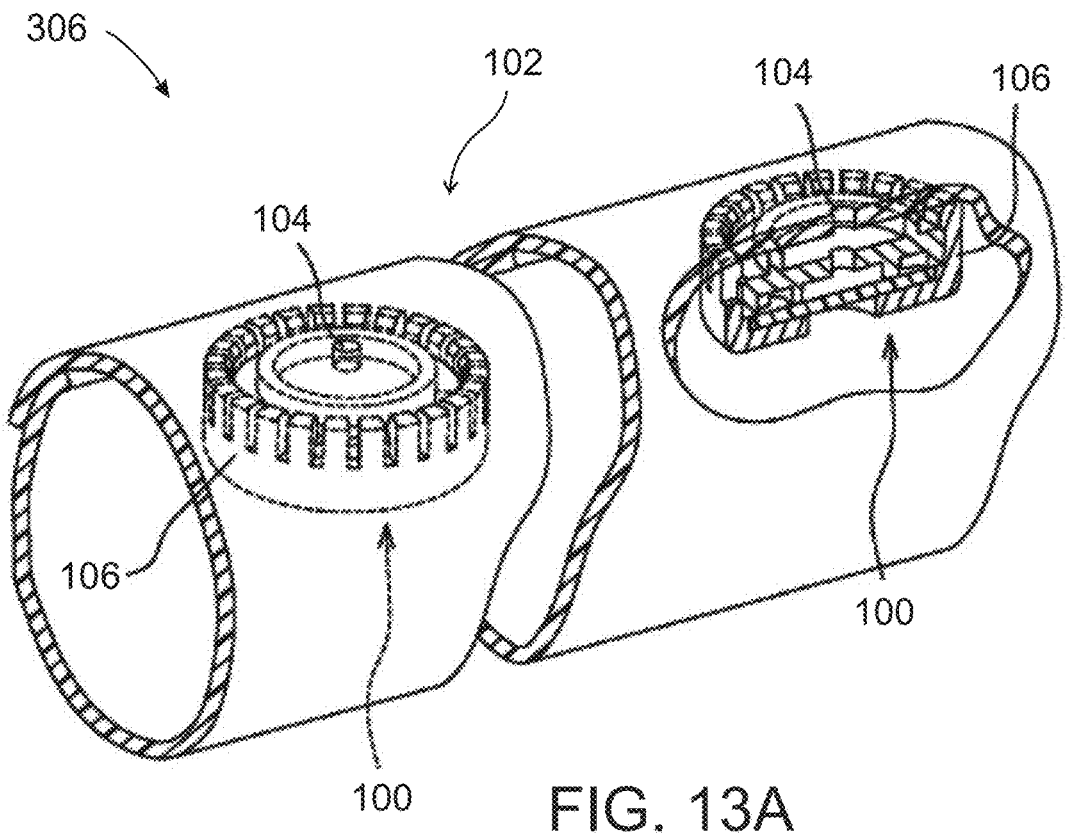
FIGS. 13A and 13B schematic illustrations of an additional type of dripper which can be used according to embodiments of the invention.
Figure 13B:
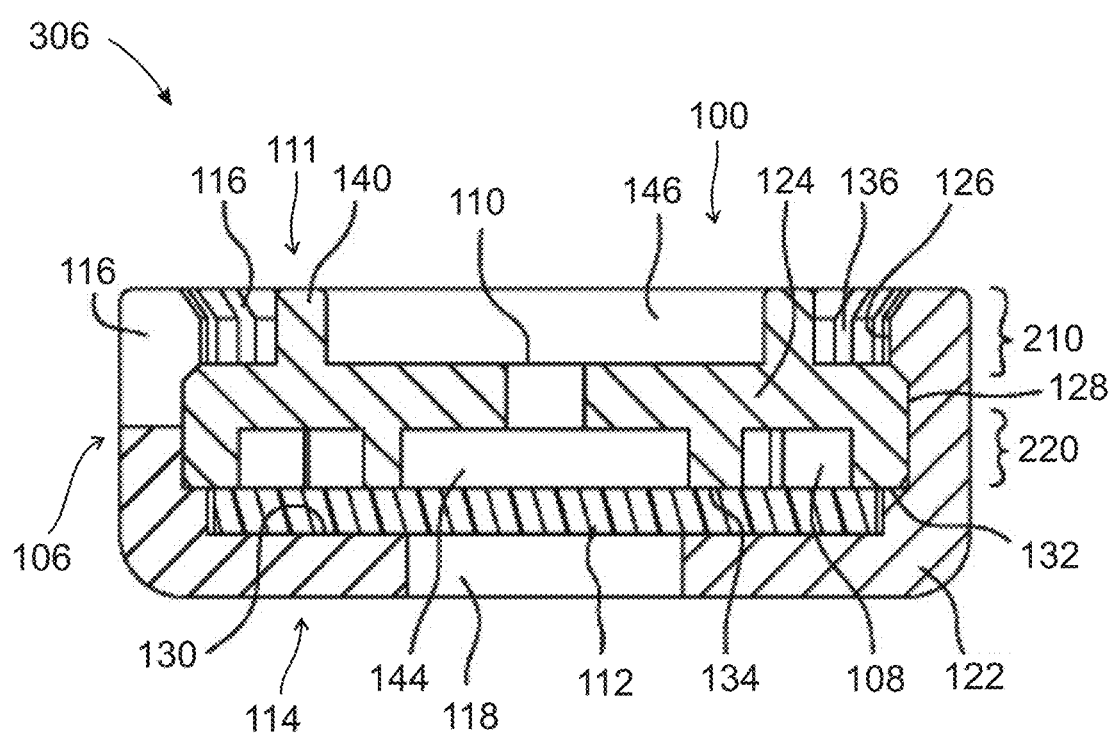

FIGS. 13A and 13B illustrate dripper 306 according to another embodiment of the invention. The dripper 306 may be a molded plastic body that may be inserted into thin walled drip tape 102, or any other type of water conduit such as an extruded hose, at regularly spaced intervals during or immediately following extrusion of the drip tape. Each dripper 306 may have a single outlet that may be positioned at an opening 104 that is cut or pre-formed in the wall of the drip tape during production. Water in thin walled drip tape 102 may enter the dripper 306 by passing through a filter at the dripper's sides or perimeter 106. Because the filter area is in the dripper's sides or perimeter, the dripper 306 can provide a filter of large area relative to the size or thickness of the dripper 306. For example, the dripper 306 in a preferred embodiment may have a thickness of about 3.5 mm, and a filter area of at least about 12 mm².

In one embodiment, filtered water then passes through labyrinth 108 where water pressure is reduced. For example, water pressure may be reduced from the line pressure in the drip tape (e.g., 12 psi) to a substantially lower pressure. Water at the reduced pressure then may flow through outlet hole 110 near the dripper's first or outer face 111 welded or adhered to the drip tape wall.

In one embodiment, the dripper 306 is pressure regulated using diaphragm 112 at or adjacent the dripper's second or inner face 114. Water pressure in the drip tape acts against the diaphragm to regulate the dripper's flow rate as water pressure changes within the water conduit.

Dripper 306 may include three parts, two body members 122 and 124, and elastomeric diaphragm 112. The dripper's first or outer face 111 may have one or more walls or surfaces that are welded, adhered to or otherwise bonded to the drip tape inner wall. The dripper 306 has a second or inner face 114 that may project inwardly toward the interior of the drip tape. The thickness of the dripper 306 between the first or outer face and the second or inner face is preferably less than about 5 mm, and most preferably less than about 3.5 mm. The filter area of the dripper 306 is entirely on the sides 106 or periphery of the dripper 306, between the dripper's outer face 111 and inner face 114.

In one embodiment, the filter area may be configured as a plurality of slots 116 through the sides of the dripper 306 which provide filtering inlets or passages for water in the drip tape to enter into the dripper 306. Each slot 116 through the dripper's side walls may have dimensions that are small enough to block particles or debris from passing through the slot to the interior of the dripper 306, while allowing a desired flow rate of water from the drip line into the interior of the dripper 306.

For example, in one embodiment, the dripper 306 may be generally disc shaped, and each slot 116 may extend radially through the dripper's cylindrical side walls 106, from the perimeter or outer surface to the interior of the dripper 306. Dripper 306 may have 24 radial slots, each slot having a width of less than about 0.5 mm, and most preferably having a width of less than about 0.3 mm. The radial thickness of the dripper's side walls may be between about 0.5 mm and about 1.0 mm. The dripper's radius may be between about 3.5 mm and about 6.5 mm, and the dripper's outer circumference may be between about 10 mm and about 30 mm.

In one embodiment, the second or inner face 114 of the dripper 306 may have an opening 118. Diaphragm 112 may be an elastic bladder that is positioned between body members 122 and 124, while the diaphragm is directly exposed on one side to the water pressure within the drip tape or other water conduit where the dripper 306 is mounted. For example, the diaphragm may have a thickness of about 0.5 mm to about 0.75 mm, and a surface which is large enough to cover both pressure regulating chamber 144 and labyrinth 108 which is formed in second body member 124 on surface 132.

In one embodiment, the diaphragm may be exposed to line pressure in the drip tape which may enter through opening 118 and directly act against the diaphragm, causing the diaphragm to flex as the water pressure at the diaphragm on the other side is decreased. If water pressure in the drip tape increases, the diaphragm may flex radially toward outlet 110 and away from the dripper's second or inner face, reducing the outlet flow from the dripper 306.

In one embodiment, water acting against the diaphragm while passing through opening 118 does not also pass through a filter. Instead, the filter may be an array of slots 116 in the dripper's cylindrical side walls 106, and are dedicated only for water entering the dripper's pressure reducing area, or labyrinth 108.

In one embodiment, diaphragm 112 may be held in place by sandwiching outer portions of the diaphragm between first body member 122 and second body member 124 of the dripper 306. The first and second body members may be engaged together with a snap or press fit. For example, the second member may be inserted into the first member, and may be held in place by shoulders 126 that extend inwardly from the dripper's side walls 106. The inwardly facing shoulders may capture and hold the second member in place because the dimensions of the second member's outer rim or perimeter 128 may be slightly larger than the dimensions of shoulders 126. Diaphragm 112 may be held between surface 130 of the first member and one or more walls 132, 134 of the second member. Optionally, the shoulders and outer rim or perimeter may be tapered to facilitate ease of assembly. Additionally, portions of the diaphragm that are radially outside of opening 118 may be compressed axially by a tight or sealing interfit between the first and second body members.

In one embodiment, water entering the dripper 306 through the filter area in the dripper's sides may be collected in manifold flow channel 136 inside the filter area. For example, the manifold flow channel may be a passage radially within the filter area on the dripper's side walls 106, and may be enclosed by the drip tape wall, surface 138, and wall 140 that circumscribe exit pool 146.

In various exemplary embodiments of the invention irrigation pipe 304 is arranged to compensate pressure losses in the drippers along the irrigation pipe. In operation, water supply system 302 delivers water to pipe 304, optionally and preferably at a highest level of pipe 304.

It was found by the Inventors that this results in a generally high water flow rate, and also maintains a generally uniform flow rate in all drippers 306.

In some embodiments of the present invention control system 366 (e.g., shown in FIG. 1A) ensures that water supply system 302 delivers the water to pipe 304 at a pressure of at most about 200 cm $H_2O$ (e.g., from about 5 cm to about 200 cm $H_2O$), or at most about 150 cm $H_2O$ (e.g., from about 5 cm to about 150 cm $H_2O$), or at most about 120 cm $H_2O$ (e.g., from about 5 cm to about 150 cm $H_2O$), or at most about 90 cm $H_2O$ (e.g., from about 5 cm to about 90 cm $H_2O$), or at most 80 cm $H_2O$ (e.g., from about 5 cm to about 80 cm $H_2O$), or at most 70 cm $H_2O$ (e.g., from about 5 cm to about 70 cm $H_2O$), or at most 60 cm $H_2O$ (e.g., from about 5 cm to about 60 cm $H_2O$), or at most 50 cm $H_2O$ (e.g., from about 5 cm to about 50 cm $H_2O$), and further or at most 40 cm $H_2O$ (e.g., from about 5 cm to about 40 cm $H_2O$). For example, when supply system 302 is a pump and/or comprises a controllable valve (not shown), control system 366 can control the pump or valve to deliver the preferred pressure. Alternatively, water supply system 302 can be configured to the deliver the water at the aforementioned pressure without a control system (e.g., by a judicious selection of the outlet diameter and/or pressure within the water supply system 302).

Drip irrigation systems involve investment costs and power consumption in high pressure (energy) and filtration systems to work efficiently. Surface irrigation systems typically employ high discharge at a water inlet in order to irrigate efficiently and uniformly using surface irrigation so that water will reach an end of the field. It was found by the inventors of the present invention that reduction of water amount by a steeper slope field may cause runoff, erosion and soil degradation.

Drip irrigation systems provide higher water uniformity across a field than surface irrigation due to reduced runoff and leaching, however, it was realized by the inventors of the present invention that the high pressure requirement causes high energy costs and high investment costs in filters, pumps, pressure regulators, and materials of irrigation pipe that can withstand high pressure. It was realized by the inventors of the present invention that drip irrigation systems that work at pressures between 0.05 to 0.1 bar cannot be applied in large commercial fields because without proper filtration the drippers tends to clog. A criterion for discharge variation in an irrigated field is typically 10% or less.

The inventors found that an irrigation system comprising an inclined irrigation pipe that is configured such that a water discharge along a length of the inclined irrigation pipe varies by or no more than about 50%, or no more than about 40%, or no more than about 30%, or no more than about 35%, or no more than about 20%, or no more than 18%, or no more than 16%, or no more than 15%, or no more than 13%, or no more than 12%, or no more than 10%.

As used herein, "water discharge" refers to a volume of water that exits the dripper per unit time.

The low variation of the water discharge may be achieved in more than one way. In some embodiments of the present invention the irrigation pipe is inclined at a varying slope, in some embodiments of the present invention the irrigation pipe is inclined at a fixed slope but one or more water pressure stabilizers are provided to stabilize the pressure along the irrigation pipe, and in some embodiments of the present invention the irrigation pipe is inclined at a varying slope and one or more water pressure stabilizers are further provided to stabilize the pressure along the irrigation pipe. The pressure stabilizer can be mounted on the irrigation pipe itself or, more preferably, it can be mounted on water distribution conduits 305.

The present embodiments contemplate deployment of an irrigation pipe on the ground that is inclined, wherein the slope of the inclination of the irrigation pipe on the ground vary by no more than 50%, more preferably no more than 40%, more preferably no more than 35%, more preferably no more than 30%, more preferably no more than 20%, along the length of the pipe.

The present embodiments also contemplate configurations with large variations (e.g., variations of more than 60% or more than 70% or more than 80%) in the value of the slope. These embodiments are particularly advantageous when the pressure at the highest level of the irrigation pipe 304 is low (e.g., less than 100 cm $H_2O$, for example, 90 cm $H_2O$ or less. For example, in experiments performed by the Inventors, successful irrigation was achieved with pressure of about 50 cm $H_2O$ at the highest level of the irrigation pipe 304 for a slope that varied from 0.15% at the highest level of the irrigation pipe 304 to 0.02% at the lowest level of the irrigation pipe 304.

In some embodiments of the present invention irrigation pipe 304 is inclined at a gradually varying slope, and in some embodiments of the present invention irrigation pipe 304 is inclined at a slope that varies non-continuously.

Figure 16A:
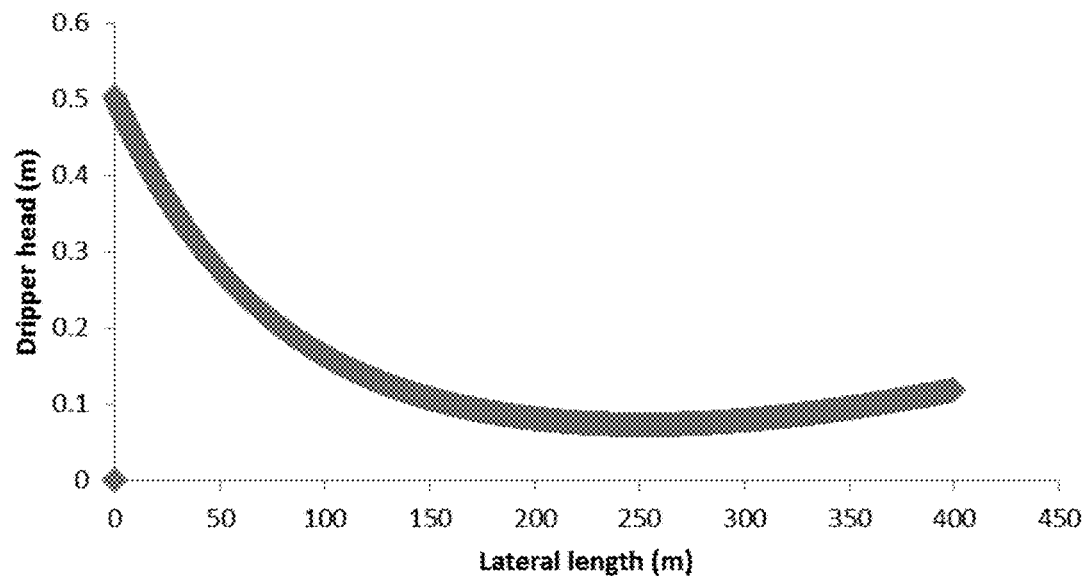
FIGS. 16A-16C show hydraulic head losses along 400 meter irrigation pipes inclined at a slope of 0.05%, for irrigation pipe inner diameter of 22 mm (FIG. 16A), 45 mm (FIG. 16B), and 35 mm (FIG. 16C), as obtained in experiments performed according to some embodiments of the present invention.
Figure 16B:
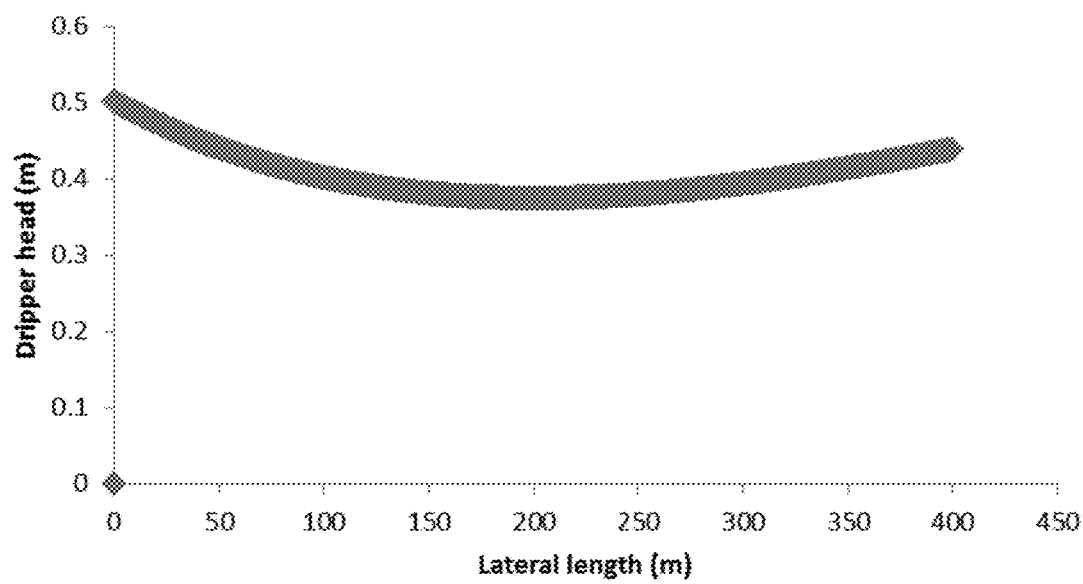
Figure 16C:
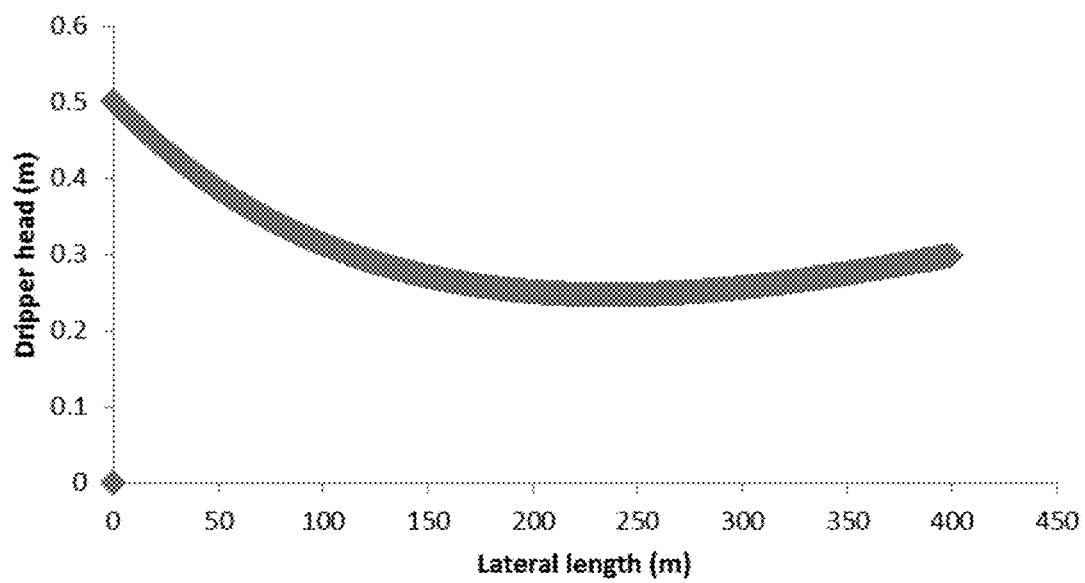

Inclined irrigation pipe 304 can have any length. Preferably, but not necessarily, the inclined irrigation pipe has a length of at least 100 meters, more preferably at least 200 meters, more preferably at least 200 meters, more preferably at least 300 meters, more preferably at least 400 meters, more preferably at least 500 meters, more preferably at least 600 meters, more preferably at least 700 meters, e.g., 800 meters or more. In these embodiments, the inner diameter of irrigation pipe 304 is preferably at least 30 mm, more preferably at least 35 mm, more preferably at least 40 mm, more preferably at least 45 mm, more preferably at least 50 mm, more preferably at least 55 mm, e.g., 60 mm or more, so as to reduce or minimize variations in water discharge and consequent head losses along the length of irrigation pipe 304. FIGS. 16A-C show hydraulic head losses along 400 meter irrigation pipes inclined at a slope of 0.05%, for irrigation pipe inner diameter of 22 mm (FIG. 16A), 45 mm (FIG. 16B), and 35 mm (FIG. 16C). In all cases, the hydraulic head at the highest point of the inclined irrigation pipe is 50 cm $H_2O$ (0.05 bars). As shown, higher inner diameter (FIGS. 16B and 16C) ensures a reduction in the hydraulic head loss along the length of the pipe.

Figure 2:
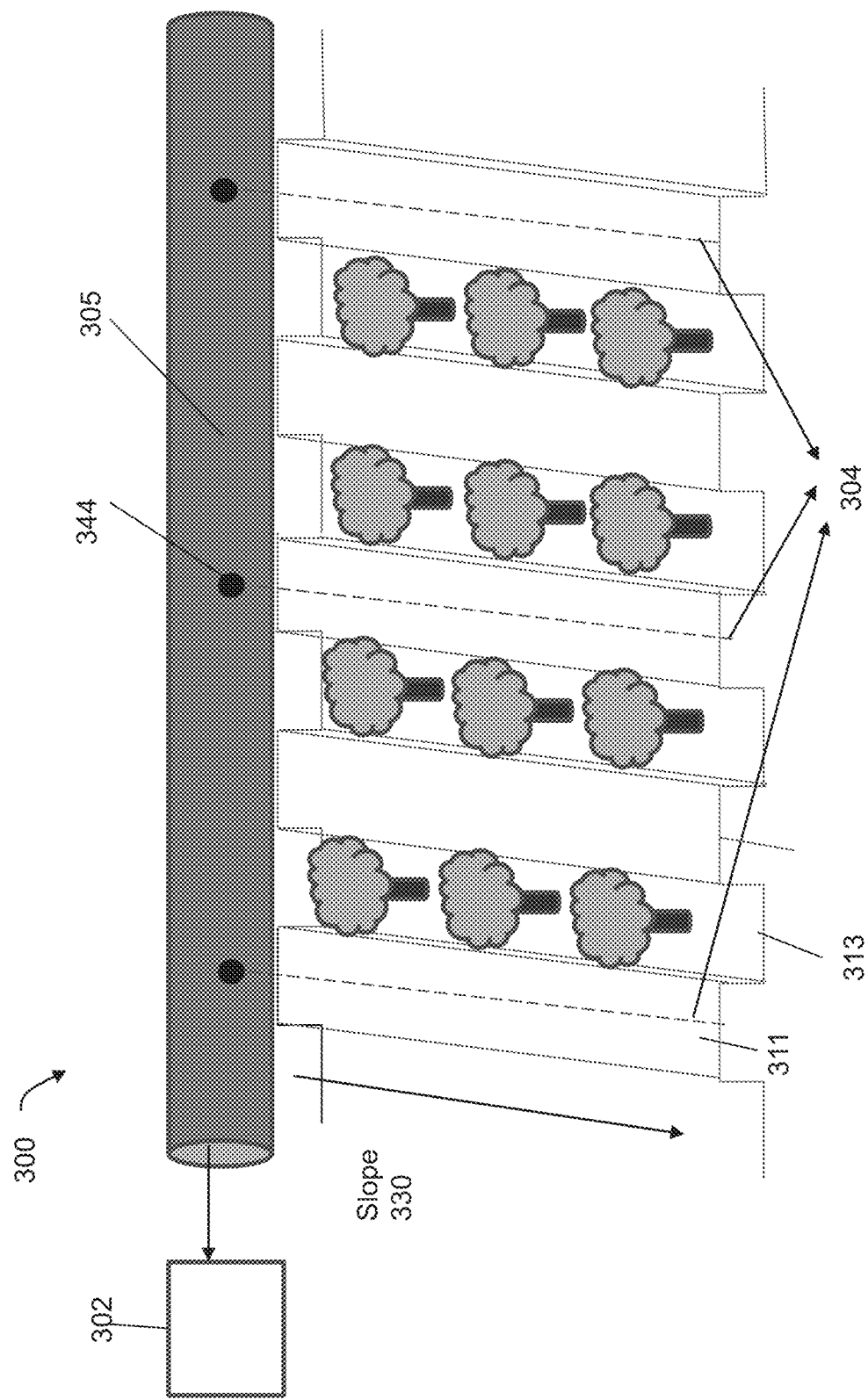
FIG. 2 is a schematic illustration of an irrigation system having a varying slope, according to some embodiments of the present invention.

FIG. 2 is a schematic illustration of irrigation system 300, in embodiments of the invention in which a varying slope is employed. Irrigation system 300 can comprise water supply system 302, one or more inclined irrigation pipe 304 and a plurality of drippers 306 (not shown, see, e.g., FIGS. 1A and 1B). In the representative illustration of FIG. 2, which is not to be considered as limiting, the irrigation system 300 comprises a distribution conduit 305 into which water is discharged from system 302. Conduit 305 is provided with holes 344 to which irrigation pipes 304 are connected with suitable connectors (not shown). The irrigation pipes 304 are optionally and preferably placed between furrows 311 that are typically used for flooding and are arranged in a slope 330 for compensating in losses in flow along the irrigation pipes 304. Slope 330 can vary (gradually or non-continuously) along the irrigation pipes 304.

For example, irrigation pipe 304 may be inclined at a gradually varying slope with a higher slope (in absolute value) at the beginning of the irrigation pipe 304 and a lower slope (in absolute value) at one or more location downstream pipe 304. It was found by the Inventors that this can increase the water flow rate, and can maintain a generally uniform pressure (e.g., with tolerance of ±50% or ±40% or ±35% or ±30% or ±20% or less) in all drippers 306. In some embodiments of the present invention irrigation pipe 304 is inclined at a gradually varying slope that is selected such that a water discharge along a length of pipe 304 varies by no more than about 50%, or no more than about 40%, or no more than about 35%, or no more than about 30%, or no more than about 20%, or no more than 18%, or no more than 16%, or no more than 15%, or no more than 13%, or no more than 12%, or no more than 10%.

It was realized by the inventors of the present invention that as water flows in inclined irrigation pipe 304 provided with a plurality of drippers 306, there can be a pressure increase along a length of irrigation pipe 304, which can cause water discharge in the drippers 306 to increase.

Figure 3A:
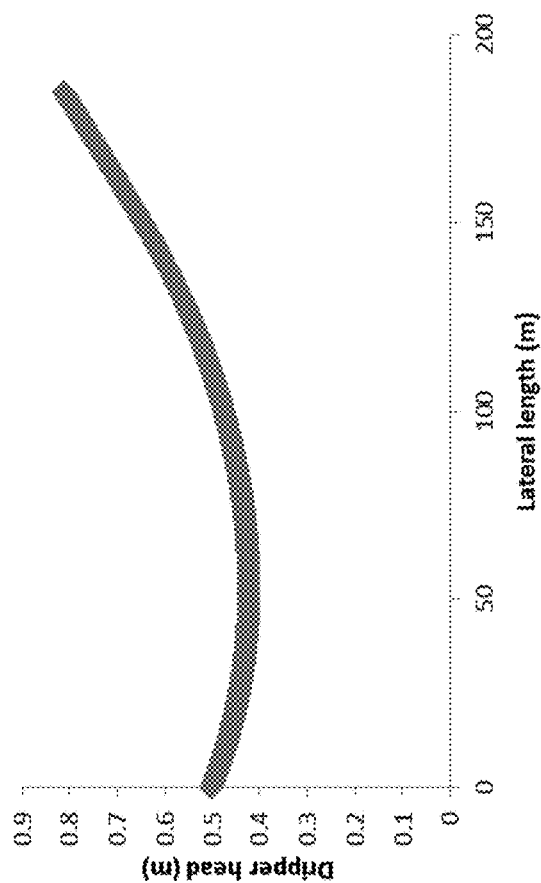
FIGS. 3A-3B are graphs of water pressure as a function of conduit length for a slope of 0.5% and diameter of 25 mm (FIG. 3A), and height of the conduit normalized to a highest level of the conduit as a function of conduit length (FIG. 3B), as obtained in experiments performed according to some embodiments of the present invention.
Figure 3B:
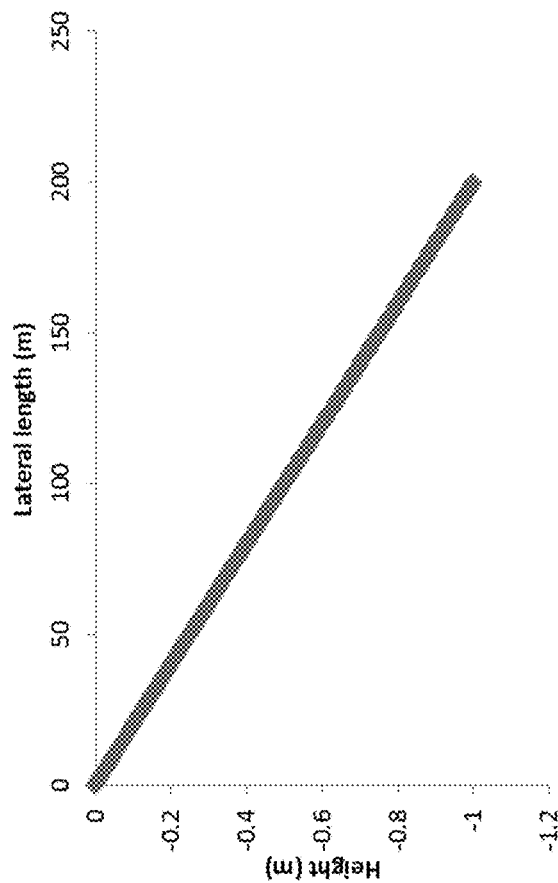

FIGS. 3A-3B are graphs of dripper pressure as a function of pipe length in a 200 m pipe with 25 mm diameter and a slope of 0.5% (FIG. 3A), and the corresponding height of the pipe from its highest level (FIG. 3B), as obtained in experiments performed according to some embodiments of the present invention. The pressure increased from about 0.5 m at the beginning of the pipe to about 0.8 m at its end.

To irrigate a field efficiently and uniformly, the pressure in the irrigation pipe is optionally and preferably decreased and/or stabilized so as to reduce the variation in water discharge along the pipe.

The inventors found that in an irrigation system comprising an inclined irrigation pipe provided with a plurality of drippers, the water pressure may be reduced and/or stabilized using one or more water pressure stabilizer distributed along the irrigation pipe 304 and/or the distribution conduit 305.

It was found by the Inventors that this results in maintaining a generally uniform (e.g., with tolerance of ±50%, more preferably ±40%, more preferably ±35%, more preferably ±30%, more preferably ±20% or less) water flow rate in all drippers 306.

In some embodiments of the present invention, a water pressure stabilizer ensures that water delivered by the water supply system to the inclined pipe at a predetermined water pressure (e.g., of at most about 200 cm $H_2O$) at a highest level of the inclined pipe, is delivered along a length of the irrigation pipe, such that the water pressure along the pipe varies by no more than about 50%, or no more than about 40%, or no more than about 35%, or no more than about 30%, or no more than about 20%, or no more than 18%, or no more than 16%, or no more than 15%, or no more than 13%, or no more than 12%, or no more than 10%.

The water pressure stabilizer can be of any type known in the art, including, without limitation, an electrically driven water pressure stabilizer, a mechanically driven water pressure stabilizer, etc. A representative example of a driven water pressure stabilizer 400 suitable for the present embodiments will now be described with reference to FIGS. 4A-4C.

Each water pressure stabilizer receives water at a first pressure from the inclined pipe and/or distribution conduit of system 300, and provides water at a stabilized pressure, that is typically less than the first pressure. Preferably, the water pressure stabilizer ensures that the stabilized pressure is within the working pressure range of the drippers. In a representative example, the water pressure stabilizer provides a stabilized pressure that does not vary by more than about 50%, or more than about 40%, or more than about 35%, or more than about 30%, or more than about 20%, or more than 18%, or more than 16%, or more than 15%, or more than 13%, or more than 12%, or more than 10%, from a pressure within the range of from about 20 cm $H_2O$ to about 80 cm $H_2O$ or from about 20 cm $H_2O$ to about 70 cm $H_2O$, or from about 20 cm $H_2O$ to about 60 cm $H_2O$ or from about 20 cm $H_2O$ to about 50 cm $H_2O$, or from about 30 cm $H_2O$ to about 50 cm $H_2O$.

Figure 4A:
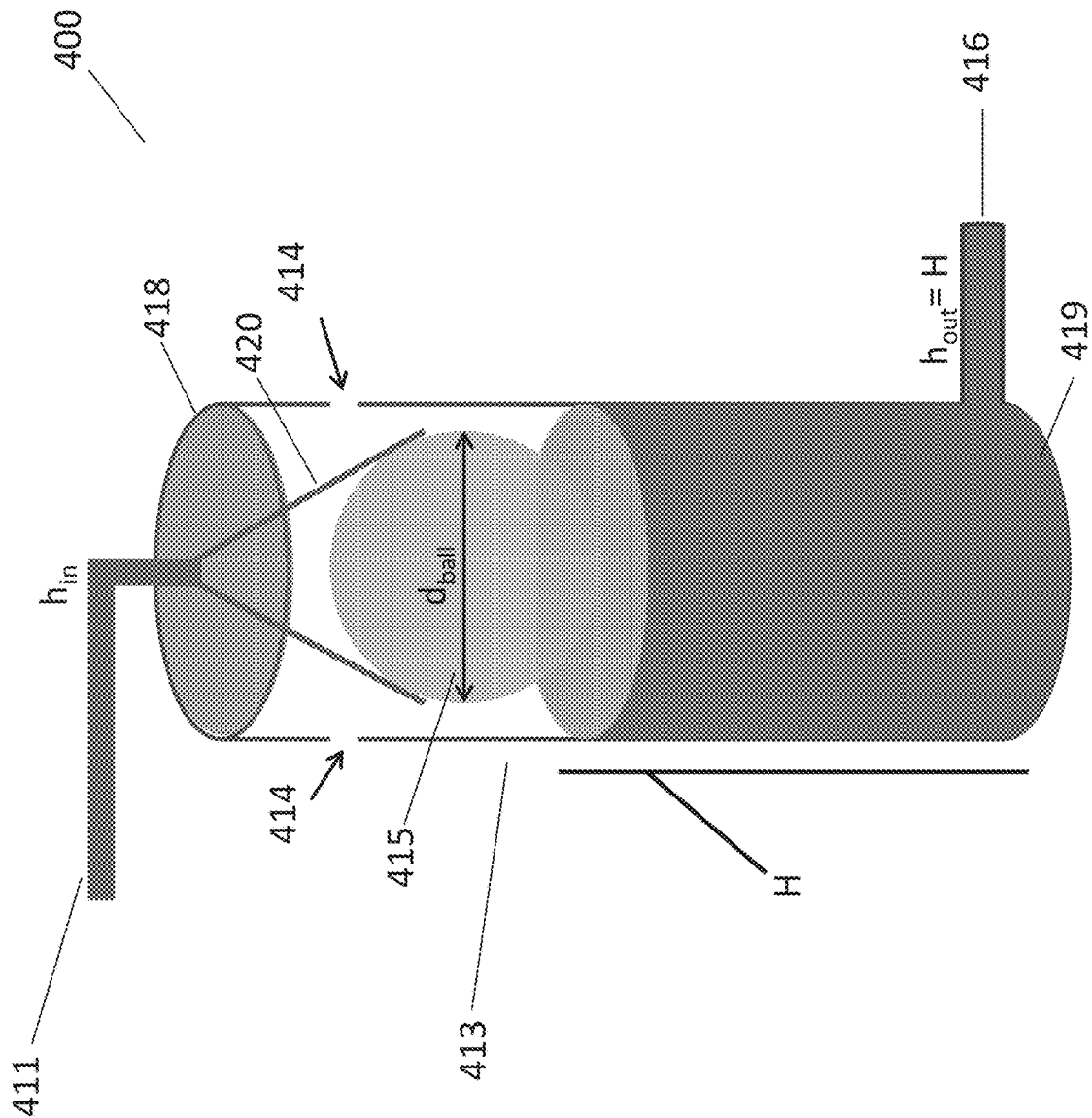
FIGS. 4A-4C are schematic illustrations of a water pressure stabilizer according to some embodiments of the present invention showing an embodiment in which the water pressure stabilizer has an inlet at its top end (FIG. 4A); an embodiment in which the water pressure stabilizer has an inlet away from the top end (FIG. 4B); and an embodiment in which the water pressure stabilizer has a flexible pipe at the inlet (FIG. 4C)
Figure 4B:
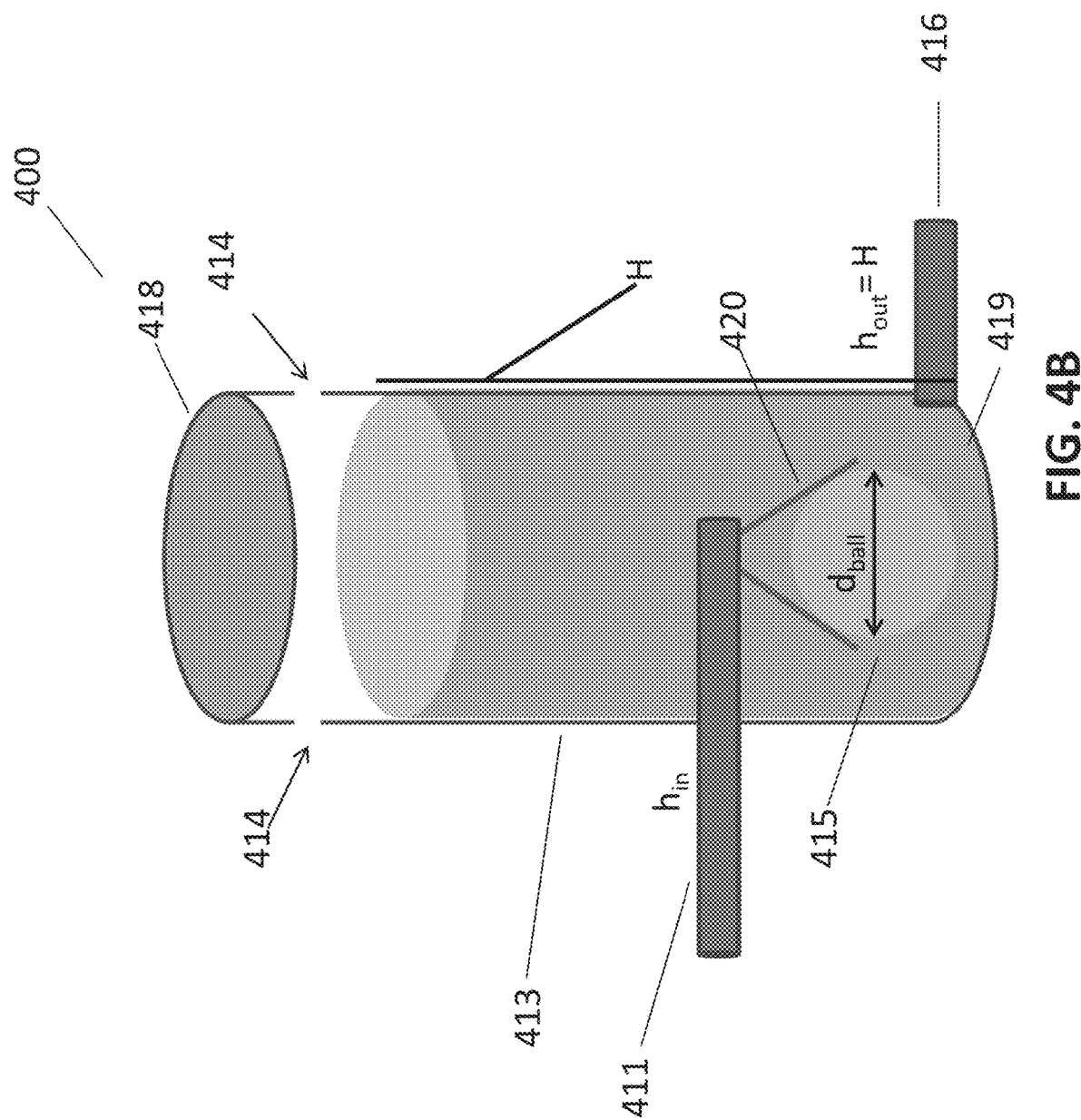
Figure 4C:
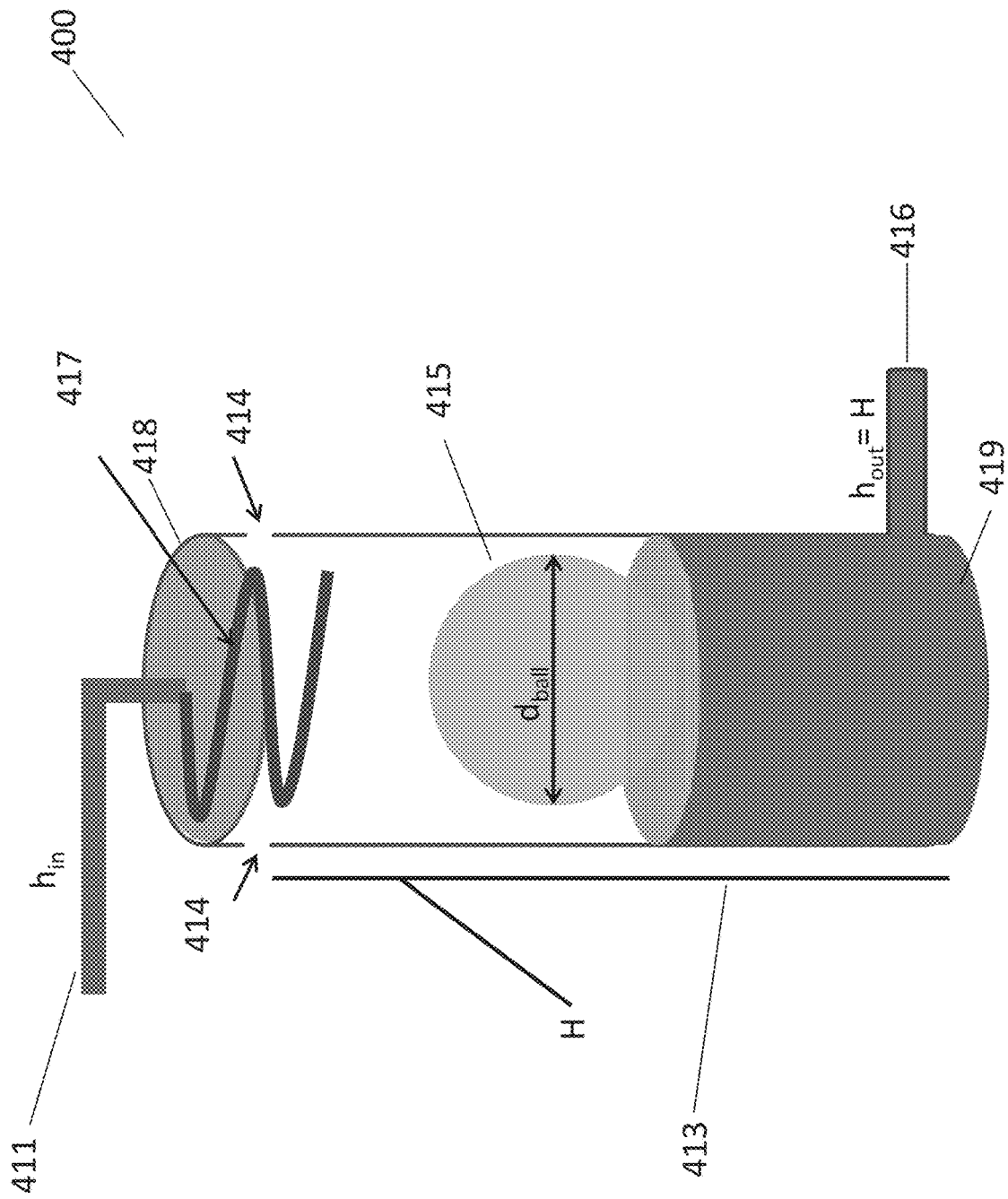

FIGS. 4A-4C are schematic illustrations of a water pressure stabilizer 400 for an irrigation system (e.g., inclined irrigation system 300 shown in FIG. 2), in accordance with some embodiments of the present invention. Water pressure stabilizer 400 can comprise a container 413 (e.g., a tube, a tank, a conduit, etc.) having a float element 415 disposed therewithin. In use, container 413 is preferably positioned generally vertically (e.g., with tolerance of ±10°). Float element 415 can have any shape. Optionally and preferably has a shape that fits the internal wall of container 413. For example, when the internal wall of container 413 is cylindrical, float element 415 can be shaped as a disk or a ball. Container 413 has a top end 418, a bottom end 419 and at least one or more openings 414 for ventilation. Water pressure stabilizer 400 also comprises an inlet 411 for receiving water at the first pressure, and an outlet 416 providing water at the stabilized pressure.

Inlet 411 and outlet 416 of pressure stabilizer 400 can be connected to an inclined irrigation pipe, such as, but not limited to, inclined irrigation pipe 304 of system 300, or a distribution conduit, such as, but not limited to, distribution conduit 305 of system 300, for stabilizing the pressure in the respective pipe or conduit.

Inlet 411 is optionally and preferably connected to container 413 through an angular pipeline connector, e.g., as shown in FIGS. 4A and 4C. FIGS. 4A and 4C illustrate embodiments in which inlet 411 is connected to the top 418 of the container 413, and FIG. 4B illustrates an embodiment in which inlet 411 is connected away from the top 418 of the container 413, for example, at the side wall thereof. Inlet 411 may have a pipe and/or conduit having a diameter that may, optionally and preferably, be equal and/or smaller than the diameter of the irrigation pipe 304 (e.g., 25 mm), and corresponds to the flow rate through the stabilizer 400.

The float element 415 can optionally and preferably be characterized by having a buoyance for generating upwards movement of the element 415 along the container 413 when at least one partially submerged in water in the container 413, e.g., the float element 415 having a mass density that is lower than the mass density.

Water enters the container through inlet 411 at the first pressure, which is expressed by an equivalent water column height and is designated herein, $h_{in}$. The pressure at the outlet 416 is also expressed by an equivalent water column height and is designated herein, $h_{out}$.

When the float element 415 is in equilibrium, the sum of forces on the element 415 is zero (F=0). When the buoyance force is greater than the sum of the gravitational force and the force applied by the pressure above element 415, float element 415 rises upwards as water is filled until equilibrium is reached. The dimensions of container 413 and the location of inlet 411 above float element 415 are preferably selected such that when the pressure at the outlet 416 reaches a predetermined pressure, float element 415 are blocks inlet 411 from intaking water to the container.

This can be expressed by the following mathematical equations:

$$F_{in} + mg = B$$

$$B = \rho_w g V_{submerged}$$

$$F_{in} = P_{in} * A_{in} = h_{in} * \rho_w g * A_{in}$$

$$h_{in} * \rho_w g * A_{in} + mg = \rho_w g V_s$$

$$h_{in} * A_{in} + \frac{m}{\rho_w} = V_s$$

$$F = 0 \rightarrow mg = B$$

$$m = \rho_b * V_b$$

$$h_{in} * A_{in} = V_s - \frac{\rho_b * V_b}{\rho_w}$$

where, $\rho_b$, $V_b$, $m_b$, $r_b$ are the density, volume, mass and radius of the float element (e.g., a ball), respectively; $\rho_w$, $V_w$, $m_w$ are the density, volume and mass of water, respectively; $F_{in}$, $F_{out}$, $P_{in}$, $P_{out}$, $A_{in}$, $A_{out}$, $h_{out}$ are force, pressure, area, level of water in the inlet and/or outlet, respectively; B—buoyance force; $V_s$—volume submerged; g—gravitational acceleration.

The ventilation openings 414 are optionally and preferably located above the maximum level of the water surface, so that the pressure at the water surface level is atmospheric. Thus, the pressure at outlet 416, $h_{out}$, corresponds to the pressure at water level, H (e.g., $h_{out}$=H).

The top of the container 413 can be positioned above ground level in a range of between 30 and 100 cm (e.g., between 30 and 50 cm).

FIG. 4B displays an additional embodiment of the water pressure stabilizer 400, according to some embodiments of the invention, in which the float element 415 has a higher density than in the float element 415 in the example displayed in FIG. 4A, however, still lower than water density. As the water level rises in the container 413, additional force that can push the float element 415 upwards may be generated. In equilibrium, the water level in the pipe is the pressure $h_{out}$ at the container outlet 416. The outlet 416 can be located at the bottom of the container 413 or at a certain height in the bottom portion of the container 413, but below the inlet 411.

This can be expressed by the following mathematical equations:

$$F_{in} + mg = B + F_{out}$$

$$F_{in} = P_{in} * A_{in} = h_{in} * \rho_w g * A_{in}$$

$$F_{out} = P_{out} * A_{out} = H * \rho_w g * A_{in}$$

$$h_{in} * A_{in} + \frac{m}{\rho_w} = V + H * A_{out}$$

$$h_{in} * A_{in} + \frac{V \rho_b}{\rho_w} = V + H * A_{out}$$

$$h_{in} * A_{in} - H * A_{out} = V\left(1 - \frac{\rho_b}{\rho_w}\right)$$

where, the above notations are the same as described for the example displayed in FIG. 4A.

If the float element 415 does not touch the upper cone area in steady state (e.g., as shown in 420 in FIG. 4B), all of the float element's 415 volume can be submerged according to the following mathematical equations:

$$A_{in} = A_{out}$$

$$A_{in}(h_{in} - H) = V\left(1 - \frac{\rho_b}{\rho_w}\right)$$

$$h_{in} - H = \frac{V\left(1 - \frac{\rho_b}{\rho_w}\right)}{A_{in}}$$

$$H = h_{in} - \frac{V\left(1 - \frac{\rho_b}{\rho_w}\right)}{A_{in}}$$

$$H = h_{in} - \frac{2}{3}r_{ball}\left(1 - \frac{\rho_b}{\rho_w}\right)$$

FIG. 4C displays yet an additional embodiment of the water pressure stabilizer 400, according to some embodiments of the invention, in which inlet 411 comprises a flexible tube 417. As water fills the container 413 through the flexible tube 417, the float element 415 rises upwards, causing the flexible tube 417 to fold and thus reduces flow through the flexible tube 417. When the water level in the container 413 reaches a certain height, the float element 415 causes the flexible tube 417 to kink, so that the water flow into the container 413 is approximately zero.

Figure 22A:
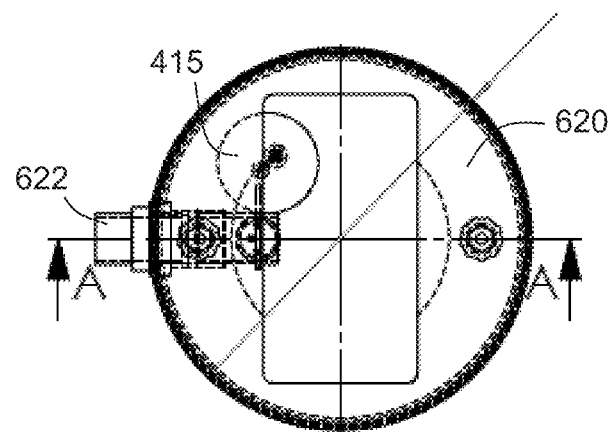
FIGS. 22A-22C are schematic illustrations of an additional type of water pressure stabilizer according to some embodiments of the present invention.
Figure 22B:
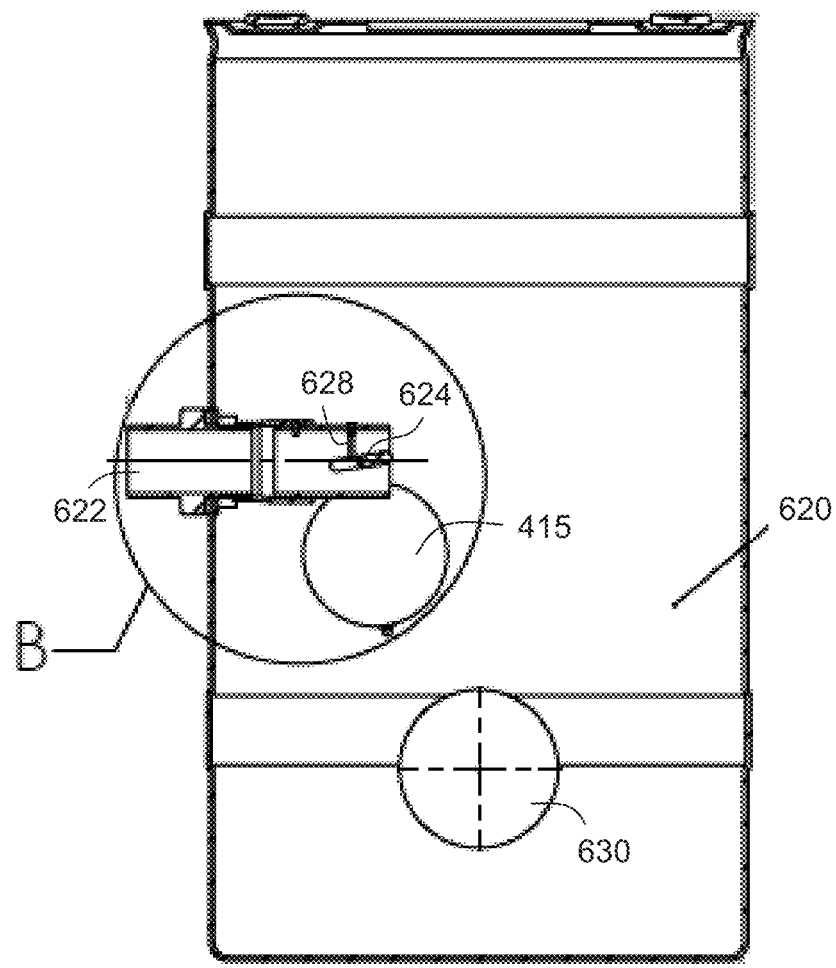
Figure 22C:
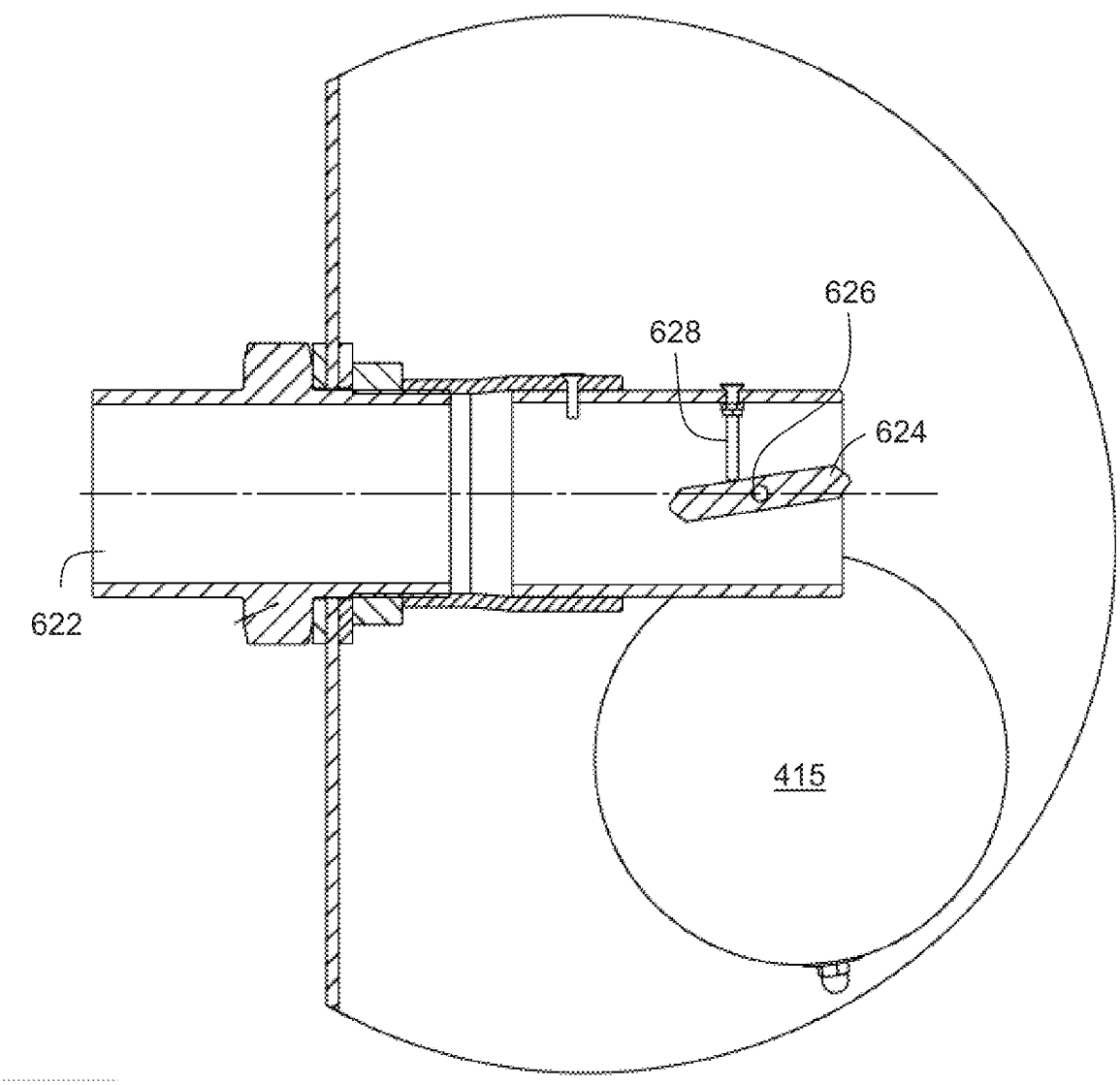

An additional type of water pressure stabilizer 400 suitable for the present embodiments is illustrated in FIGS. 22A-C, where FIG. 22A is a horizontal cross-sectional view, FIG. 22B is a vertical cross-sectional view along the line A-A in FIG. 22A, and FIG. 22C is a detailed view of the section marked "B" in FIG. 22B. The pressure stabilizer 400 shown in FIGS. 22A-C is designed for maintaining a generally stable hydraulic head, and is particularly suitable for deployment at the water distribution conduit 305, to stabilize the pressure of the water before entering the inclined irrigation pipes. In these embodiments, pressure stabilizer 400 comprises a water tank 620, an entry port 622 through which water enters tank 620 and an outlet 630 through which water exit tank 620 into water distribution conduit 305 (not shown in FIGS. 22A-C). In the illustration of FIGS. 22A-C, which is not to be considered as limiting, port 622 is provided as a conduit. A water shutter 624 is mounted on entry port 622, by an axis 626 that allows shutter 624 to rotate. Optionally, pressure stabilizer 400 comprises a stopper element 628, such as a pin or a screw that limits the rotation range of shutter 624 to less than 360°.

In some embodiments of the present invention axis 626 is at the center of shutter 624, so that the pressure of water flowing through port 622 applies forces both on the upper surface and on the lower surface of shutter 624, which forces cancel each other.

Pressure stabilizer 400 also comprises float element 415 that is positioned in association with shutter 624, such that when the water level in tank 620 is raised, float element 415 applies force to shutter 624 to rotate and assume a more upright orientation, and when the water level in tank 620 is lowered, float element 415 releases the force from shutter 624 so that shutter 624 rotates to assume a less upright orientation. The amount of water entering tank 620 through port 622 is thus controlled by shutter 624, wherein when the water level in tank 620 is raised shutter partially closes port 622, and when the water level in tank 620 is lowered shutter reopen port 622. This maintains a generally constant water height in tank 620. It is not necessary for shutter 624 to hermetically seals port 622 since it is typically desired to maintain a generally constant water height only during irrigation. Thus, in some embodiments of the present invention water can enter tank 620 through port 622 even when shutter assumes an upright orientation.

The present embodiments also contemplate a configuration in which a pressure reducing device is used to decrease the pressure at one or more locations along the irrigation pipe without attempting to stabilize the pressure. Such configurations are typically realized when the pressure within the irrigation pipe tends to buildup downstream the inclined pipe. Preferably, the type and/or location of decrease the pressure along the irrigation pipe are selected to ensure that the pressure in the irrigation pipe is maintained at 50 cm $H_2O$ or less at any location along said inclined irrigation pipe.

FIGS. 20A-F and 21A-B are schematic illustrations of water pressure reducing device 600, which can be deployed according to some embodiments of the present invention within the irrigation pipe 304 for reducing the pressure within irrigation pipe 304. Pressure reducing device 600 can comprise a tubular structure 602 and an elongated flow restriction element 604 formed in, or introduced into, the interior of tubular structure 602. Element 604 serves for reducing the water pathway within tubular structure 602, thereby to restrict the flow.

Figure 20A:
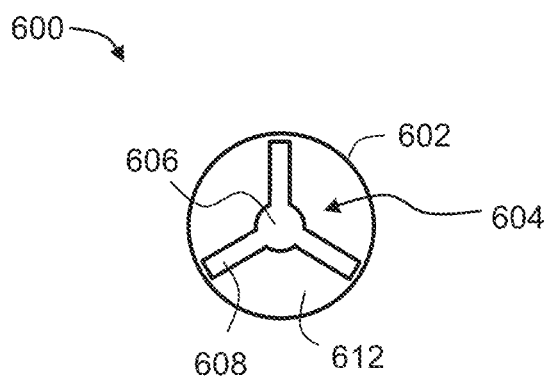
FIGS. 20A-20F are schematic illustrations of water pressure reducing device, in embodiment of the invention in which a flow restriction element comprises an elongated rod and a plurality of spacers.
Figure 20B:
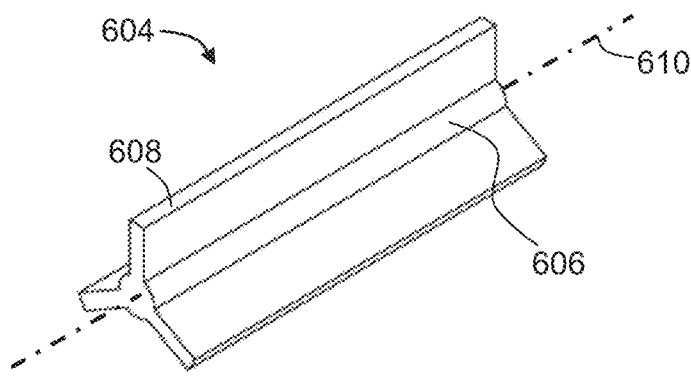

In the configuration illustrated in FIGS. 20A-F, element 604 comprises an elongated rod 606 and a plurality of spacers 608 connected to rod 606 to ensure that rod 606 is spaced apart from the inner wall of tubular structure 602. Spacers 608 can extend longitudinally and continuously along the entire length of rod 606 as illustrated in FIGS. 20B and E. However, this need not necessarily be the case, since, for some applications, it may be desired to make the spacers non-continuous (e.g., one or more sets of discrete spacers distributed along the length of the rod 606). The advantage of this embodiment is that it allows the flow vector to also have an azimuthal component in addition to the axial component.

In operation, water flows in a direction generally parallel to a longitudinal axis 610 of element 604 (or, when spacers 608 are discrete, with a component also in the azimuthal direction) within a water pathway 612 formed between element 604 and the inner wall of tubular structure 602.

Figure 20C:
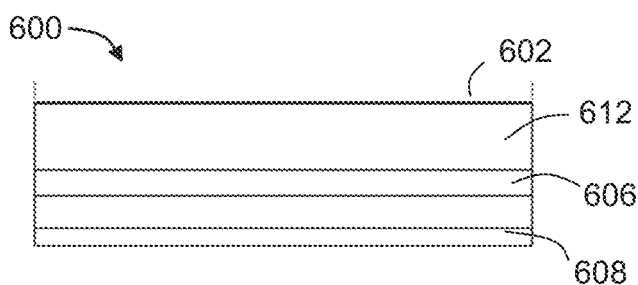
Figure 20D:
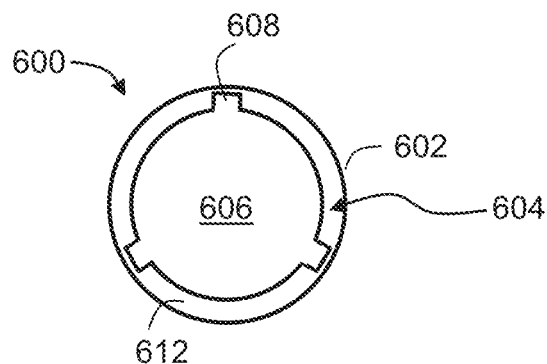
Figure 20E:
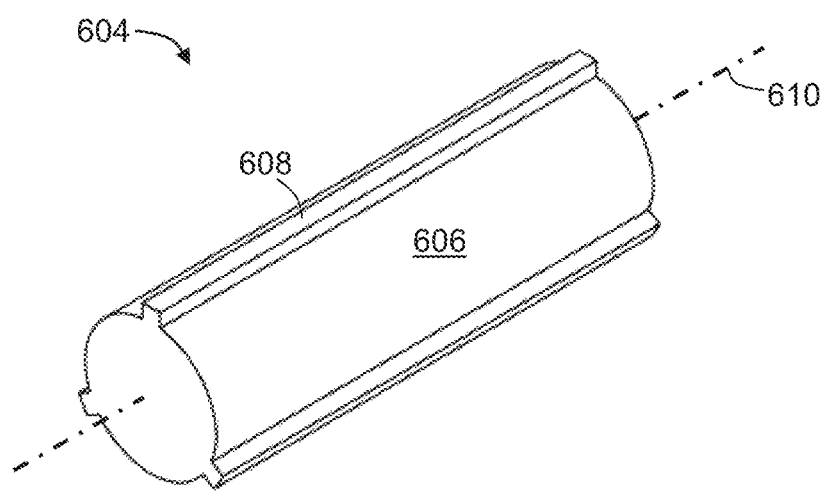
Figure 20F:
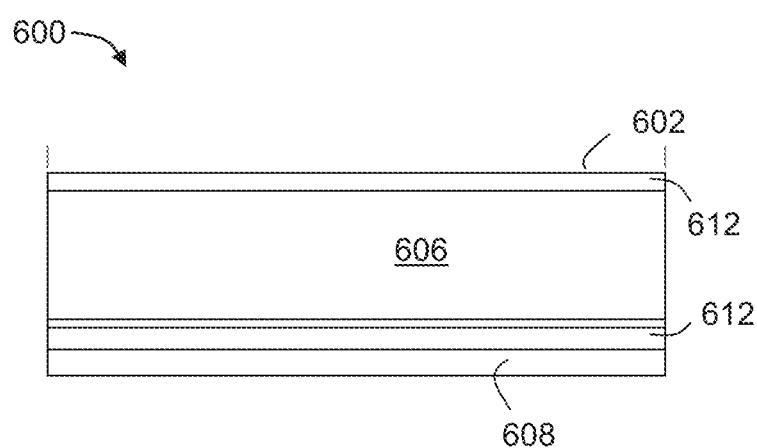

FIGS. 20A and 20D illustrate a transverse cross-sectional view of device 600 (perpendicularly to the longitudinal axis 610 and the general direction of the flow), FIGS. 20B and 20E illustrate an isometric view of flow restriction element 604, and FIGS. 20C and 20F illustrate a longitudinal cross-section of device 600 (parallel to the longitudinal axis 610 and the general direction of the flow). The configuration in FIGS. 20A-C is suitable for lower pressures than the configuration in FIGS. 20D-F, since it provides larger flow space 612.

Figure 21A:
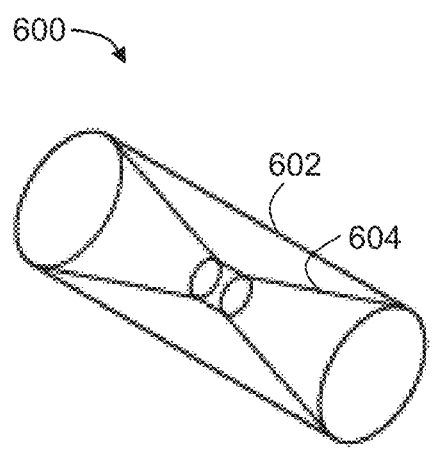
FIGS. 21A and 21B are schematic illustrations of water pressure reducing device, in embodiment of the invention in which a flow restriction element have an hourglass shape.
Figure 21B:
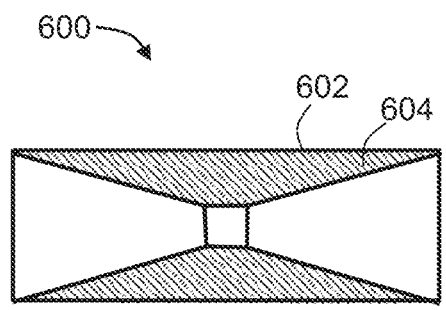

In the configuration illustrated in FIGS. 21A-B, flow restriction element 604 is tapered away from the ends of tubular structure 602 towards the middle section of structure 602. For example, flow restriction element 604 can have an hourglass shape or the like. FIGS. 21A and 21B illustrate an isometric view and a longitudinal cross-section of device 600.

Other shapes for the flow restriction element 604 are also contemplated.

In some embodiments of the present invention there is a plurality of pressure reducing devices 600 mounted on inclined irrigation pipe 304. Preferably, the number of pressure reducing devices 600 is less than the number of drippers on pipe 304.

In embodiments of the invention in which a varying slope is employed, the varying slope is optionally and preferably selected such that for at least one pair of drippers in pipe 304, more preferably for at least two pairs of drippers in pipe 304, more preferably for at least three pairs of drippers in pipe 304, more preferably for any pair of drippers in pipe 304, the ratio between the slope $S_1$ at a location of one of drippers of the pair and the slope $S_2$ at a location of another one of the drippers of the pair, is equal or approximately equal to the nth power of the ratio between the distances of the drippers from the lowermost point of pipe 304 (e.g., the farthest point of pipe 304 from conduit 305). Mathematically, this can be expressed as $S_1/S_2 \propto [(L-l_1)/(L-l_2)]^n$, where L is the length of pipe 304, $l_1$ is the distance between the highest point along pipe 304 and one of drippers of the pair, and $l_2$ is the distance between the highest point along pipe 304 and the other dripper of the pair. The value of the exponent n is preferably from about 1.5 to about 4.5, e.g., about 2 or about 3.

In embodiments of the invention in which a varying slope is employed, the varying slope is optionally and preferably provided by deploying an irrigation pipe along a direction different than the slope in the ground (e.g., unparallel to the slope of the ground). The varying slope can be provided by placing the irrigation pipe on a ground inclined along a direction, in which at least a portion of the irrigation pipe is at an acute angle to the direction, such that a slope of the portion is less than a slope of the ground.

Reference is made to FIGS. 5A-C which are schematic illustrations of a dripper 306, according to some embodiments of the present invention. Dripper 306 optionally and preferably comprises a plurality of holes functioning as water inlets 312. However, this need necessarily be the case, since, for some applications, the end of the dripper can serve as an inlet. Dripper 306 can be useful in irrigation systems such as, but not limited to, the irrigation systems illustrated above with reference to FIGS. 3A, 3B and FIGS. 4A-C. Dripper 306 can be attached to, or located in, one or more irrigation pipes 304. Dripper 306 can be integrated into irrigation pipes 304 during pipe manufacturing process.

Figure 19:
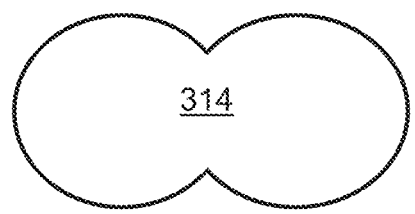
FIG. 19 is a schematic illustration of a shape for an outlet of a dripper, according to some embodiments of the present invention.

In the representative illustration of FIG. 5A, dripper 306 is assembled from an external hollow element 301, e.g., in a shape of a hollow tube; and having one or more water inlets 312 for intaking water into dripper 306, and one or more water outlets 314 for discharging water from the dripper 306. Water outlet 314 can have any shape, including, without limitation, a circular shape, an oval shape, etc. A preferred shape for outlet 314 is illustrated in FIG. 19. In these embodiments outlet 314 comprises two laterally displaced round shapes connected to each other to form a figure-of-eight shape. The present embodiments also contemplate more than two laterally displaced round shapes wherein each round shape is connected to two more other round shapes, preferable to form a continuous opening. The distance between the centers of the round shape is preferably, but not necessarily, from about 0.1 mm to about 40 mm.

Dripper 306 also comprises an internal element 303 having a diameter that is smaller than the diameter of the external hollow element 301, such that when the internal element 303 is inserted inside external hollow element 301, a water pathway 310 is formed in a space therebetween. Pathway 310 can extend from one end 321 of dripper 306 to another end 331 of dripper 306. End 331 is optionally and preferably closed. In various exemplary embodiments of the invention water pathway 310 is formed such that there is at least one inlet-outlet pair that is connected by a straight line that is within water pathway 310. This allows at least a portion of the water to flow along a straight line from one or more of the inlet(s) 312 to one or more of the outlet(s) outlet 314, and is unlike drippers having, for example, zig-zag or labyrinth pathways.

Herein "an inlet-outlet pair" is a pair that includes one of inlet(s) 312 and one of outlet(s) 314.

Water inlets 312 can be in the form of a plurality of small cavities having a diameter from about 0.05 mm to about 1 cm and inter-inlet intervals of from about 0.01 mm to about 1 cm. Water outlets 314 are preferably configured to discharge water from the dripper to provide a desired discharge flow rate of water out from the dripper to the soil or ground. The hole diameter of the water outlets 314 is typically from about 0.5 mm to about 2 mm. Water outlets 314 of dripper 306 can optionally and preferably be in communication with a hole 336 located in the inclined irrigation pipe 304 (shown in FIG. 1B).

According to some embodiments of the invention dripper 306 is characterized by a pressure-discharge dependence which comprises a linear relation between a discharge rate Q (water volume per unit time) at outlet 314 and an inlet pressure P at inlet 312 P, wherein P is in the range of from about 10 cm H$_2$O to about 200 am H$_2$O. This relation can be expressed mathematically as Q=$a_1$P+$a_0$, where $a_1$ is an inlet pressure coefficient and $a_0$ is an offset parameter. A typical value for $a_1$ is from about 7 cubic centimeters per hour per cm H$_2$O to about 40 cubic centimeters per hour per cm H$_2$O or from about 7 cubic centimeters per hour per cm H$_2$O to about 20 cubic centimeters per hour per cm H$_2$O or from about 9 cubic centimeters per hour per cm H$_2$O to about 12 cubic centimeters per hour per cm H$_2$O. A typical value for $a_0$ is from about 0 to about 50 cubic centimeters per hour, or from about 10 cubic centimeters per hour to about 40 centimeters per hour, or from about 20 cubic centimeters per hour to about 30 cubic centimeters per hour.

FIG. 5B illustrates a longitudinal cross-sectional illustration of dripper 306, according to some embodiments of the present invention, and FIG. 5C illustrates an exploded side view of external hollow element 301 (right side) and internal element 303 (left side), according to some embodiments of the present invention.

The dripper 306 may comprise an external hollow element 301 having a first end 331, which may be closed. Internal element 318, with a head 328, may be inserted into the external hollow element 301. Head 328 of internal element 303 preferably closes one end 321 of external hollow element 301 after these elements are assembled together. External hollow element 301 can have a plurality of water inlets 312 at one end 317 and one or more water outlets 314 at the other end 319.

With reference to FIG. 5A, an internal diameter $d_{int}$ is typically defined between the two farthest antipodal points on an outer wall 318 of internal element 303. An external diameter $d_{ext}$ is typically defined between the two farthest antipodal points on an inner wall 322 of external hollow element 301. When the internal element 303 is introduced into the external hollow element 301, a water pathway 310 is created having a width W. The width W is optionally and preferably set to provide a sufficiently narrow water pathway 310 and to provide a small hydraulic diameter ($D_H$) for reducing flow within the dripper 306.

The hydraulic diameter ($D_H$) is a parameter that is defined as four times the ratio between a flow area A and a wetted perimeter of a conduit, P, as defined in Equation I:

$$D_H = 4A/P \tag{EQ. I}$$

In EQ. I A can be the cross-sectional area of the water pathway 310 in dripper 306 and P can be the wetted perimeter of the cross-section, in which case $D_H$ is referred to as the hydraulic diameter of pathway 310.

For example, when water pathway 310 has a circular shape, the hydraulic diameter according to EQ. I above is reduced to the diameter of the circle forming the pathway.

A typical hydraulic diameter of pathway 310, suitable for the present embodiments is from about 50 μm to about 500 μm. Other values for hydraulic diameter are also contemplated, provided that clogging within the water pathway 310 is reduced or inhibited, as further discussed hereinbelow with reference to FIG. 6.

When water pathway 310 has an annulus shape, the hydraulic diameter is defined as the width W of the pathway, which can be calculated as the difference between the internal diameter $d_{501}$ of external hollow element 301, and the external diameter $d_{508}$ of internal element 303, according to EQ. II:

$$D_H = W = d_{301} - d_{303} \tag{EQ. II}$$

It is appreciated that the water flow rate decreases in a channel as its hydraulic diameter decreases.

The Inventors of the present invention found that by utilizing a narrow hydraulic diameter dripper according to preferred embodiments of the present invention, particular at a low operating pressure, may provide a low discharge flow rate when exiting from dripper 306. Small hydraulic diameter may be achieved by providing a sufficiently large relative surface area of the narrow water pathway 310, and/or by reducing the energy of water flowing in the water pathway 310, for example, by increasing friction for water flow of the narrow water pathway 310 of the dripper 306. An enlarged relative surface area of water pathway 310 can be achieved, for example, by making shaped pathway. For example, the pathway can be shaped as a polygon (e.g., a triangle, a square, etc.). An enlarged relative surface area of water pathway 310 can alternatively or additionally be achieved by providing a sufficiently long pathway between the inlet 312 and outlet 314.

Particle accumulation at the dripper entrance can cause clogging and reduced flow discharge, thus resulting in flow discharge decrease or no flow.

Figure 6:
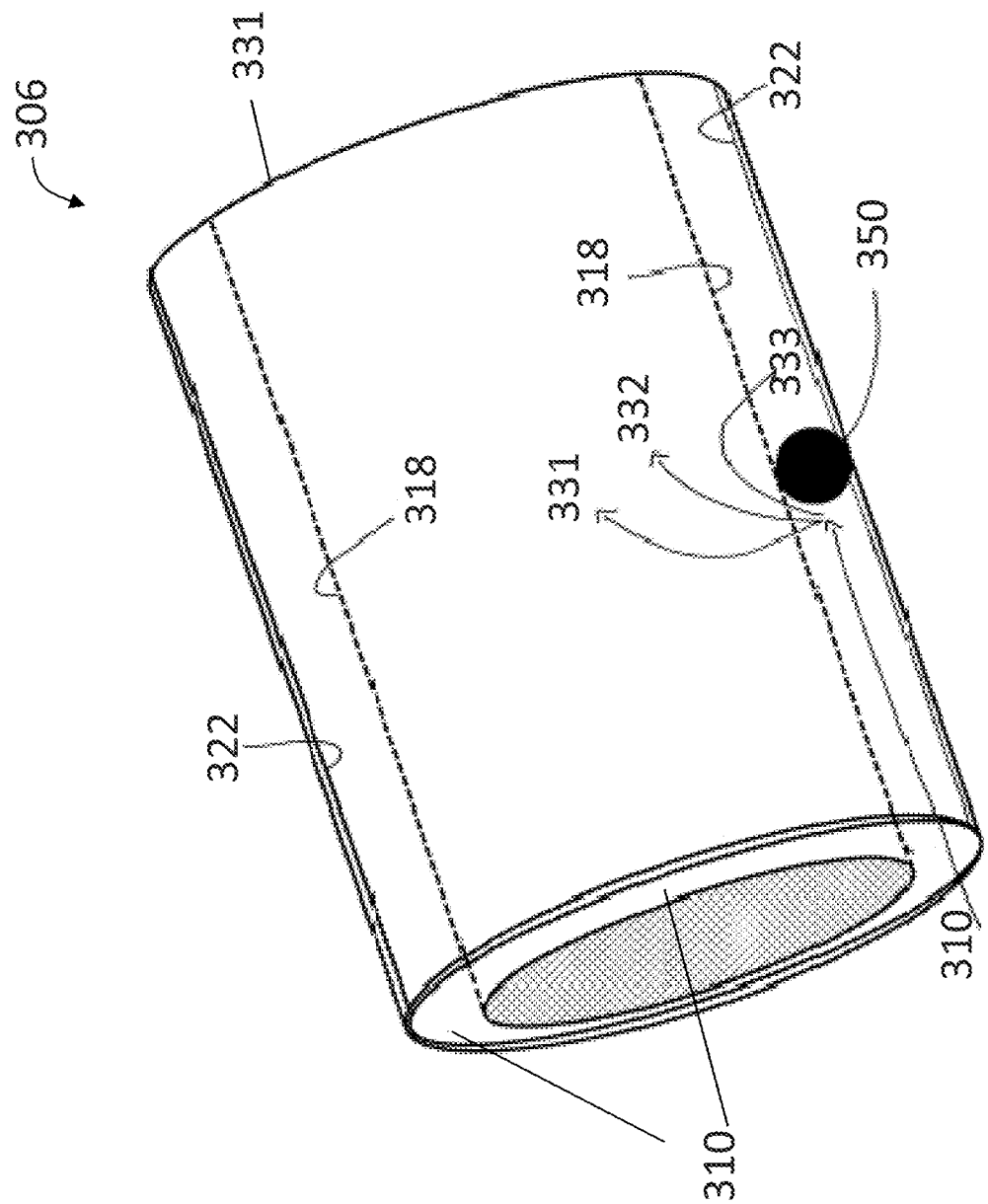
FIG. 6 is a schematic illustration showing a perspective view of the dripper in embodiments in which the assembled dripper has an obstacle in its water pathway.

The advantage of having a pathway as described above can be better understood with reference to FIG. 6 which illustrates a perspective side view of dripper 306 according to some embodiments of the present invention. Shown is an obstacle 350, such as a particle or an air bubble, in its water pathway 310, which, in the illustrated embodiment, has an annulus shape. Obstacle 350 can be in contact with inner wall 322 of external hollow element 301 and outer wall 318 of internal element 303 of dripper 306, thereby partially or even completely clogging a region pathway 310. However, since pathway 310 is not one-dimensional, there are other alternative paths within pathway 310 allowing bypass routes 331, 332 and 333 around any obstacle that may be inside dripper 306. Moreover, the amount of particles entering the dripper may be reduced by providing dripper 306 with a narrow entrance. Water inlets 304 may be of a size of from about 50 µm to about 500 µm. Thus, pathway 310 is not completely blocked by obstacle 350.

In some embodiments of the present invention there are multiple capillary water inlets 312. Typically, but not necessarily, for example, between 1 and 100 capillary water inlets are employed. The advantage of having a multiplicity of capillary water inlets is that the capillary water inlets can serve as a filter for dripper 306, and reduce the risk of dripper clogging.

According to some embodiments of the present invention, the hydraulic diameter $D_H$ is from about 0.01 to about 1 mm. According to some embodiments of the present invention the external hollow element 301 has an inner diameter of from about 0.5 mm to about 5 mm.

Cross-sectional area of the dripper suitable for the present embodiments can be from about 3 mm$^2$ to about 300 mm$^2$, depending on the width of water pathway 310. The water flow rate of water flowing through dripper 306, is typically from about 100 ml/h to about 10,000 ml/h at a hydraulic pressure of from about 0.1 m H$_2$O to about 2 m H$_2$O. For example, a dripper of about 3 cm in length and an annulus about 100 µm in width can produce a flow rate of about 1400 ml/h at a pressure of 1.5 m H$_2$O.

The outer surfaces of external 301 and internal 303 elements may be parallel to each other up to a tolerance of about 10%. The distance between water inlets 312 can be from about 0.5 to about 2 mm. The distance between water inlets 312 and water outlets 314 can be from about 1 to about 6 cm.

As may further be appreciated, irrigation system 300, by employing the drippers of the present embodiments, and operating them at a low pressure may eliminate a need for pump 12 of the kind displayed in FIGS. 1A-B, and as a result, irrigation pipes 304 of the present embodiments may be made of fewer and cheaper raw materials.

In addition, the Inventors found the dripper of the present embodiments allows particles to be washed out by water flowing inside. Even if particles are partially clogged within the dripper of the present embodiments, the partial clogging may unclog when clean water is provided to the dripper, by washing the particle away. As a result, the dripper of the present embodiments has natural, built-in, self-cleaning capabilities.

With reference now to FIGS. 7A and 7B, the plurality of drippers 306 in any one of the embodiments of the irrigation system described above can be positioned either horizontally or vertically relative to the position of the irrigation pipe 304, as illustrated in FIG. 7A and FIG. 7B, respectively.

FIGS. 8A and 8B are cross-sectional illustrations of partial water pathway inside a dripper 306, according to some embodiments of the present invention.

As described hereinabove in FIGS. 5A-5C, water pathway 310 is created by assembling the internal element 303 with the external hollow element 301. Internal element 303 may have alternative cross-sections such by utilizing the water pathway 310 in a shape of a partial ring, namely, by partially utilizing at least a portion of the annulus 310. Any of the components of dripper 306 may comprise molded plastic. Internal element 303 may be inserted into external hollow element 301.

In some embodiments of the present invention one or more covers may be put on one or more sides of external hollow element 301, thereby closing one or more of its ends.

FIGS. 9A-L are schematic illustrations showing cross-sectional views of dripper 306, according to several embodiments of the present invention. FIGS. 9A and 9B illustrate a side view (FIG. 9A) and a sectional view along the A-A line (FIG. 9B) of dripper 306 in embodiments in which dripper 306 comprises diagonal holes in the sides and exit holes under a dressed head (the left side is not shown in the drawing). FIGS. 9C and 9D illustrate a side view (FIG. 9C) and a sectional view along the B-B line (FIG. 9D) of dripper 306 in embodiments in which dripper 306 comprises elliptically shaped water inlet (see also FIG. 10A, below) with a filter 313. FIGS. 9E and 9F illustrate a side view (FIG. 9E) and a sectional view along the C-C line (FIG. 9F) of dripper 306 in embodiments in which dripper 306 comprises an elliptically shaped water inlet without a filter (see also FIG. 10B, below). FIGS. 9G and 9H illustrate a side view (FIG. 9G) and a sectional view along the D-D line (FIG. 9H) of dripper 306 in embodiments which are similar to those shown in FIGS. 9A and 9B, except for a shorter distance between the dripper's end and the exit holes. FIGS. 9I and 9J illustrate a side view (FIG. 9I) and a sectional view along the E-E line (FIG. 9J) of dripper 306 in embodiments in which are similar to those shown in FIGS. 9C and 9D, except that dripper 306 comprises diagonal holes under a cover. FIGS. 9K and 9L illustrate a side view (FIG. 9K) and a sectional view along the F-F line (FIG. 9L) of dripper 306 in embodiments in which are similar to those shown in FIGS. 9C and 9D, except that the outer shape is tapered to reduce friction.

Figures 14A, 14B, 14C:
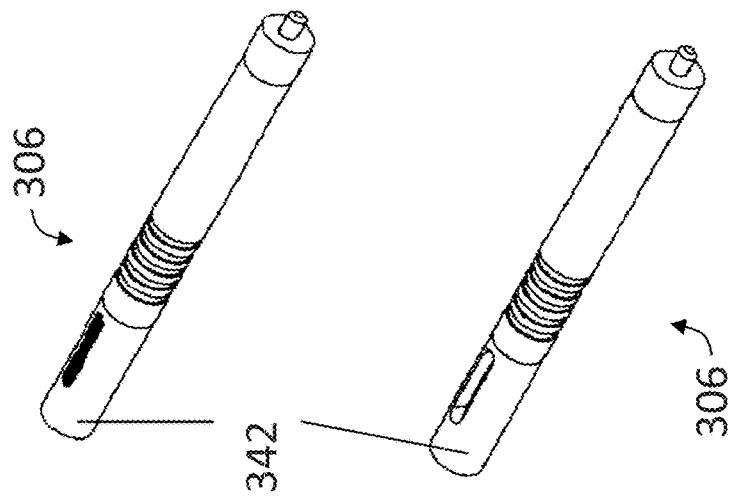
FIGS. 14A-14F are schematic illustrations showing perspective views of several of the drippers shown in FIGS. 9A-9L, according to some embodiments of the present invention.
Figures 14D, 14E, 14F:
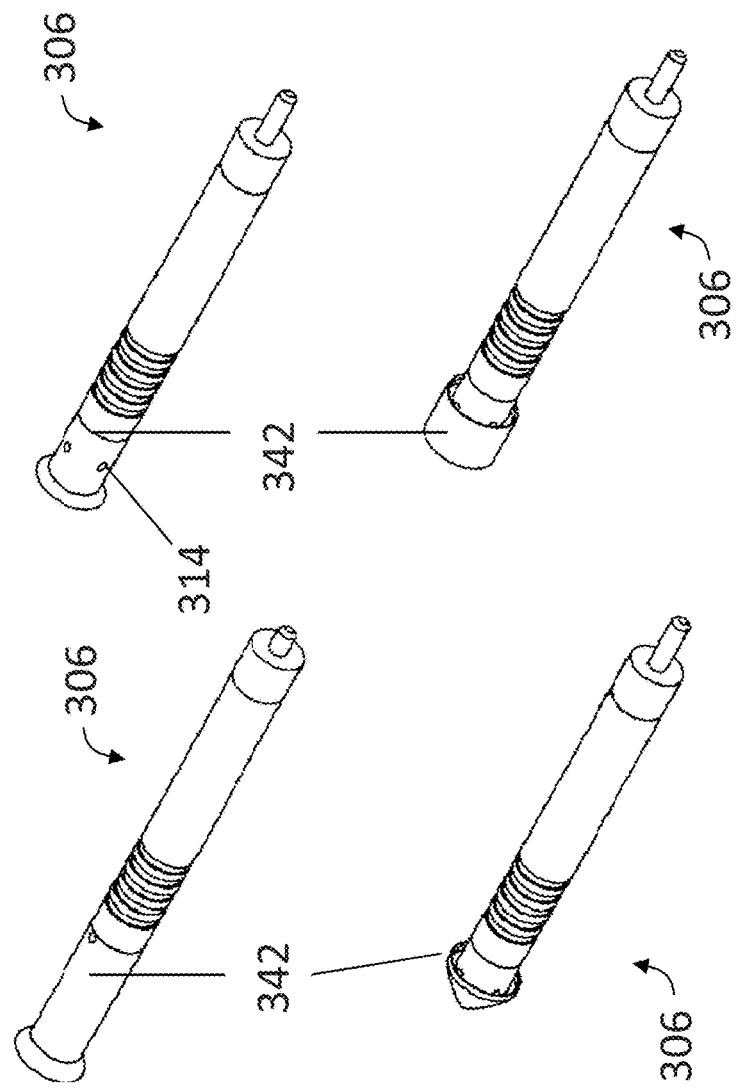

Perspective illustrations of the drippers illustrated in FIGS. 9A-L are shown in FIGS. 14A-F, where FIG. 14A corresponds to FIGS. 9A and 9B, FIG. 14C corresponds to FIGS. 9C and 9D, FIG. 14F corresponds to FIGS. 9E and 9F, FIG. 14B corresponds to FIGS. 9G and 9H, FIG. 14E corresponds to FIGS. 9I and 9J, and FIG. 14D corresponds to FIGS. 9K and 9L. The cover on external hollow element 301 is shown in FIGS. 14A-F at 342.

In some embodiments of the present invention the dripper comprises a niche 346 formed in the external surface of the dripper, for example, at the external hollow element 301 of dripper 306, wherein the outlet 314 is formed within niche 346. Preferably, but not necessarily, niche 346 is non-circular. The area of niche 346 is preferably at least 10 times larger than an area of outlet 314.

The length of external hollow element 301 and internal element 303 may be between about 20 and 50 mm. The diameter of external hollow element 301 may be between about 1 and 10 mm, and the diameter of internal element 303 may be between about 0.5 and 9.7 mm. The size of inlet 312 and outlet 314 may be between about 0.5 and 5 mm. The height of "baths" 346 may be between about 100 and 500 micron larger than narrow space 310 and the width of narrow space 310 may be between about 50 and 400 micron.

It will be appreciated that although some of the drippers according to some embodiments of the invention, and their components that were described above are assembled from more than one element (e.g., two or three parts) and the water pathway 310 is created by assembling the elements, the drippers 306 according to some embodiments of the invention may also be manufactured in other configurations in which a dripper body is formed as a single unitary, preferably monolithic, element having an external structure 301 enclosing an internal structure 303 to form a water pathway in a space 310 therebetween (e.g., as shown in FIGS. 10H-10K).

The dripper 306 has one or more water inlet 312 for intaking water into the dripper 306, and one or more water outlets 314, to provide a flow of water. Water outlet 314 can have any of the aforementioned shapes (including, without limitation, circular, oval, figure-of-eight shape, etc.). In some embodiments, the dripper has more than one water inlet 312 for intaking water into the dripper 306, wherein one or more of the additional water inlets 3121 are at an acute angle to the water pathway 310. The advantage of these embodiments is that the additional water inlets 3121 facilitate turbulence within the dripper 306 and therefore improve the discharge efficiency. For example, the turbulence can prevent particles from accumulating in water entry area of the dripper 306. The additional inlets 3121 may be positioned on an outer surface of the external structure 301 of the dripper 306. In some embodiments, dripper 306 does not include any inlet in an outer surface of the external structure 301 (e.g., as shown in FIGS. 10I-10J). In some embodiments, dripper 306 includes one inlet 3121 in an outer surface of its external structure 301 (e.g., as shown in FIGS. 10G-10H), or two inlets 3121 in an outer surface of its external structure 301 (e.g., as shown in FIGS. 10K-10L).

According to some embodiments of the invention dripper 306 is characterized by a pressure-discharge dependence of $b^{th}$ power of inlet pressure P at an inlet of the dripper and discharge rate Q (water volume per unit time) at outlet of the dripper. This relation can be expressed mathematically as $Q=aP^b$, where a is an inlet pressure coefficient. When Q is expressed in cubic cm per hour, and P is expressed in cm $H_2O$, the value of b is optionally and preferably from about 0.2 but less than 1, or from about 0.3 to about 0.95, or from about 0.4 to about 0.95, or from about 0.5 to about 0.95, or from about 0.5 to about 0.9, and the value of a is optionally and preferably from about 5 to about 100, or from about 6 to about 99, or from about 7 to about 98, or from about 8 to about 97, or from about 9 to about 96, or from about 5 to about 95, or from about 10 to about 90. The values of a and b can be selected by judicial design of the number of inlets and its or their angle relative to the flow direction within water pathway 310.

It will be appreciated that although the drippers and their components that were described herein have a cylindrical shape, they may also be manufactured in other shapes such that the external hollow element and the internal element described herein may be in any shape or form, such as, ellipse, square, rectangular, triangular, hexagonal, octagonal, etc.

Alternatively or additionally, the dripper according to the present embodiments may have an elliptically shaped water inlet, or a plurality of such shaped inlets.

Alternatively or additionally, the dripper according to the present embodiments may have a water inlet having any geometric shape, such as square, rectangle, triangle and circle.

With reference to FIG. 10A, there is illustrated a perspective side view of an assembled dripper 306 having an elliptically shaped water inlet 3121 according to some embodiments of the present embodiments. As shown, the water inlet is positioned perpendicular to the drip.

Reference is now made to FIG. 10B, which displays a perspective side view of an assembled dripper 306 having an elliptically shaped water inlet 3121 and comprising a filter according to some embodiments of the present embodiments. The elliptical water inlet 3121 (or a plurality of such inlets) comprises a filter 340 in various possible shapes (grid, cross-sectional or longitudinal grooves). As shown, the water inlets 3121 are positioned perpendicular to the drip 306.

In addition to the vertical elliptical inlet 3121 as displayed in FIGS. 10A and 10B, there are additional inlets, which are not vertical to the drip 306, through which water enters when their flow direction is generally at an obtuse angle θ to the flow of water in the drip. Typical values of θ include, without limitation, from about 110° to about 155°, or from about 120° to about 145°, or from about 130° to about 145°, e.g., about 135°. FIGS. 10C and 10D illustrate a cross sectional view (FIG. 10C) and a perspective side view (FIG. 10D) of an assembled dripper having an elliptically shaped water inlet 3121 and an additional water inlet 3122 oriented diagonally with respect to a normal to an outer surface of an external hollow element 301 according to some embodiments of the present embodiments.

The inlets reach a level where water enters the drip and creates turbulence that prevents particles from accumulating in the water entry area. The drip water entry area is the area where particles may accumulate and may cause a partial or complete blockage of the drip, such that if particles have been introduced into the drip 306, then the particles may not accumulate and may exit through the outlet as a result of the dripper's three-dimensional shape and smoothness. The water inlets 3122 may be oriented in a diagonal position with respect to a normal to an outer surface of the external hollow element 301, which may produce turbulent flow of water in entry to the dripper inlet.

Figures 10E, 10F:
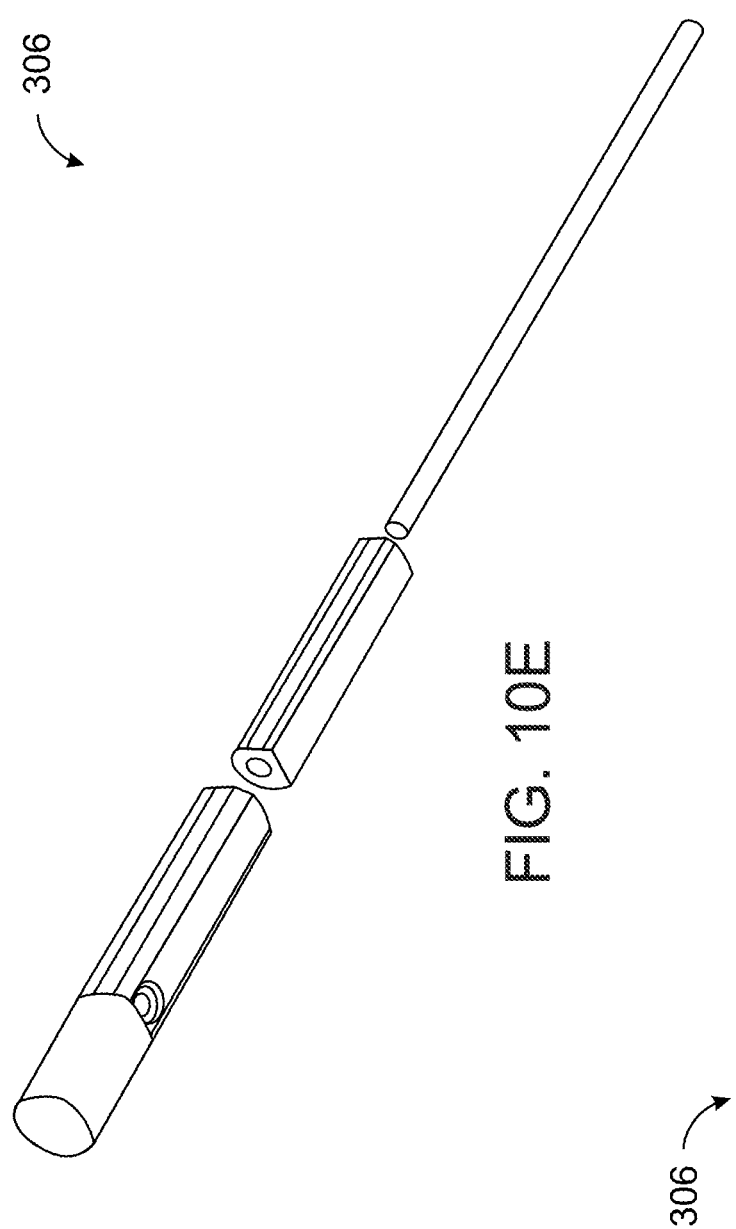
FIGS. 10E and 10F are schematic illustrations showing a perspective view (FIG. 10E) and a cross sectional view (FIG. 10F) of the assembled dripper in embodiments of the invention in which the dripper include an internal element being held from one side of the dripper.
Figure 10H:
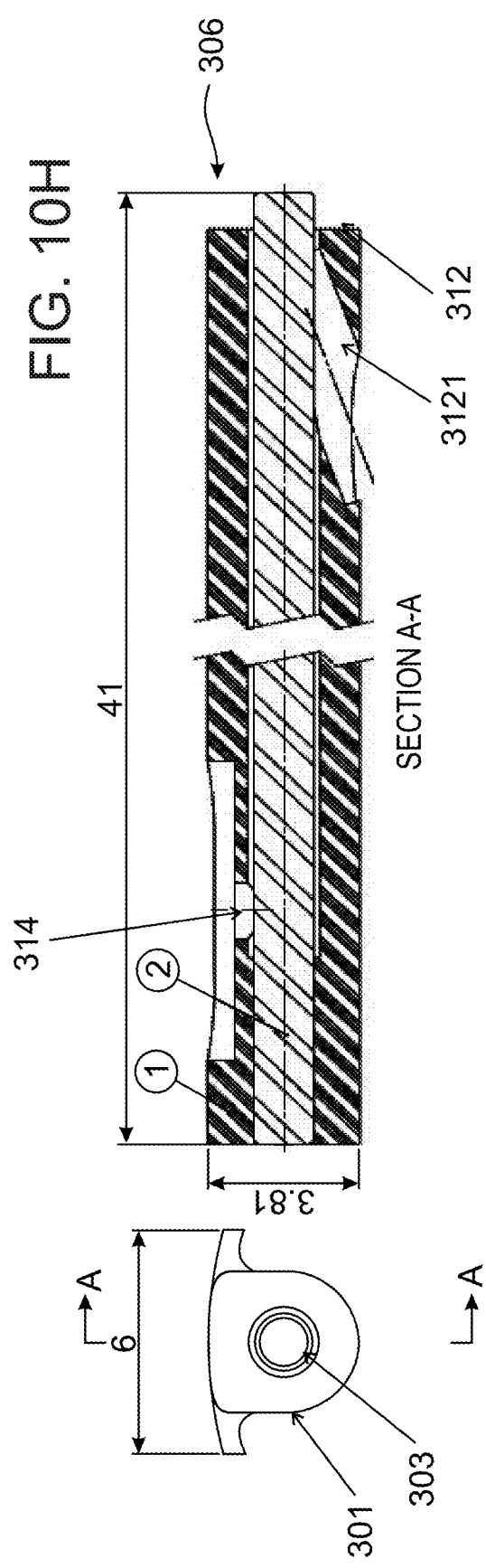
FIGS. 10G-10H are schematic illustrations showing a perspective view and a cross sectional view of the dripper in embodiments of the invention in which the dripper includes one opening on its outer surface.
Figure 10G:
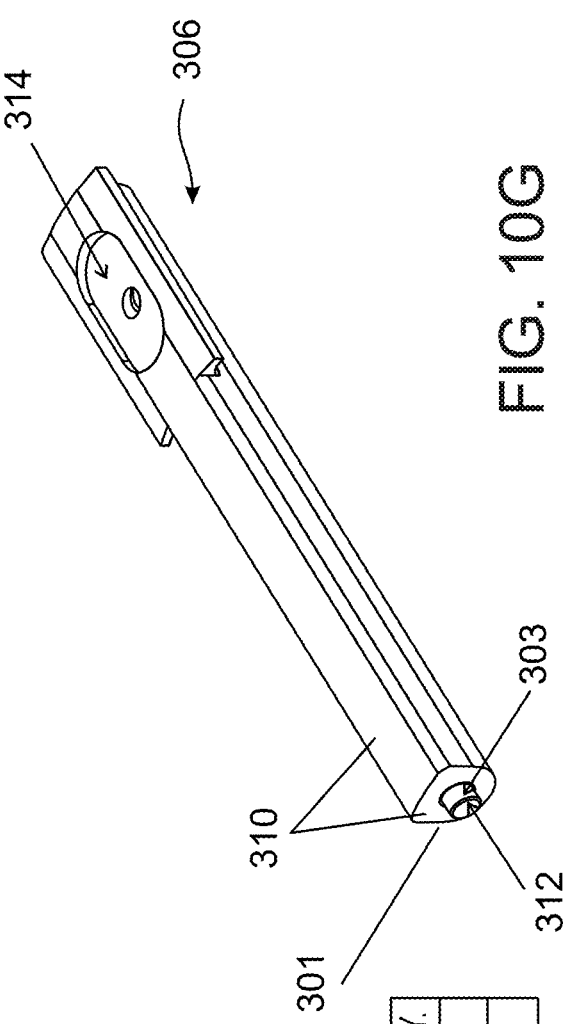

FIGS. 10E and 10F are schematic illustrations showing a perspective view (FIG. 10E) and a cross sectional view (FIG. 10F) of the assembled dripper in embodiments of the invention in which the internal element is held only from one side.

As described herein above, it was realized by the inventors of the present invention that drip irrigation systems work at pressures between 0.5 to 4 bar and cannot be applied in large commercial fields using a work pressure lower than 0.1 bar. The inventors devised an irrigation system having an irrigation pipe inclined at a slope that can be selected such that a water discharge along a length of the pipe varies by no more than about 50%, or no more than about 40%, or no more than about 35%, or no more than about 30%, or no more than 20%, or no more than 18%, or no more than 16%, or no more than 15%, or no more than 13%, or no more than 12%, or no more than 10%.

Figure 15:
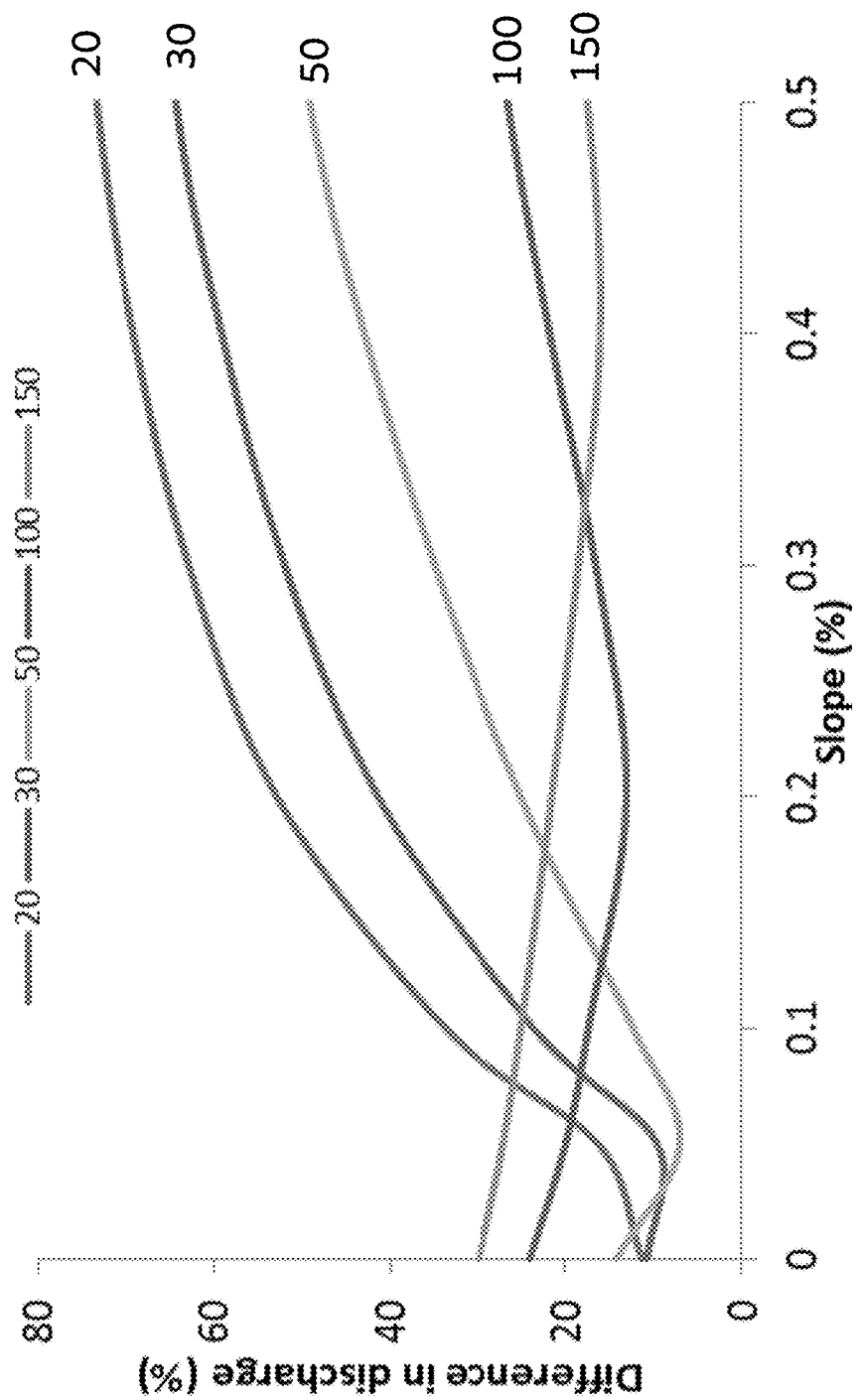
FIG. 15 is a graph plotting a difference in percentage between a dripper with high discharge to a dripper with low discharge as a function of a field slope for inlet heads about 20, 30, 50, 100 and 150 cm, pipe length of about 150 m and pipe diameter of about 25 mm, as obtained in experiments performed according to some embodiments of the present invention.

FIG. 15 is a graph plotting a difference in percentage between a dripper with high discharge to a dripper with low discharge as a function of a field slope for inlet heads about 20, 30, 50, 100 and 150 cm, with 4 drippers per meter, pipe length of about 150 m and diameter of about 25 mm, as obtained in experiments performed according to some embodiments of the present invention and listed in Table 1.

TABLE 1

Dripper discharge variation coefficient along the pipe as a function of field slope and size of inlet head

| Slope (%) | Inlet head (cm) | | | |
|---|---|---|---|---|
|  | 20 | 30 | 40 | 50 |
| 0 | 6.15 | 6.01 | 6.77 | 14.79 |
| 0.05 | 3.95 | 2.75 | 3.53 | 13.20 |
| 0.1 | 10.22 | 7.16 | 4.72 | 11.81 |
| 0.2 | 19.84 | 15.49 | 9.87 | 9.75 |
| 0.5 | 34.56 | 29.27 | 21.51 | 9.55 |
| 0.75 | 39.93 | 35.04 | 27.65 | 12.32 |
| 1 | 43.47 | 39.12 | 32.24 | 15.51 |
| 1.5 | 48.41 | 44.84 | 38.85 | 21.62 |

Pressure at the last dripper was set to an estimated value and the dripper discharge was calculated. The head loss to the next dripper was calculated and the head change due to the slope to determine the pressure at the inlet of that dripper. The discharge of the two drippers was summed and so forth to the beginning of the pipe. Microsoft Excel "goal seek" function was used to change the pressure at the last dripper to set the target inlet head according to Table I above. The field slope was varied to evaluate slopes for efficiently operating the irrigation system of the present invention given maximum discharge difference of 10%

The pipe slope can cause higher pressure at the end (depending on the slope), and thus, higher dripper discharge. The increased discharge towards the pipe end can cause lower discharge variability along the pipe and acceptable uniformity in yields.

The irrigation system according to the present invention can be designed to connect to existing agricultural water supply systems, which can be used for flood irrigation.

Field slope can be used as a design variable to directly influence the pipe pressure, and thus, the drippers' flow discharge along its length. The slope along the pipe can vary depending on the pipe length, the density of the drippers (number per tube length), and the water head at the inlet. As water flows in the pipe, there can be a pressure drop along the flow pathway due to friction, and therefore, there can be variations in drip flow.

Figure 17A:
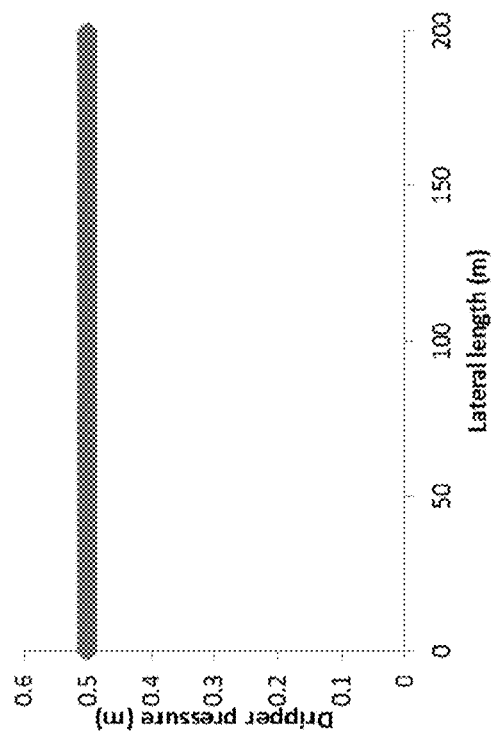
FIGS. 17A-17C are graphs of the inlet pressure as a function of the conduit length for a slope of 0° (FIG. 17A), varying slope (FIG. 17B), and slope selected to ensure a uniform flow rate (FIG. 17C), as obtained in experiments performed according to some embodiments of the present invention.
Figure 17B:
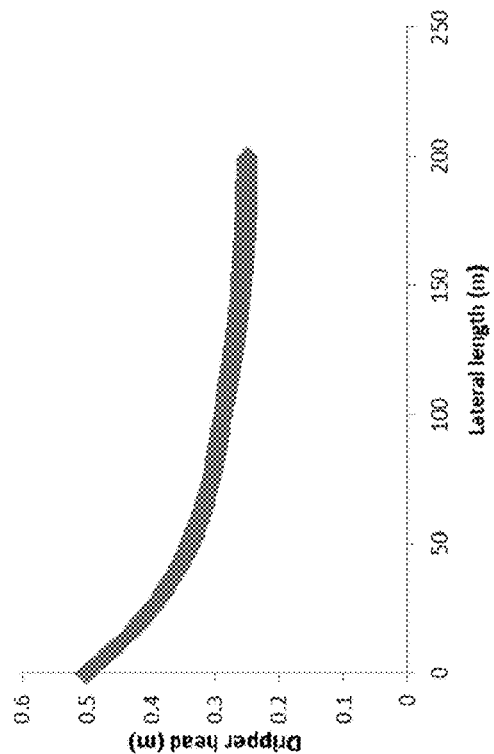
Figure 17C:
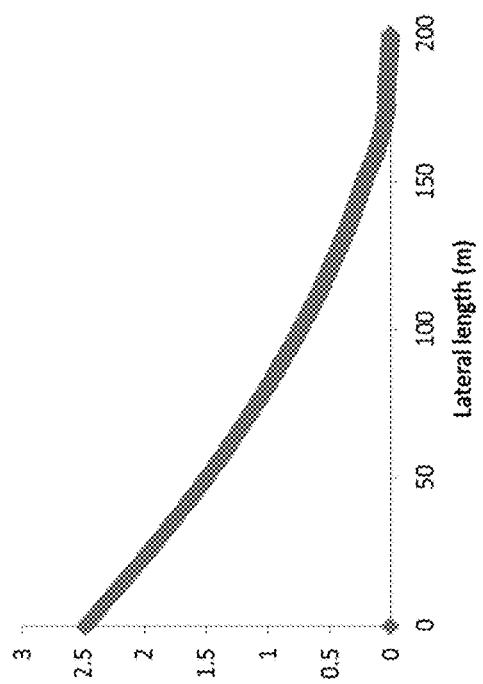

FIGS. 17A-17C are graphs of the inlet pressure as a function of the conduit length for a slope of 0° (FIG. 17A), varying slope (FIG. 17B), and slope selected to ensure a uniform flow rate (FIG. 17C), as obtained in experiments performed according to some embodiments of the present invention.

As shown in FIG. 17A, in a 200 m pipe without a slope (slope of 0°), the pressure decreased from 0.5 m at the beginning of the pipe to 0.16 m at its end. This pressure difference exhibits a difference of 67% in the flow rates. Head loss in the flow along the dripper can be calculated by the Darcy-Weisbach equation as described above.

Fields that are typically irrigated by flooding can have small slopes of between about 0.02% and about 1%. Therefore, in conventional dripping systems, where the working pressures are high of about 10-14 m, the slope has no significant effect, as the height differences are negligible relative to working pressures.

According to the system of the present invention, in which the working pressure can be close to zero, small height differences along the pipe length can have a substantial effect on the pipe pressure and the drippers flow rate. The slope 330, S(l), can vary along the pipe to compensate for the pressure loss.

The slope at any point l along pipe 304 can be expressed mathematically as a slope function S(l). The slope function can be input to a controller of a shoveling tool, such as, but not limited to, a laser guided land-leveling system, to form a varying slope in a soil, and inclined irrigation pipe 304 with drippers 306 can be deploying, generally along the varying slope.

A representative slope function suitable for the present embodiments is:

$$S(l) = K * f_d * \frac{q^2}{gD_H^5} * (L - l)^3, \tag{EQ. IV}$$

where K is a dimensionless constant. Typically, K is from about 0.1 to about 0.5 or from about 0.1 to about 0.3, where L is the length of the irrigation pipe 304, $f_d$ is a friction factor, q is a flow rate in irrigation pipe 304 per unit length, g is the gravitational acceleration, $D_H$ is a hydraulic diameter of said irrigation pipe 304, and l is a distance along irrigation pipe 304 from the highest level thereof.

Another representative slope function suitable for the present embodiments is:

$$S(l) = G \frac{q^\alpha}{C^\gamma D_H^\delta} (L - l)^\beta \tag{EQ. V}$$

where c is a smoothness coefficient of the pipe's material, and G, $\alpha$, $\beta$, $\gamma$ and $\delta$ and $\varepsilon$ are constant parameters. A typical value for G is from about 9 to about 11, a typical value for any of $\alpha$, $\beta$ and $\gamma$ is from about 1.2 to about 2.2, and a typical value for $\delta$ is from about 4 to about 5.5. In some embodiments of the present invention at least two, more preferably all, of $\alpha$, $\beta$ and $\gamma$ have the same value.

Since the pressure loss is greater at the beginning of the pipe and gradually decreases along the pipe, there can be a steeper slope at the beginning of the pipe and can be more moderate along the pipe length. In some embodiments of the present invention the slope S is selected also based on the distance between drippers 306. The flow rate can also be affected by the distance between drippers, since each dripper can reduce the volume of water flowing through the pipe.

At the beginning of the pipe, the water flows at a maximum flow rate, and when water reaches the first dripper after a distance x, the flow rate gradually decreases in accordance with the flow rate in the dripper and so on. In the last portion of the pipe (up to the last dripper) the flow rate in the pipe equals the flow rate in the last dripper.

In some embodiments, the variation of the slope of the irrigation pipe can be ensured, at least partially, by orienting at least a portion of the irrigation pipe at an acute angle with respect to a direction of the slope of the ground on which the pipe is placed, such that the slope of the portion is less than the slope of the ground. Mathematically, these embodiments can be described by the following slope function suitable:

$$S(\alpha) = S_X \sin \alpha + S_Y \cos \alpha \tag{EQ. VI}$$

where $S(\alpha)$ is the slope at a certain angle $\alpha$, $S_y$ is the slope in the direction of water distribution conduits 305, $S_x$ is the slope in the direction perpendicular to the direction of water distribution conduits 305, and $\alpha$ is measured in the plane of the field.

In FIGS. 17B and 17C, the slope can be determined so that the drip flow along the pipe is generally uniform (e.g., with tolerance of ±50%, more preferably ±40%, more preferably ±35%, more preferably ±30%, more preferably ±20% or less). FIG. 17B shows that uniform flow can be achieved by the slope shown in FIG. 17C.

As used herein the term "about" or "approximately" refers to ±10%.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

Examples

Reference is now made to the following examples, which together with the above descriptions illustrate some embodiments of the invention in a non limiting fashion.

Dripper Flow Rate Stability and Resistance to Clogging

Experiments were conducted to test the discharge and resistance to clogging of the drippers of the present embodiments. The experiments were performed over a period of 4 months.

A first experiment was conducted with water containing 300 ppm of suspended particle concentration. Half of this amount was from sandy soil where 35% of the particles had a diameter larger than 150 μm. The other half was from loamy soil where 100% of the particles had a diameter smaller than 150 μm.

The soils were added to a first water tank and stirred with a submersible pump. From the first water tank, the water was transferred to a second water tank using a peristaltic pump operated to achieve a constant 300 ppm of suspended particle concentration.

The water in the second tank were stirred using a submersible pump to avoid precipitation of the particles in the tank. The hydraulic head at the exit from the second tank was about 46 cm. Drip irrigation using drippers that contained a pathway with an annular transverse cross-section in accordance with some embodiments of the present invention the present embodiments was applied once a day on workdays for about 8 hours.

Figure 23A:
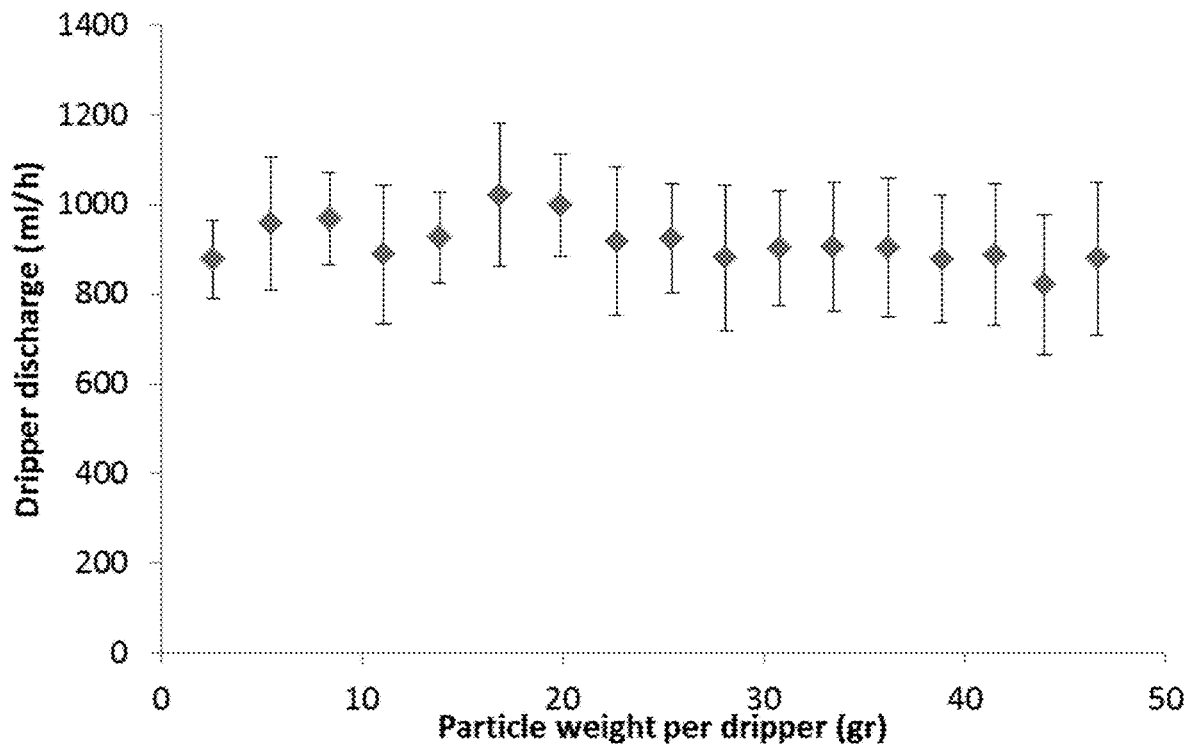
FIGS. 23A and 23B show the effect of irrigation with water that contains suspended solids on dripper discharge, as obtained in experiments performed according to some embodiments of the present invention.

The effect of irrigation with 300 ppm water on dripper discharge is presented in in FIG. 23A, showing the dripper discharge as a function of the accumulated particle weight. Each point in FIG. 23A represents the average of 32 drippers. After a month of daily irrigations, irrigation water with 300 ppm had no effect on dripper discharge.

In a second experiment, the suspended particle concentration was raised to 1000 ppm which corresponds to extremely high peaks in natural surface water. The experimental setup was similar to the setup for the first experiment. In addition to the drippers of the present embodiments that contained a pathway with an annular transverse cross-section (perpendicular to a longitudinal axis of the dripper), commercial labyrinth drippers were also used for comparison.

Figure 23B:
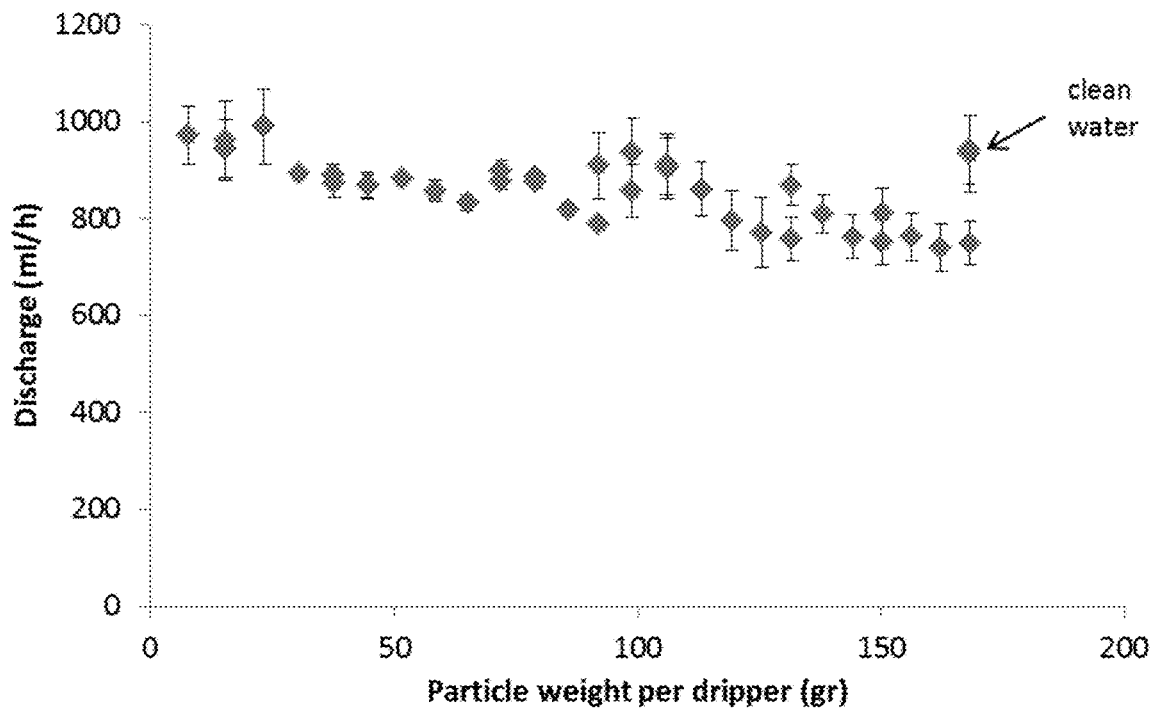

The results of the second experiment are shown in FIG. 23B. A single point representing clean irrigation water is also shown and is the result of two weeks of daily measurements. These measurements are represented by a single point since the abscissa is the accumulated particle amount.

The higher particle concentration in the irrigation water caused a slight decrease in the discharge of the dripper of the present embodiments (from about 950 ml/h to about 750 ml/h). A particle that is temporarily static within the pathway of the dripper of the present embodiments blocks only a part of the flow path causing the water to bypass it until its release. This process of partial blocking and bypass is causing the slight discharge decrease. Total particle amount passing through a single dripper during the experiment was 170 gr. Stopping the water flow from the first tank to the second tank (hence reducing particle concentration in the irrigation water) caused an increase in dripper discharge to the original value of 950 ml/h without an increase in variability.

It is appreciated that irrigation water with suspended particle concentration of 300 and 1000 ppm are considered of very low quality and exist naturally for short periods of time after heavy rains or floods. If one assumes a constant particle concentration of 1000 ppm with an average irrigation of 4 mm per day and no particle precipitation, 170 gr of particles can pass through the drippers of the present embodiments over a period of 87 irrigation days.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An irrigation system, comprising:
    an inclined irrigation pipe having a plurality of drippers configured to discharge water;
    a water distribution conduit connected to said inclined irrigation pipe at a highest level thereof;
    a water pressure stabilizer configured for stabilizing water pressure within said water distribution conduit; and
    a water supply system configured to deliver water to said water distribution conduit at a pressure of at most about 200 cm $H_2O$;
    wherein said water pressure stabilizer is connected to said water distribution conduit, and comprises a tank having an entry port, a water shutter controlling water entry through said port, and a float element operatively associated with said water shutter in a manner that a change in a vertical position of said float element effects a rotation of said water shutter.

2. The irrigation system according to claim 1, wherein at least a portion of said float element floats above a surface of said water within said container.

3. The irrigation system according to claim 1, wherein said float element is submerged under a surface of said water within said container.

4. The irrigation system according to claim 1, further comprising a pressure reducing device mounted on said inclined irrigation pipe and configured to reduce water pressure in said inclined irrigation pipe.

5. The irrigation system according to claim 4, wherein said pressure reducing device comprises a water pathway that is peripheral with respect to a body of said pressure reducing device, and that allows water to flow at a plurality of directions at any point along a length of said dripper.

6. The irrigation system according to claim 5, wherein said water pathway has a transverse cross-section selected from the group consisting of an annulus and a polygon.

7. The irrigation system according to claim 4, wherein said pressure reducing device comprises a tubular structure having two opposite ends and an elongated flow restriction element formed in, or introduced into, an interior of said tubular structure, said flow restriction element being tapered away from said ends towards a middle section of said structure.

8. The irrigation system according to claim 4, wherein there is a plurality of pressure reducing devices mounted on said inclined irrigation pipe, wherein a number of said pressure reducing devices is less than a number of said drippers.

9. The irrigation system according to claim 1, wherein at least one of said drippers is located at a periphery of said irrigation tube, within an upper half of a traverse cross-section of said periphery, but away from a topmost location of said periphery.

10. The irrigation system according to claim 1, wherein said irrigation pipe has a length of at least 100 meters and diameter of at least 40 mm.

11. An irrigation system, comprising:
    an inclined irrigation pipe having a plurality of drippers configured to discharge water;
    a water distribution conduit connected to said inclined irrigation pipe at a highest level thereof;
    a water supply system configured to deliver water to said water distribution conduit; and
    a water pressure stabilizer configured for ensuring that water pressure within said water distribution conduit is 50 cm $H_2O$ or less at any location along said water distribution conduit, said water pressure stabilizer comprising a container, a water inlet, a water outlet and a float element disposed within said container below said water inlet to block said water inlet when a height of water within said container reaches a predetermined level.

12. The irrigation system according to claim 11, further comprising a pressure reducing device mounted on said inclined irrigation pipe and configured to reduce water pressure in said inclined irrigation pipe.

13. The irrigation system according to claim 12, wherein said pressure reducing device comprises a water pathway that is peripheral with respect to a body of said pressure reducing device, and that allows water to flow at a plurality of directions at any point along a length of said dripper.

14. The irrigation system according to claim 13, wherein said water pathway has a transverse cross-section selected from the group consisting of an annulus and a polygon.

15. The irrigation system according to claim 12, wherein said pressure reducing device comprises a tubular structure having two opposite ends and an elongated flow restriction element formed in, or introduced into, an interior of said tubular structure, said flow restriction element being tapered away from said ends towards a middle section of said structure.

16. The irrigation system according to claim 11, wherein there is a plurality of pressure reducing devices mounted on said inclined irrigation pipe, wherein a number of said pressure reducing devices is less than a number of said drippers.

17. The irrigation system according to claim 11, wherein at least one of said drippers is located at a periphery of said irrigation tube, within an upper half of a traverse cross-section of said periphery, but away from a topmost location of said periphery.

18. The irrigation system according to claim 11, wherein said irrigation pipe has a length of at least 100 meters and diameter of at least 40 mm.

19. A water irrigation dripper comprising a single unitary element having an external structure enclosing an internal structure to form a generally straight water pathway surrounding said internal structure in a space between said structures, the water irrigation dripper having at least one water inlet for providing water to said pathway, and at least one water outlet on said external structure, said pathway being peripheral with respect to a body of said dripper and allowing water to flow at a plurality of directions at any point along a length of the dripper, the water irrigation dripper being characterized by a volumetric flow rate that varies non-linearly as a power of a pressure P at said inlet.

* * * * *